Figure 1:
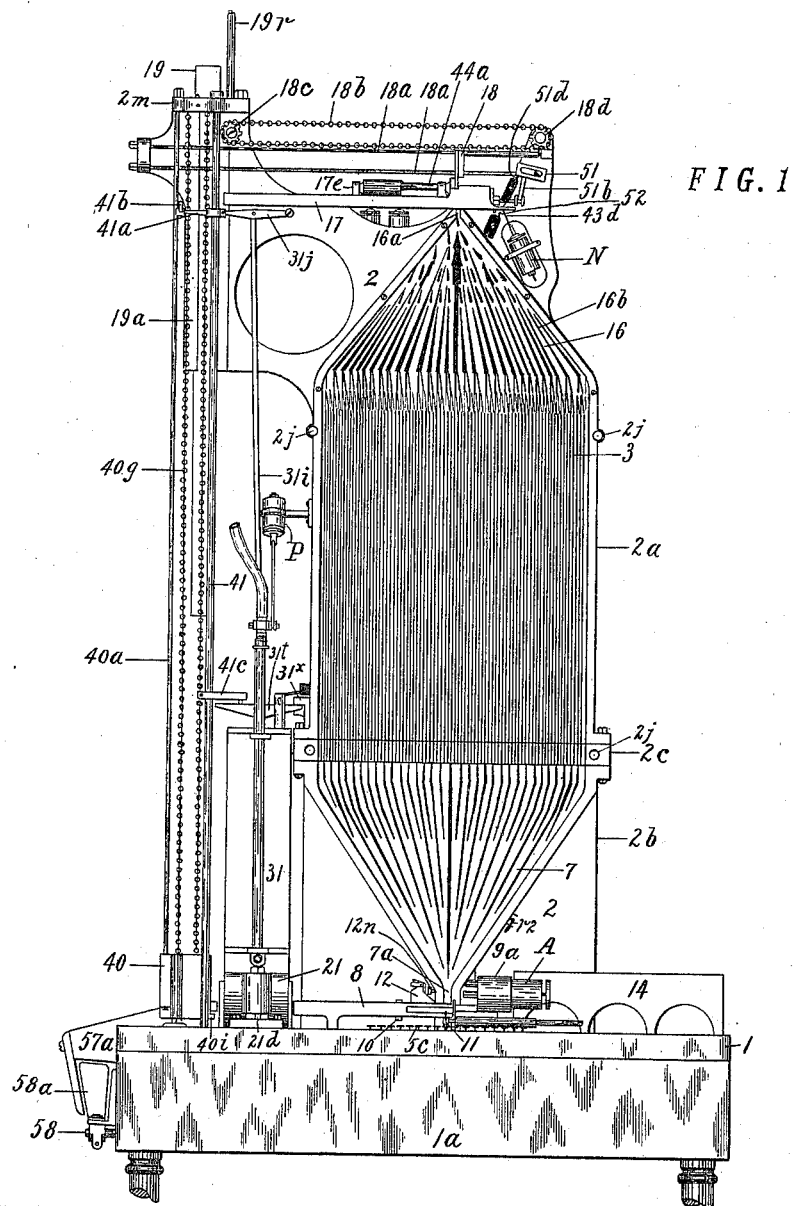

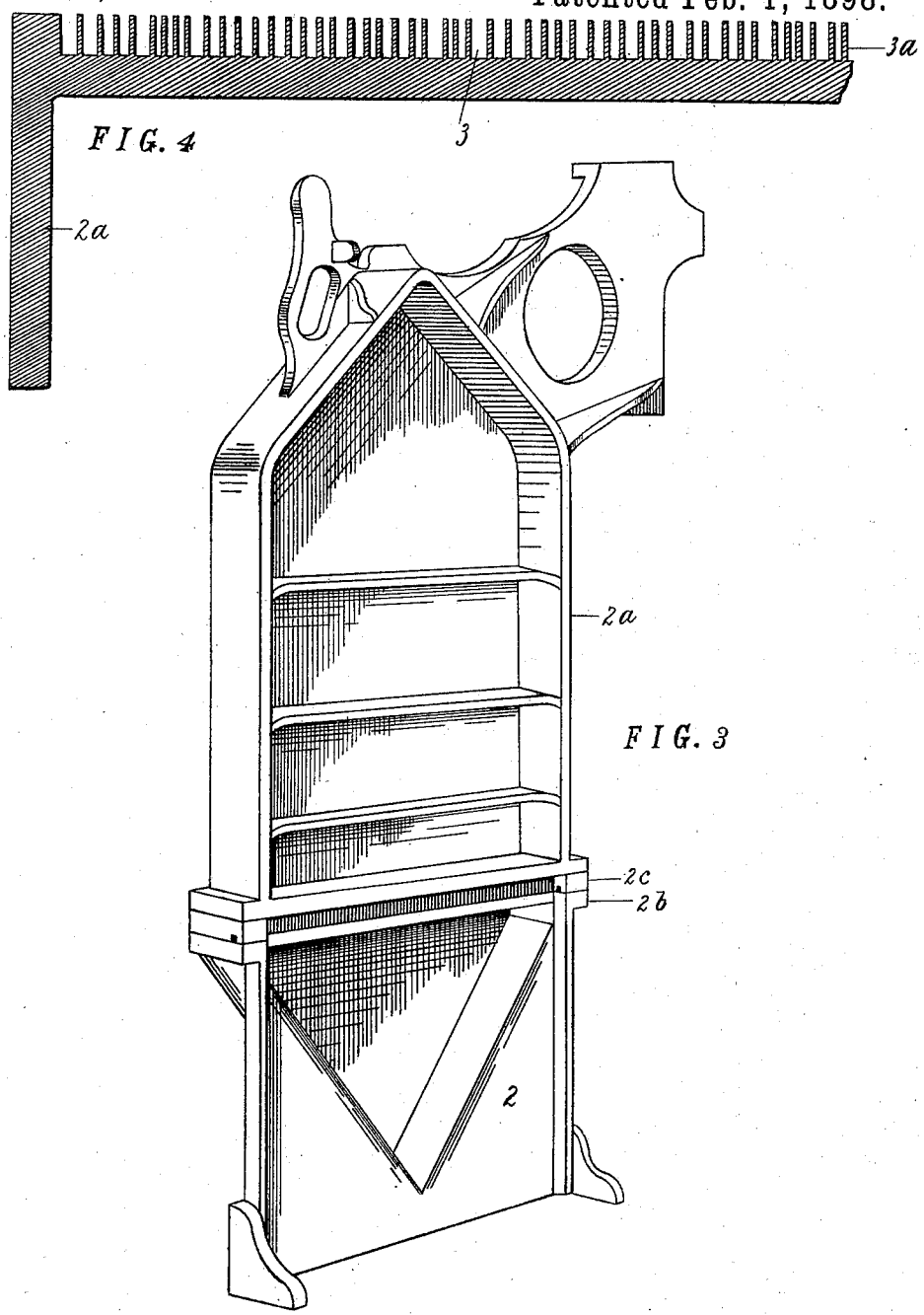

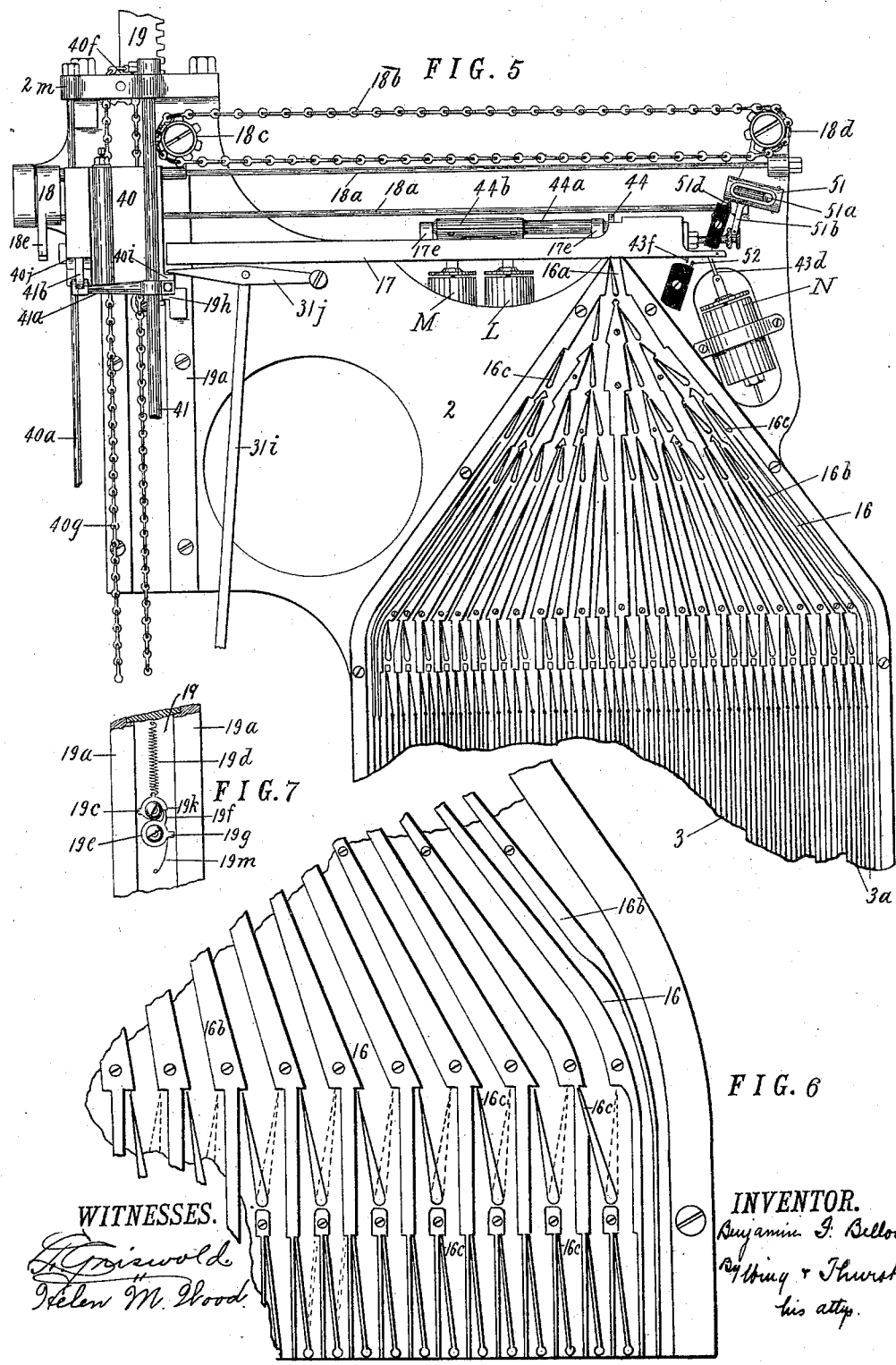

(No Model.) 29 Sheets—Sheet 5.
B. F. BELLOWS.
MACHINE FOR MAKING TYPE BARS.
No. 598,408. Patented Feb. 1, 1898.
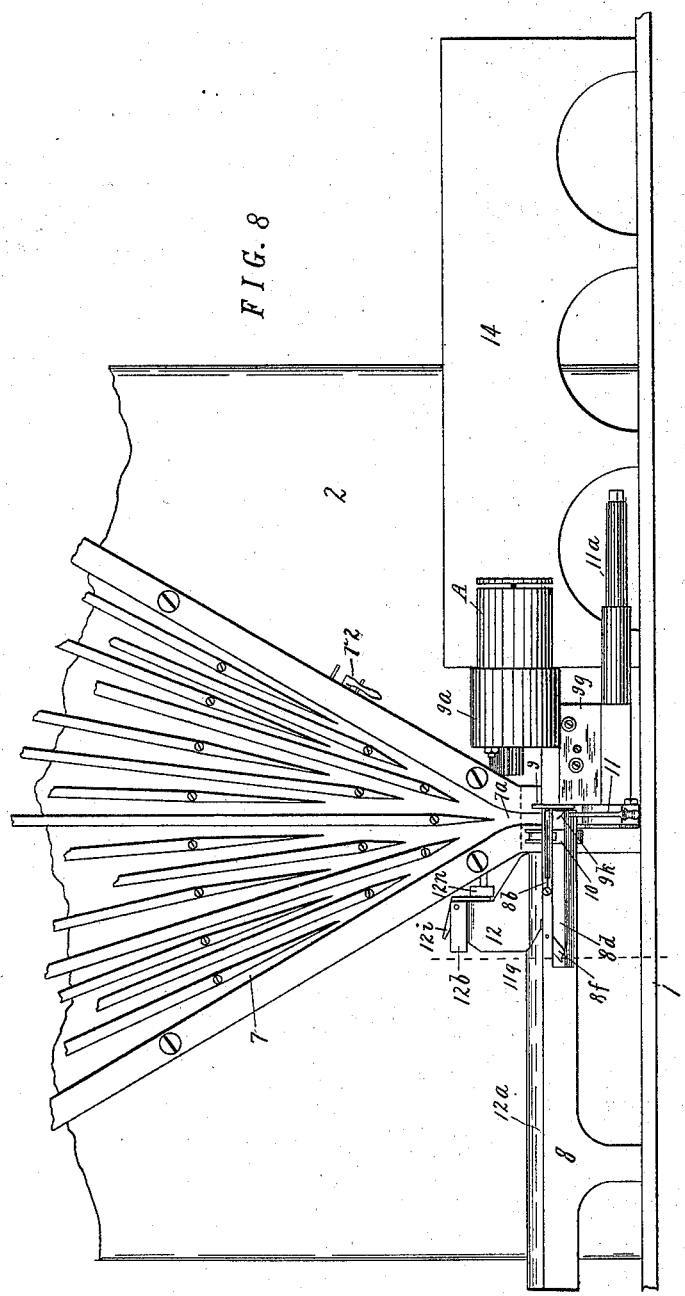
WITNESSES.
INVENTOR.
Benjamin F. Bellows
By Wing & Thurston
his attys (No Model.) 29 Sheets—Sheet 6.
B. F. BELLOWS.
MACHINE FOR MAKING TYPE BARS.
No. 598,408. Patented Feb. 1, 1898.
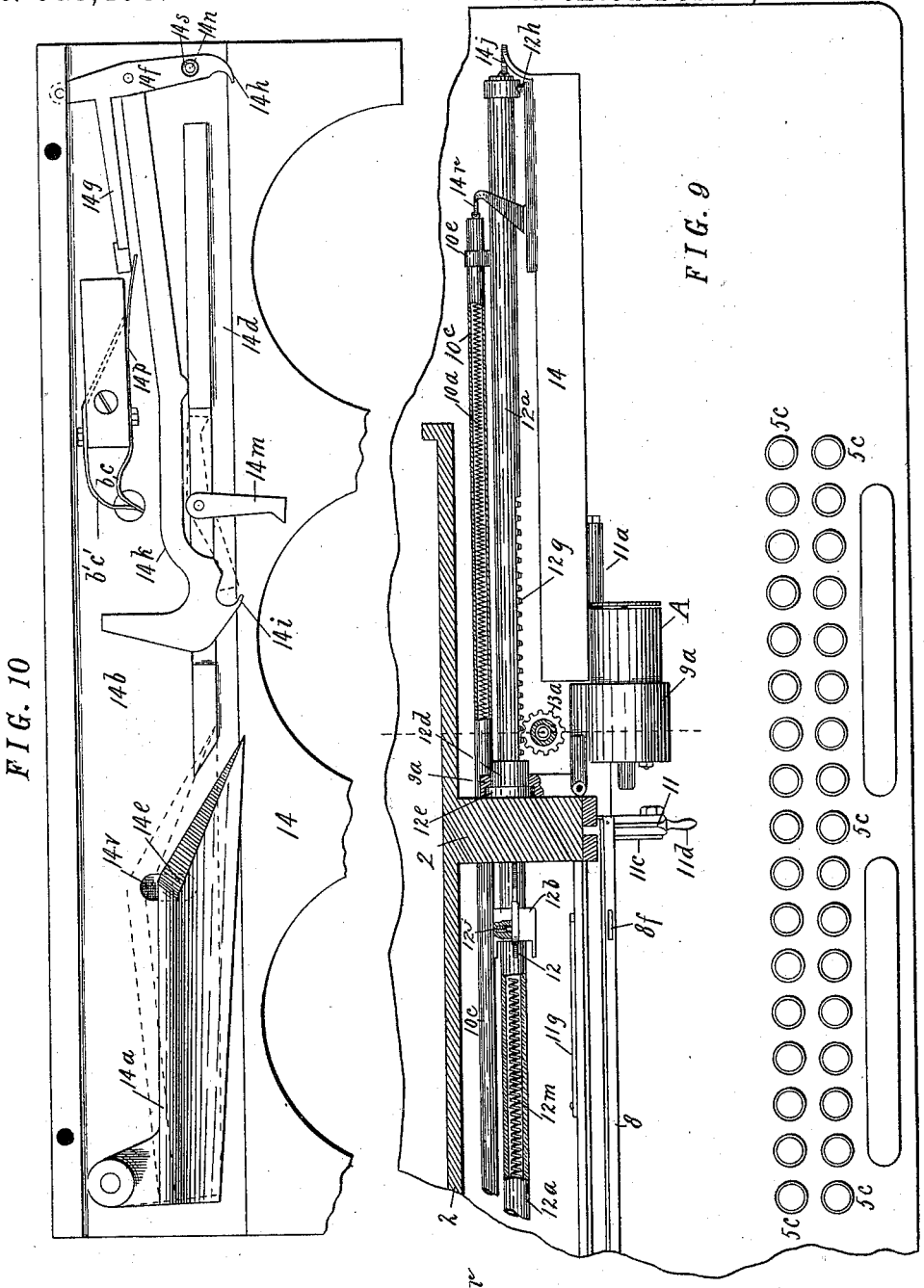
WITNESSES.
INVENTOR.
Benjamin F. Bellows
By Wing & Thurston
his attys (No Model.) 29 Sheets—Sheet 7.

B. F. BELLOWS.
MACHINE FOR MAKING TYPE BARS.

No. 598,408. Patented Feb. 1, 1898.

WITNESSES.

INVENTOR.
Benjamin F. Bellows
By Wing & Thurston
his attys (No Model.)

29 Sheets—Sheet 8.

B. F. BELLOWS.
MACHINE FOR MAKING TYPE BARS.

No. 598,408.

Patented Feb. 1, 1898.

WITNESSES.

INVENTOR.
Benjamin F. Bellows
By Ewing & Thurston
his attys (No Model.) 29 Sheets—Sheet 9.

B. F. BELLOWS.
MACHINE FOR MAKING TYPE BARS.

No. 598,408. Patented Feb. 1, 1898.

WITNESSES.
F. Griswold.
Helen M. Wood.

INVENTOR.
Benjamin F. Bellows
By Wing & Thurston
his attys (No Model.) 29 Sheets—Sheet 10.
B. F. BELLOWS.
MACHINE FOR MAKING TYPE BARS.
No. 598,408. Patented Feb. 1, 1898.
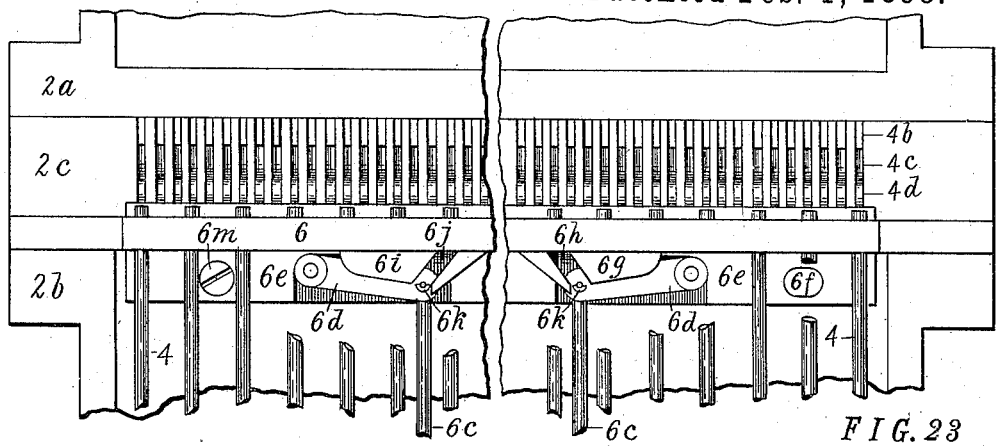
FIG. 23
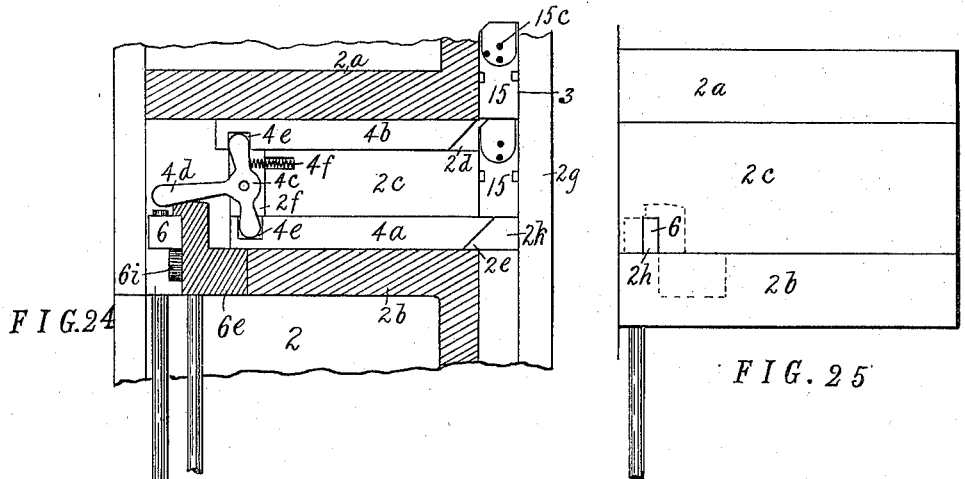
FIG. 24  FIG. 25
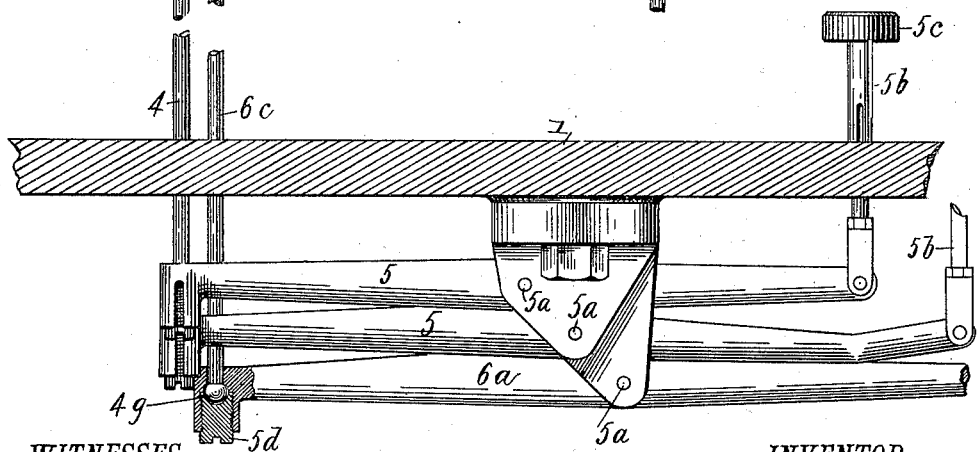
WITNESSES.
F. Griswold
Helen M. Wood.
INVENTOR.
Benjamin F. Bellows
By Wing & Thurston
his atty (No Model.) 29 Sheets—Sheet 11.

B. F. BELLOWS.
MACHINE FOR MAKING TYPE BARS.

No. 598,408. Patented Feb. 1, 1898.

WITNESSES.
F. Griswold
Helen M. Wood.

INVENTOR.
Benjamin F. Bellows
By Wing & Thurston
his attys (No Model.) 29 Sheets—Sheet 12.

B. F. BELLOWS.
MACHINE FOR MAKING TYPE BARS.

No. 598,408. Patented Feb. 1, 1898.

WITNESSES. INVENTOR.

(No Model.)
29 Sheets—Sheet 13.
B. F. BELLOWS.
MACHINE FOR MAKING TYPE BARS.
No. 598,408.
Patented Feb. 1, 1898.
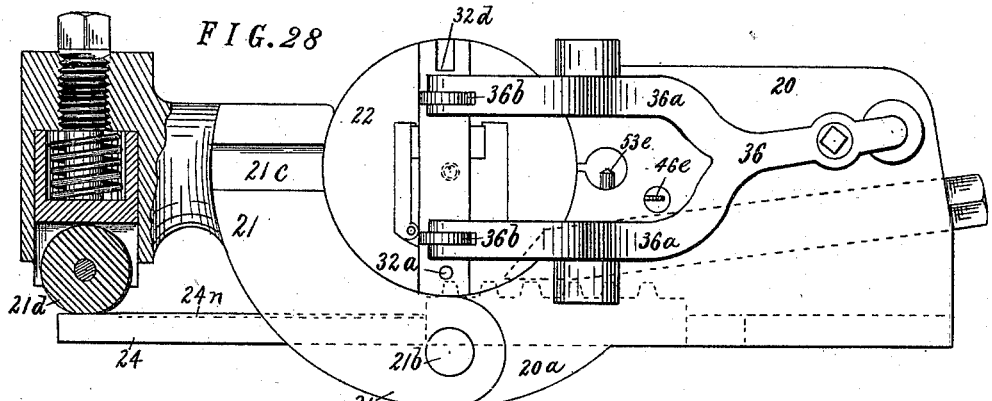
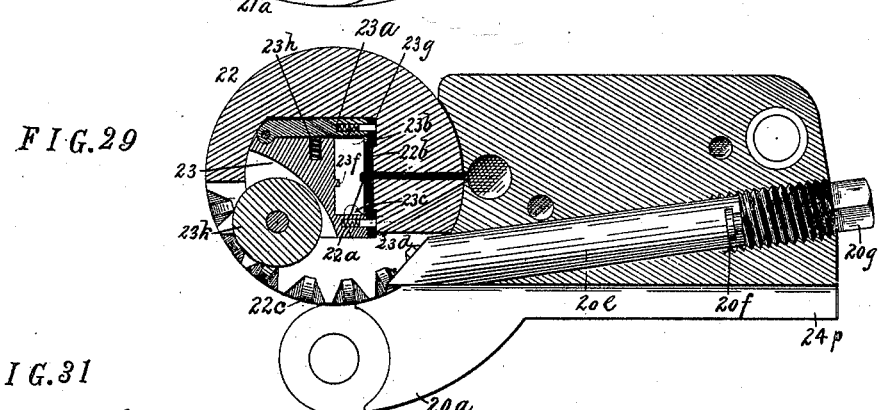
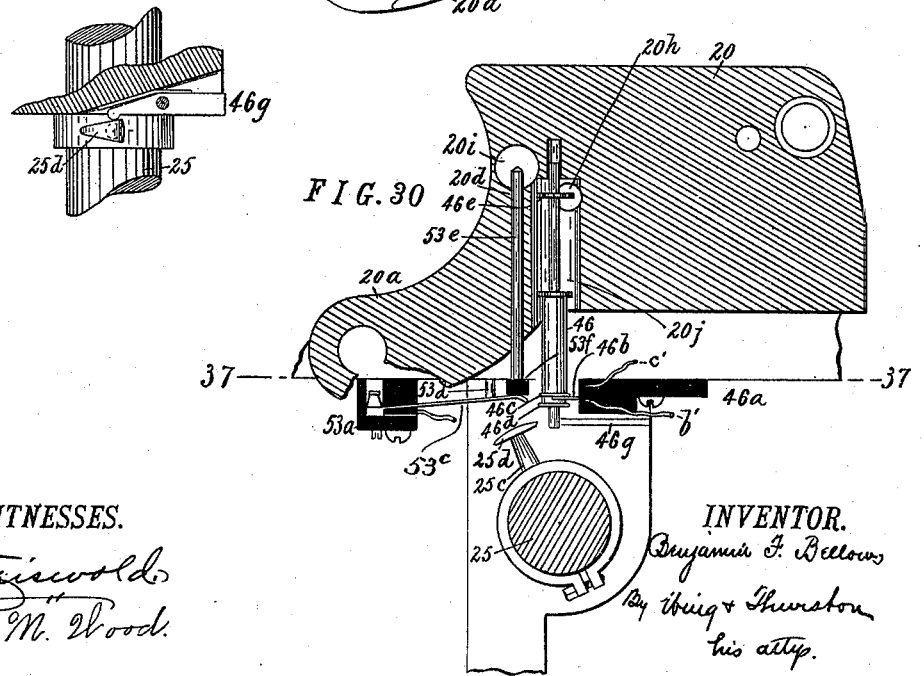
WITNESSES.
INVENTOR.

(No Model.) 29 Sheets—Sheet 14.
B. F. BELLOWS.
MACHINE FOR MAKING TYPE BARS.
No. 598,408. Patented Feb. 1, 1898.
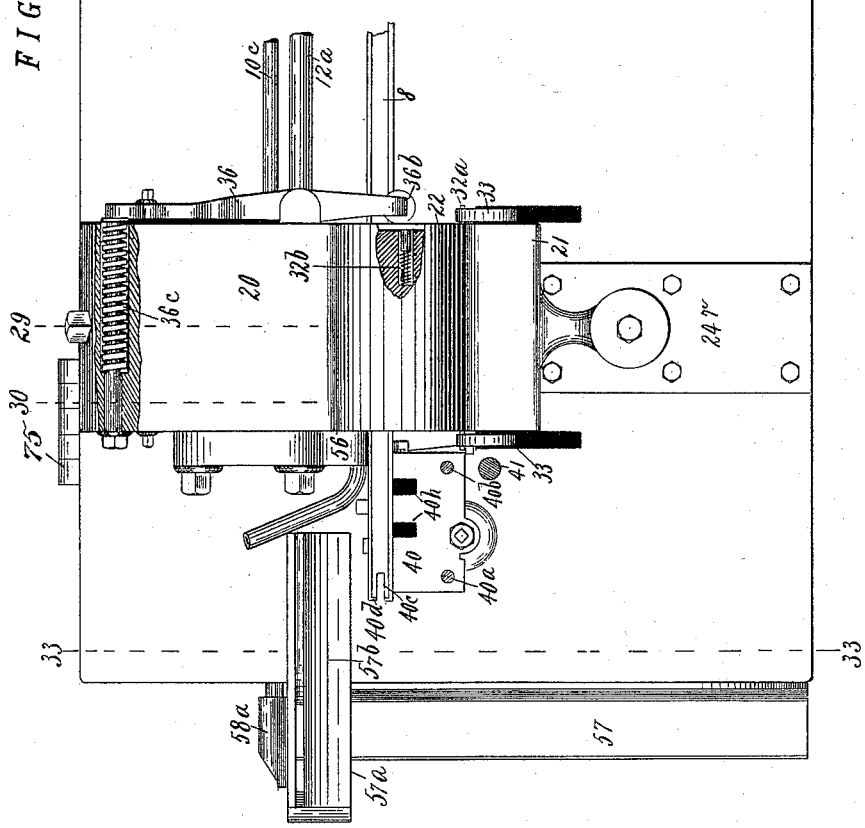
WITNESSES.
INVENTOR.

(No Model.)   29 Sheets—Sheet 15.

B. F. BELLOWS.
MACHINE FOR MAKING TYPE BARS.

No. 598,408. Patented Feb. 1, 1898.

WITNESSES.
F. Griswold
Helen M. Wood.

INVENTOR.
Benjamin F. Bellows
By Wing & Thurston
his attys.

(No Model.) 29 Sheets—Sheet 16.

B. F. BELLOWS.
MACHINE FOR MAKING TYPE BARS.

No. 598,408. Patented Feb. 1, 1898.

WITNESSES. INVENTOR.
Benjamin F. Bellows
By Wing & Thurston
his attys (No Model.) 29 Sheets—Sheet 17.

B. F. BELLOWS.
MACHINE FOR MAKING TYPE BARS.

No. 598,408. Patented Feb. 1, 1898.

WITNESSES.
F. Griswold
Helen M. Wood.

INVENTOR.
Benjamin F. Bellows
By Wing & Thurston
his attys (No Model.) 29 Sheets—Sheet 18.

B. F. BELLOWS.
MACHINE FOR MAKING TYPE BARS.

No. 598,408. Patented Feb. 1, 1898.

WITNESSES.
F. Griswold
Helen M. Wood.

INVENTOR.
Benjamin F. Bellows
By Wrieg & Thurston
his attys (No Model.) 29 Sheets—Sheet 19.

B. F. BELLOWS.
MACHINE FOR MAKING TYPE BARS.

No. 598,408. Patented Feb. 1, 1898.

WITNESSES.
F. Griswold
Helen M. Wood.

INVENTOR.
Benjamin F. Bellows
By Wing & Thurston
his attys

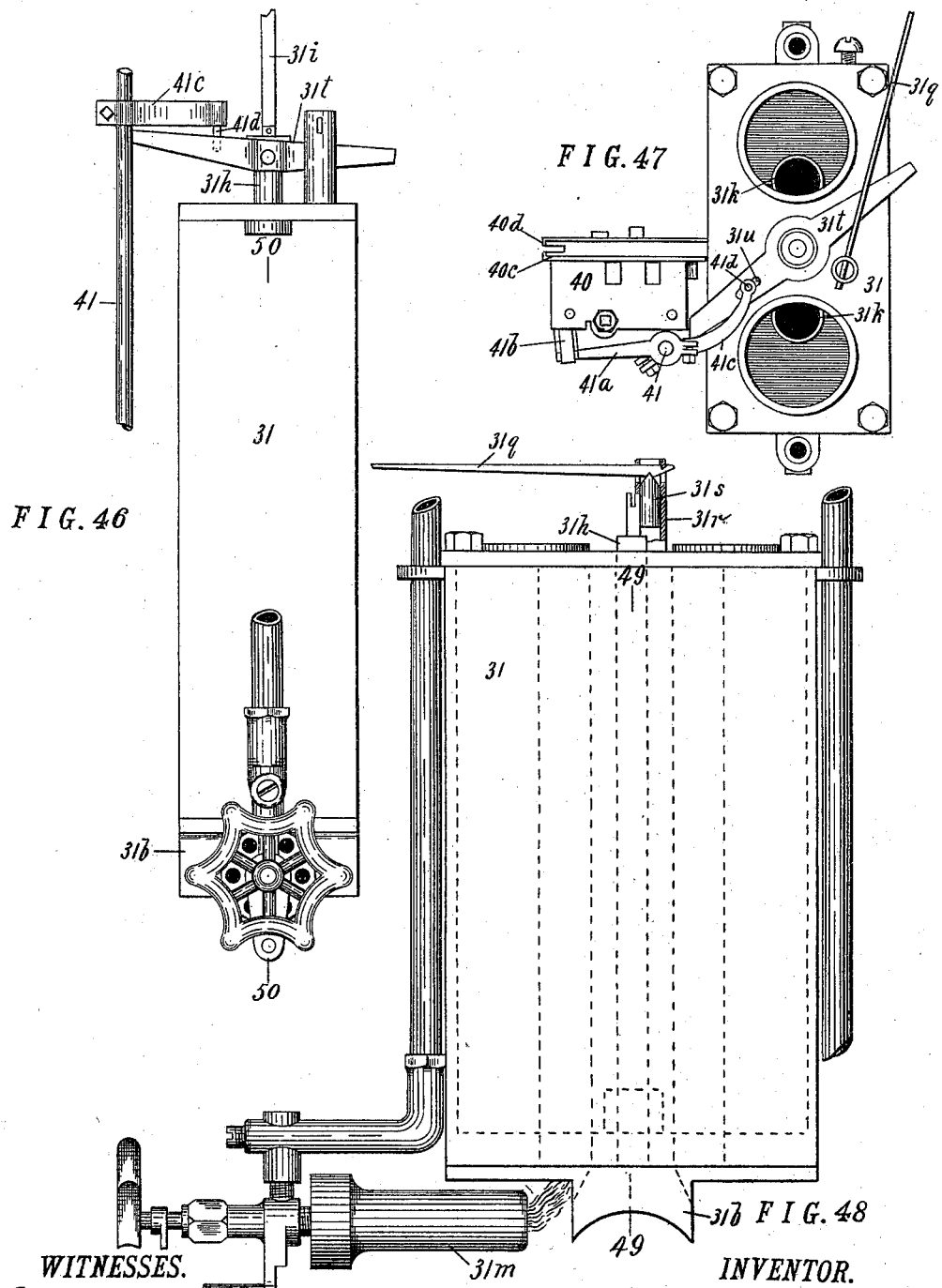

(No Model.) 29 Sheets—Sheet 21.

B. F. BELLOWS.
MACHINE FOR MAKING TYPE BARS.

No. 598,408. Patented Feb. 1, 1898.

WITNESSES.                               INVENTOR.

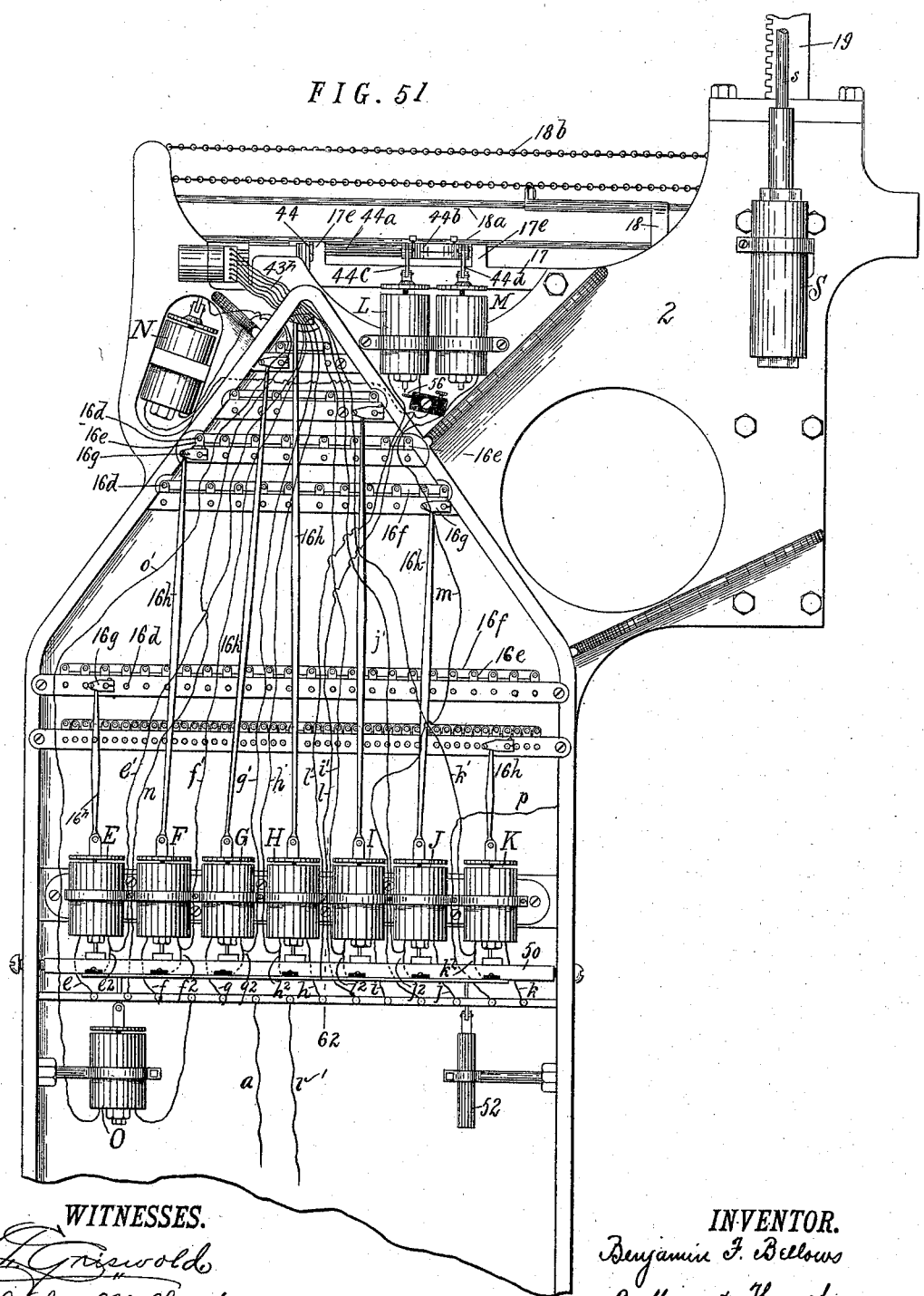

(No Model.) 29 Sheets—Sheet 23.
B. F. BELLOWS.
MACHINE FOR MAKING TYPE BARS.
No. 598,408. Patented Feb. 1, 1898.
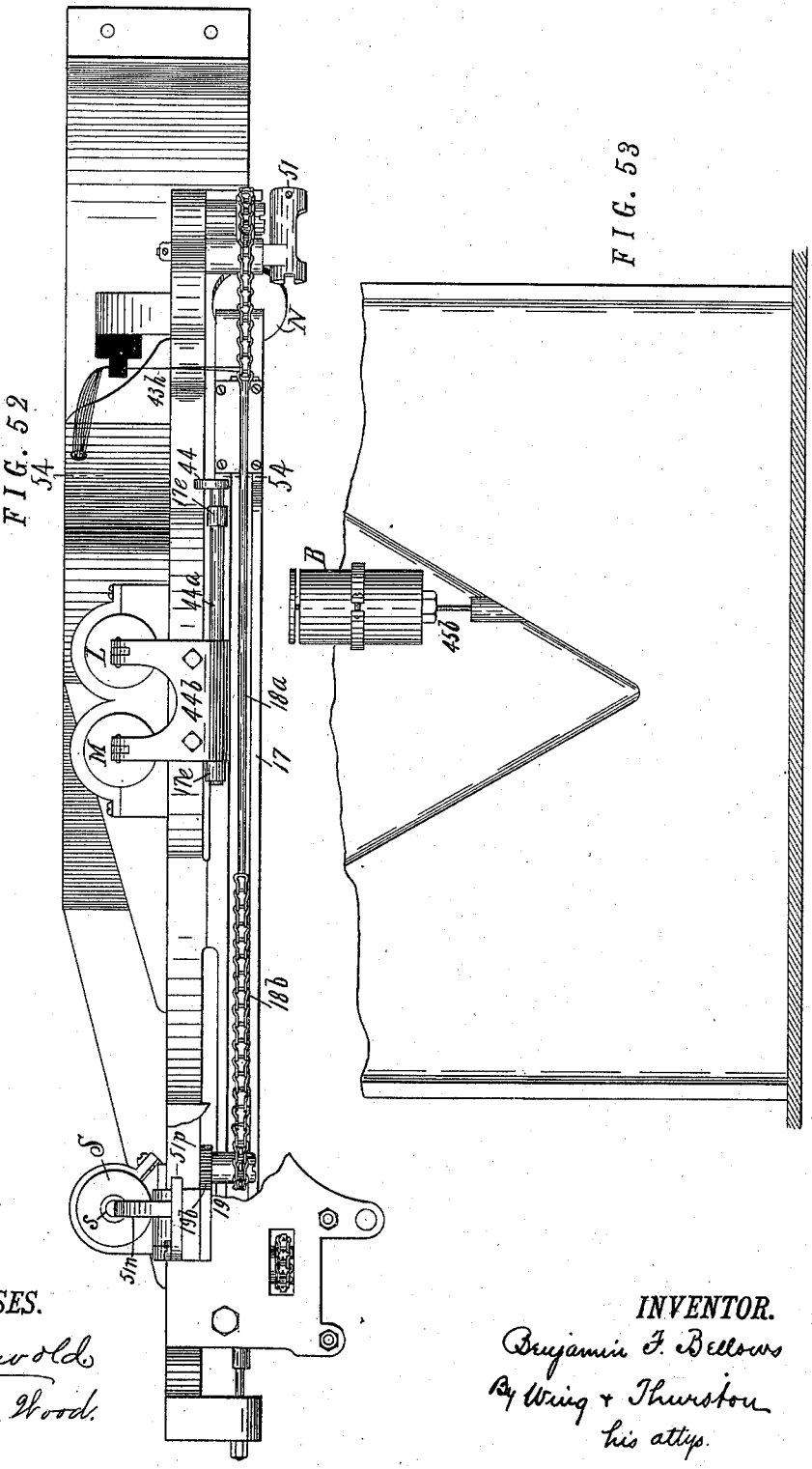
WITNESSES.
F. L. Griswold
Helen M. Wood.
INVENTOR.
Benjamin F. Bellows
By Wing & Thurston
his attys.

(No Model.) 29 Sheets—Sheet 24.

B. F. BELLOWS.
MACHINE FOR MAKING TYPE BARS.

No. 598,408. Patented Feb. 1, 1898.

WITNESSES.
L. Griswold
Helen M. Wood

INVENTOR.
Benjamin F. Bellows
By Wing & Thurston
his attys

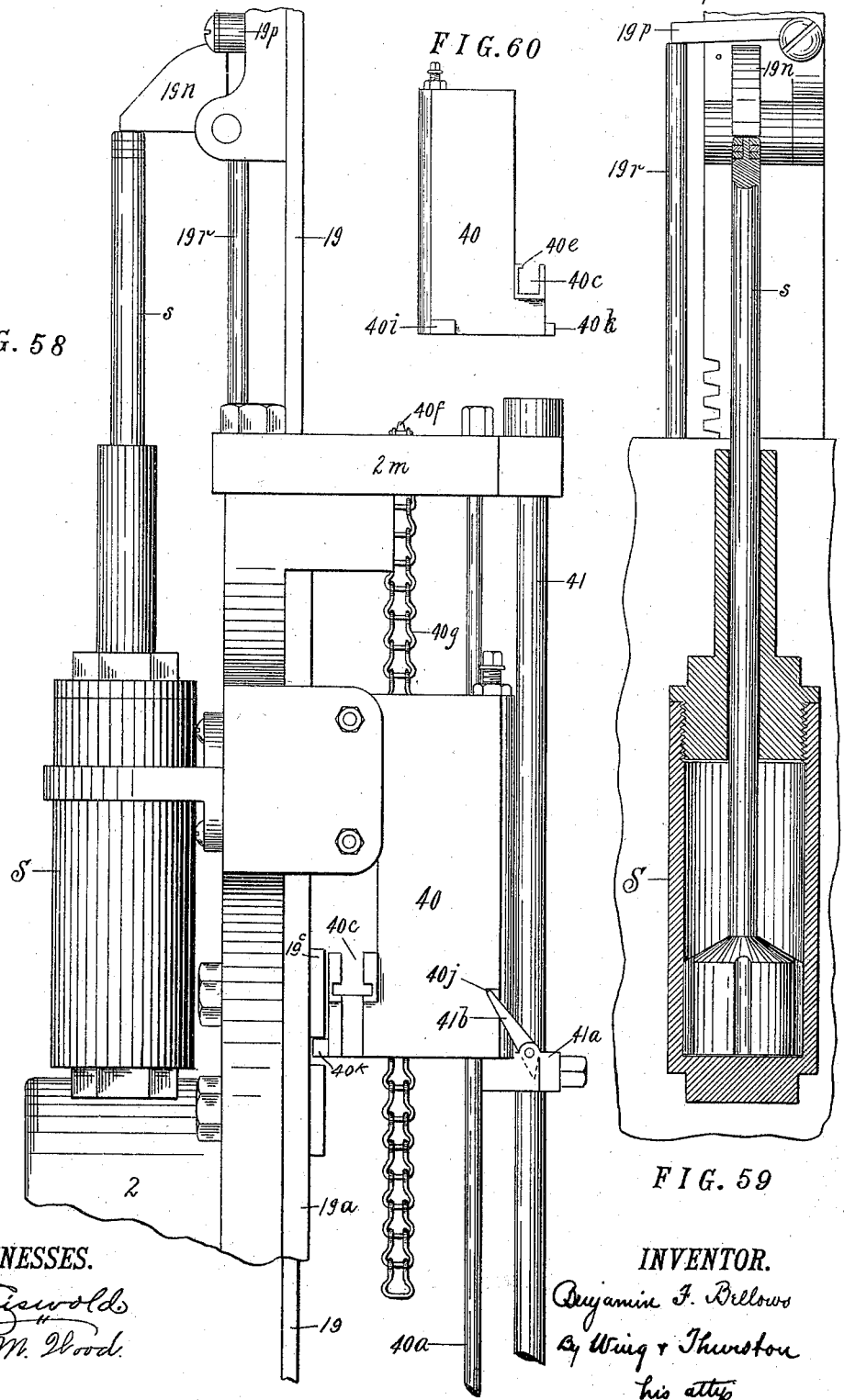

(No Model.) 29 Sheets—Sheet 26.
B. F. BELLOWS.
MACHINE FOR MAKING TYPE BARS.
No. 598,408. Patented Feb. 1, 1898.
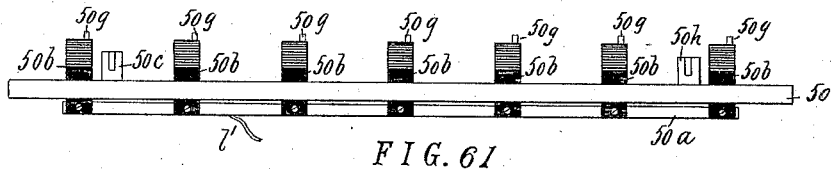
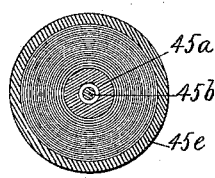
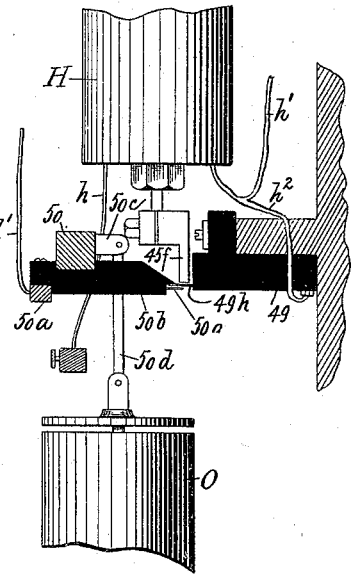
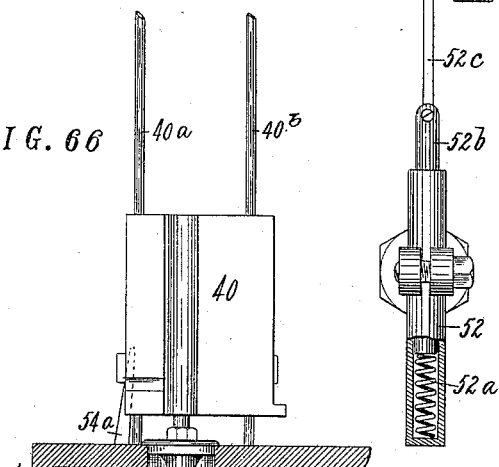
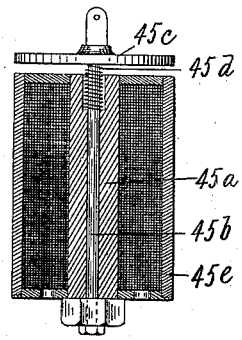
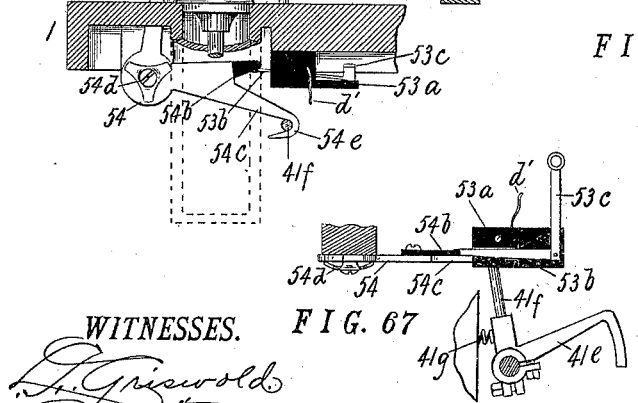
WITNESSES. INVENTOR.

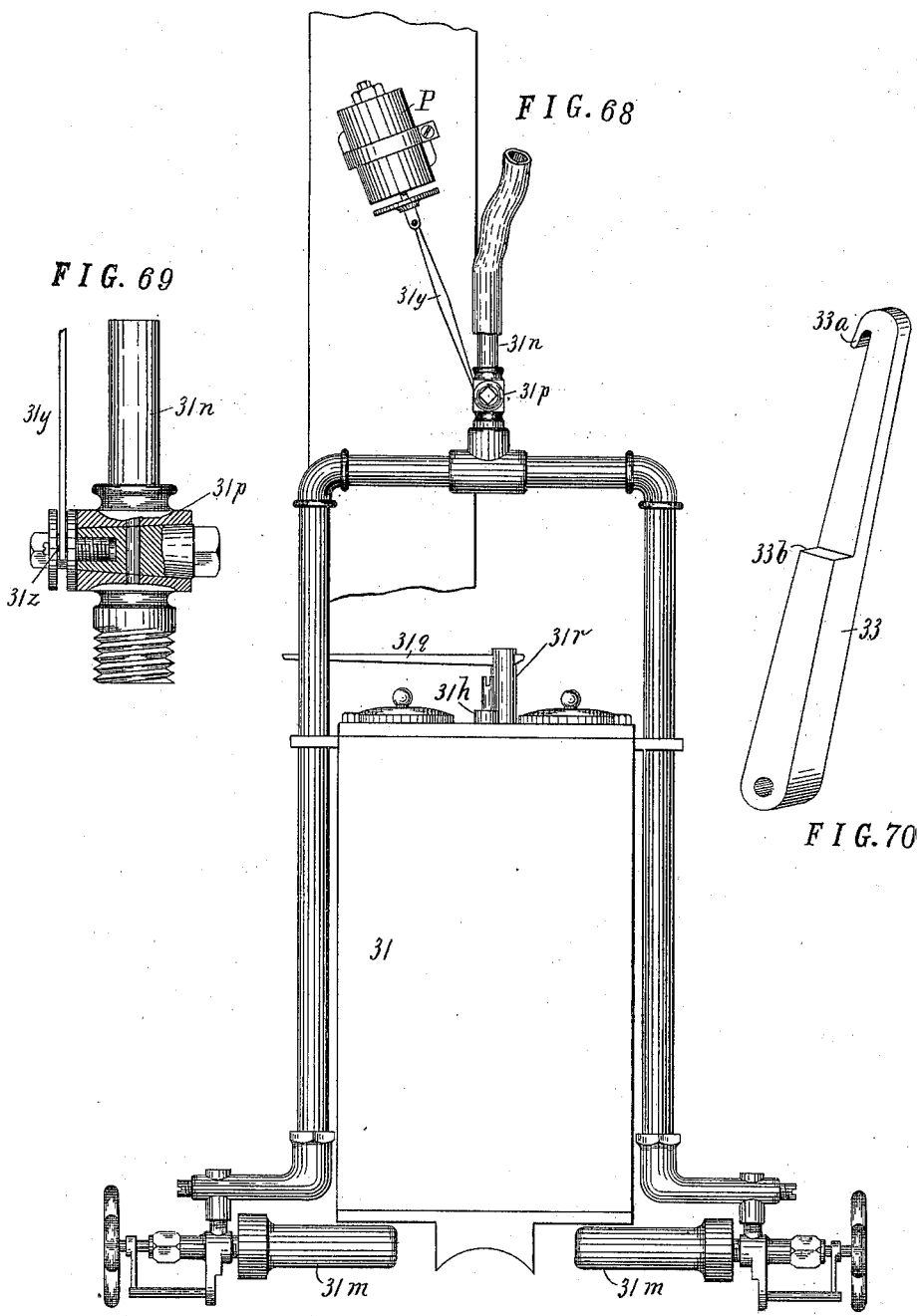

(No Model.) 29 Sheets—Sheet 28.
B. F. BELLOWS.
MACHINE FOR MAKING TYPE BARS.
No. 598,408. Patented Feb. 1, 1898.
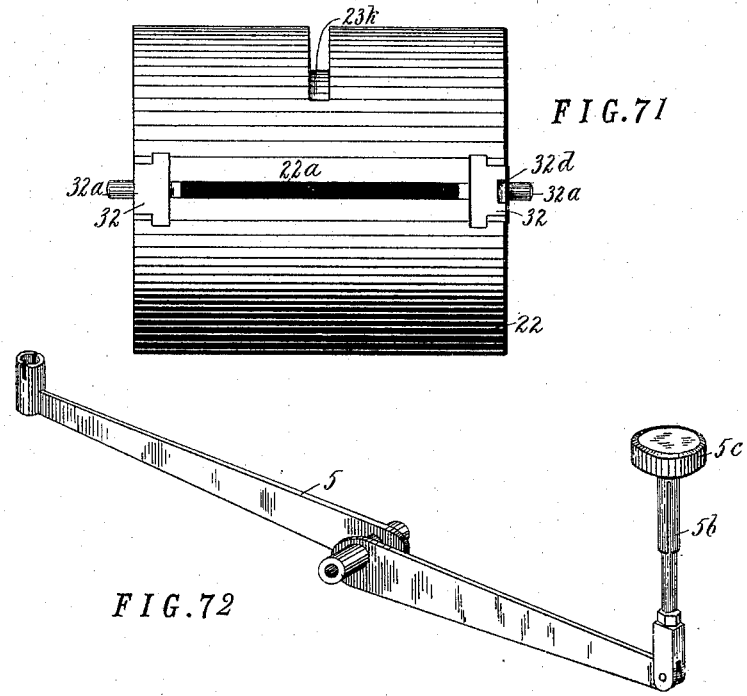
FIG. 71
FIG. 72
FIG. 73
WITNESSES. 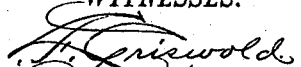
INVENTOR. 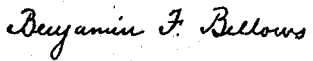

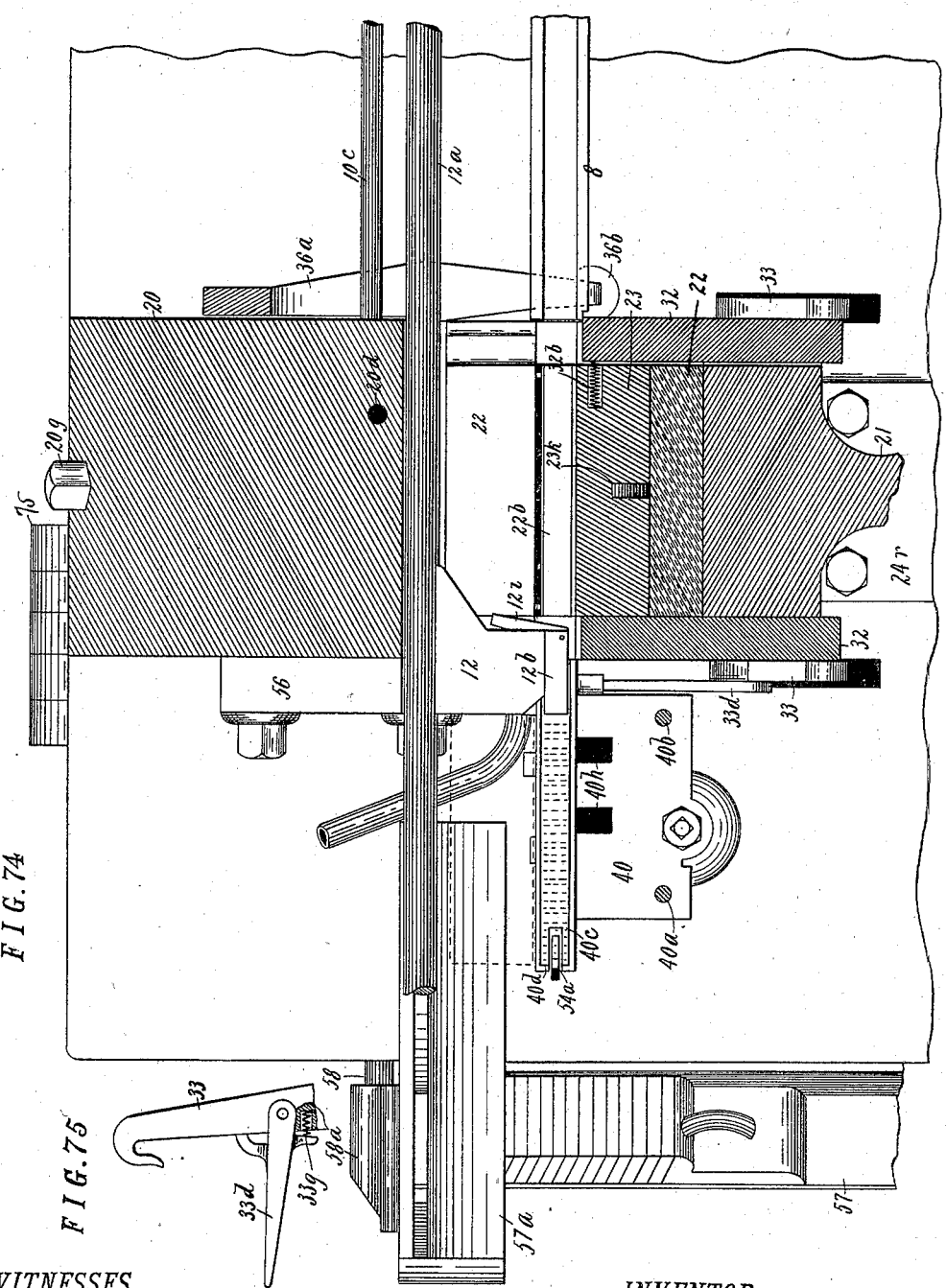

UNITED STATES PATENT OFFICE.

BENJAMIN F. BELLOWS, OF CLEVELAND, OHIO, ASSIGNOR, BY MESNE ASSIGNMENTS, TO THE ELECTRIC COMPOSITOR COMPANY, OF WHEELING, WEST VIRGINIA.

MACHINE FOR MAKING TYPE-BARS.

SPECIFICATION forming part of Letters Patent No. 598,408, dated February 1, 1898.

Application filed May 21, 1894. Serial No. 512,021. (No model.)

*To all whom it may concern:*

Be it known that I, BENJAMIN F. BELLOWS, a citizen of the United States, residing at Cleveland, in the county of Cuyahoga and State of Ohio, have invented certain new and useful Improvements in Machines for Making Type-Bars; and I do hereby declare the following to be a full, clear, and exact description of the invention, such as will enable others skilled in the art to which it appertains to make and use the same.

My invention relates to the class of machine in which independent matrices selected and released by finger-keys are assembled in line, a type-bar is cast from said assembled matrix-line, and the matrices are automatically distributed to their respective magazines.

The invention relates generally to nearly every part of the machine shown and described; but it particularly relates to the escapement by which the independent matrices are upheld and released, to the shift mechanism by which the depression of one escapement-key may be caused to operate either of several escapements, to the mechanism concerned in the casting of the type-bar, to the elevator mechanism for conveying the matrices from the casting mechanism to the distributing mechanism, to the mechanism for distributing the matrices, to the combination, with the several mechanisms, of electromagnets and electrical switches, whereby the movement of the several mechanisms is initiated and maintained until they have performed their several functions, and to the construction of the matrices.

The invention consists in the construction and combination of parts shown in the drawings and hereinafter described, all of which will be definitely pointed out in the claims.

Figure 2:
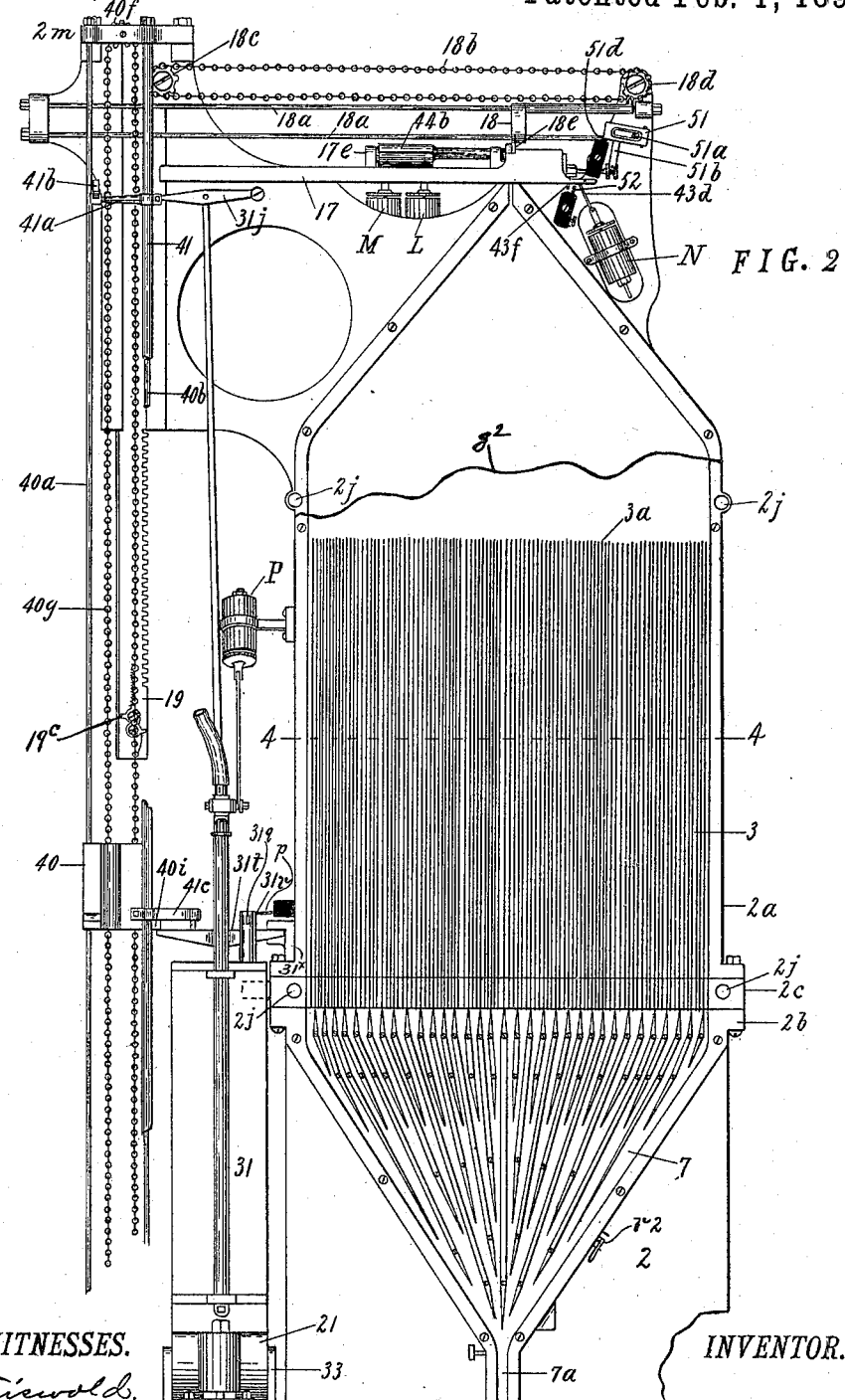
Figure 12:
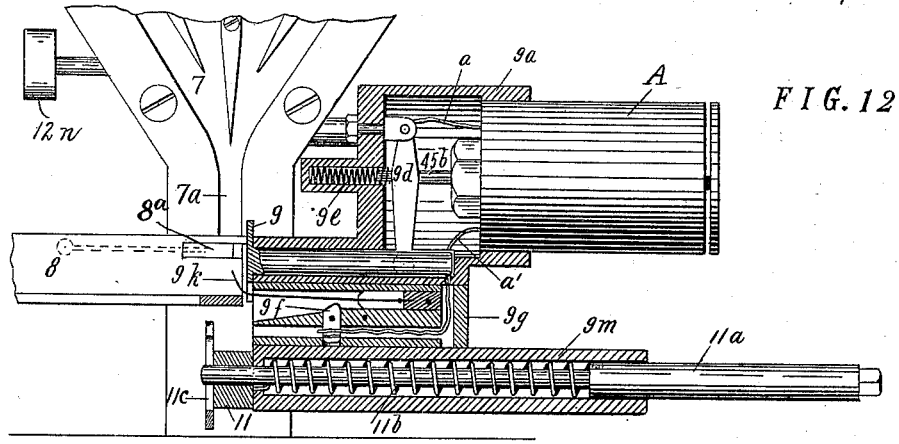
Figure 13:
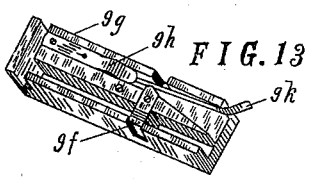
Figure 14:
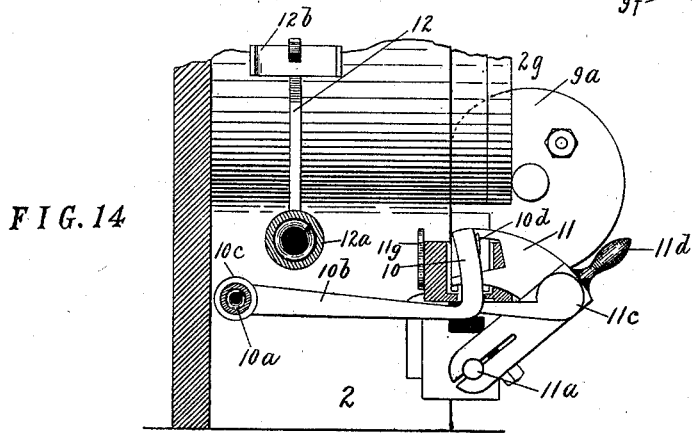
Figure 15:
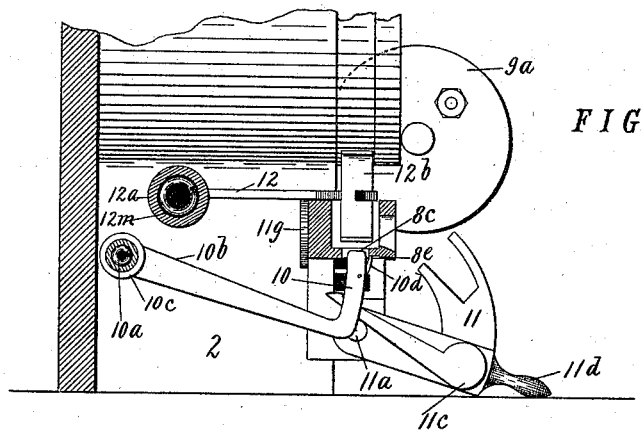
Figure 16:
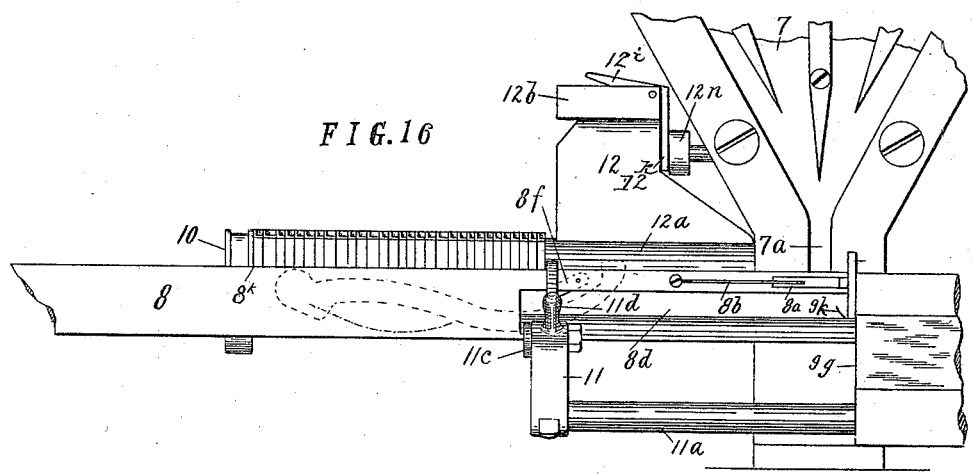
Figures 17, 18:
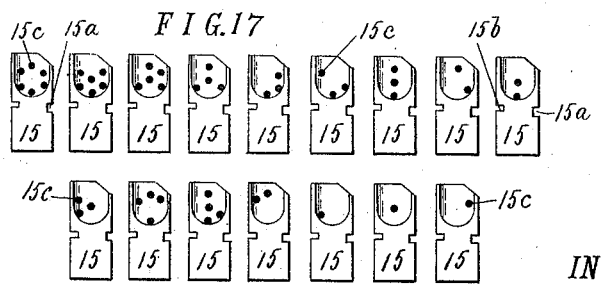
Figure 19:
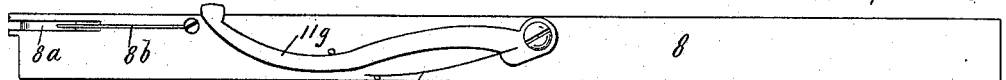
Figure 20:
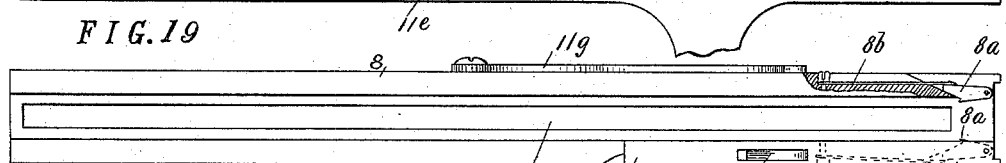
Figure 21:
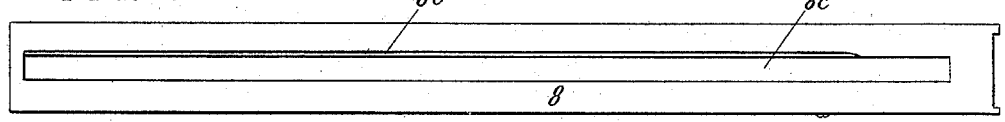
Figure 22:
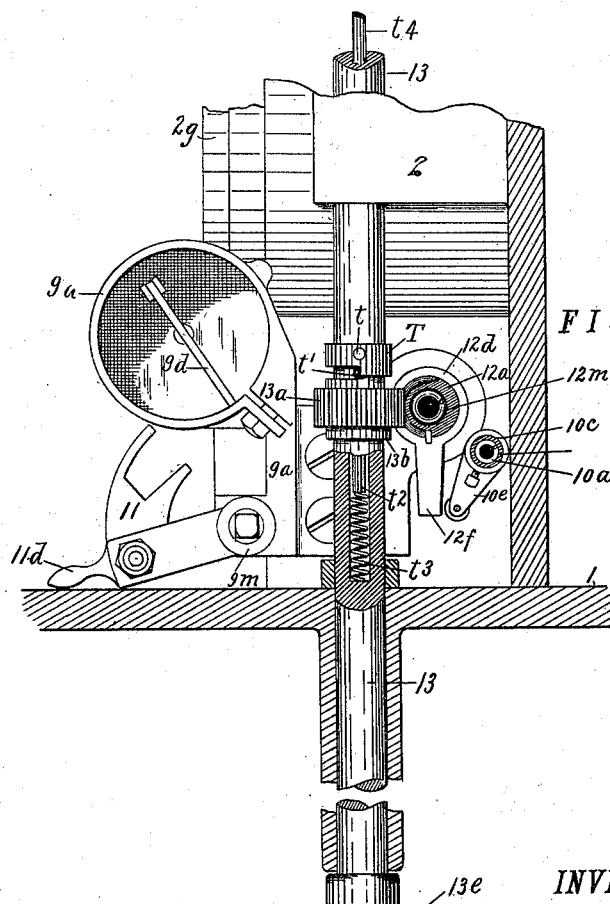
Figure 26:
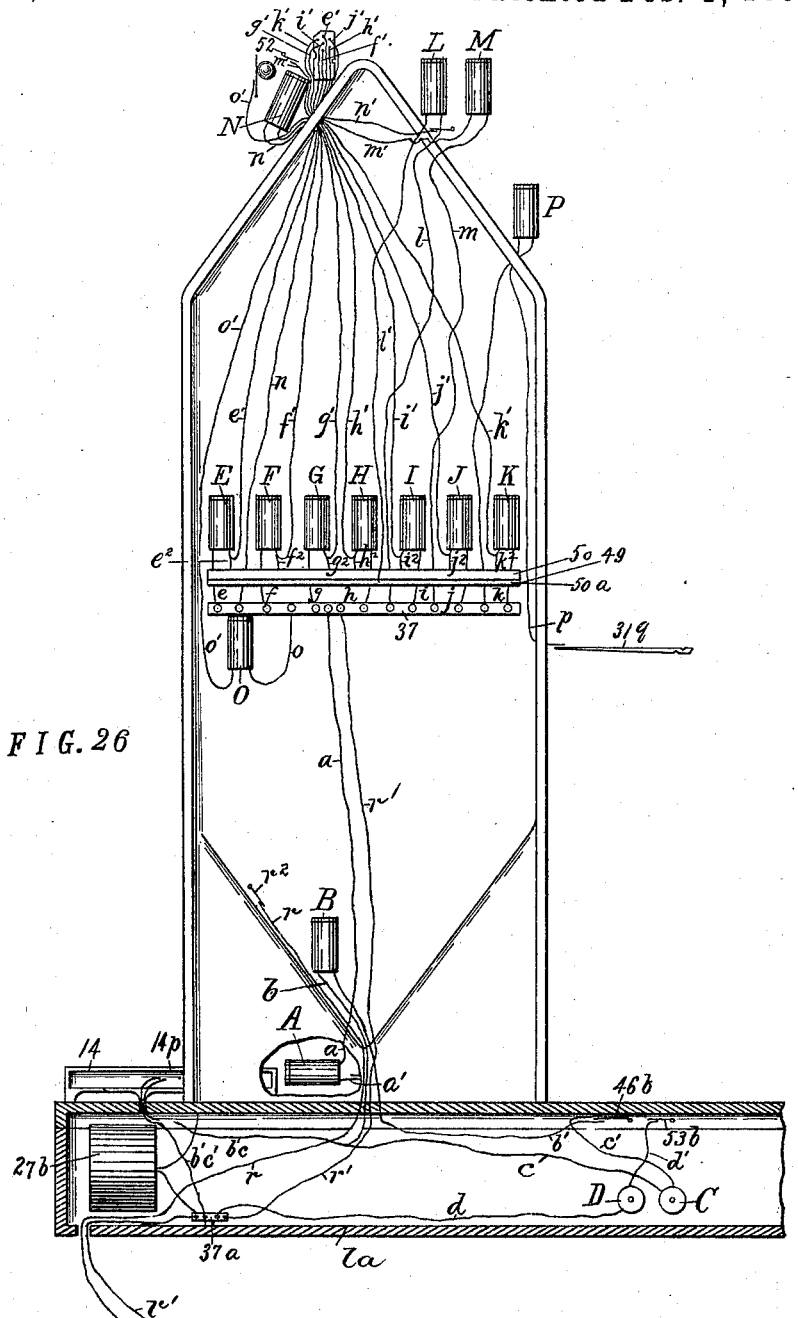
Figure 27:
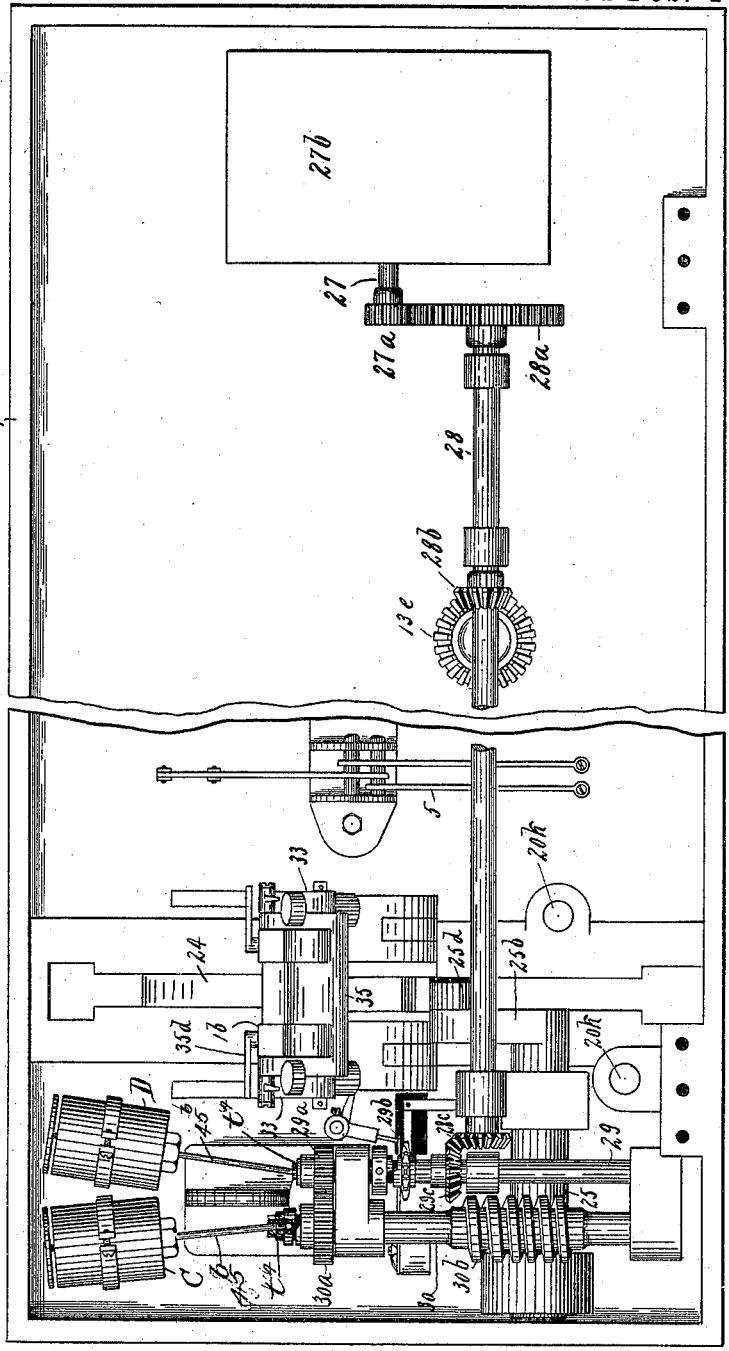

In the drawings, Figure 1 is a front elevation of the machine, necessarily more or less diagrammatic in its character, because the size of the sheet is such that a figure cannot be made thereon which will show clearly all of the different parts which may be seen from the front of the machine. Fig. 2 is a front elevation of the upright frame member and certain parts supported wholly or in part thereby, the distributing-channel partitions and switches being omitted from this figure. Fig. 3 is a perspective rear view of the said upright frame member. Fig. 4 is a horizontal section part way across the said upright piece in the plane of line 4 4 on Fig. 2, showing the construction of the magazines. Fig. 5 is a front view of the upper part of the upright frame member and the mechanism supported thereby. Fig. 6 is a front view of a portion of the lower ends of the distributing channels and switches. Fig. 7 is a front view of the lower part of the slide-rack 19 and the trigger mechanism by means of which it may engage with and be released from the elevator. Fig. 8 is a front view of the lower end of the upright frame member, the lower ends of the assembling-channels, and certain parts adjacent thereto. Fig. 9 is a plan view of a portion of the bed, the upright frame member being cut off at the point indicated by the horizontal dotted line on Fig. 8. Fig. 10 is a rear view of the switch-box with the rear plate removed. Fig. 11 is an end view of the switch-box. Fig. 12 is a front view of the lower end of the assembling-spout and certain parts adjacent thereto in vertical section. Fig. 13 is a perspective view of the insulator-block $9^g$ and parts supported thereby. Fig. 14 is a sectional view on the vertical dotted line in Fig. 8 looking to the right. Fig. 15 is a similar view of the same parts in different relative positions. Fig. 16 is a front view of the same parts and the assembling-trough when a line of matrices is between the claw and detent in the assembling-trough. Fig. 17 is a view showing that side of a series of matrices which face to the right. Fig. 18 is a top view of one matrix. Fig. 19 is a rear view of the assembling-trough. Fig. 20 is a top view thereof. Fig. 21 is a bottom view thereof. Fig. 22 is a vertical sectional view on dotted line in Fig. 9, looking to the left. Fig. 23 is a rear view of the shift mechanism and the escapements. Fig. 24 is a sectional side view of the shift mechanism, key mechanism, and escapements. Fig. 25 is a side view of the part $2^c$ of the upright frame member and of the parts $2^a$ and $2^b$ adjacent to the part $2^c$. Fig. 26 is a rear view of the frame, showing, diagrammatically, the magnets and electric circuits. Fig. 27 is an under side view of the bed and the parts suspended thereform. Fig.

Figure 33:
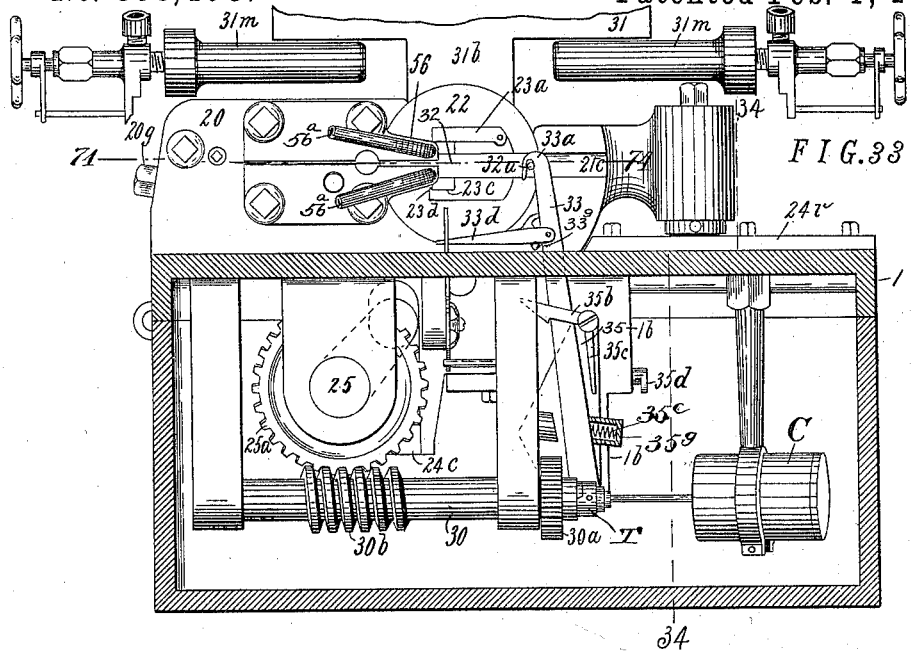
Figure 34:
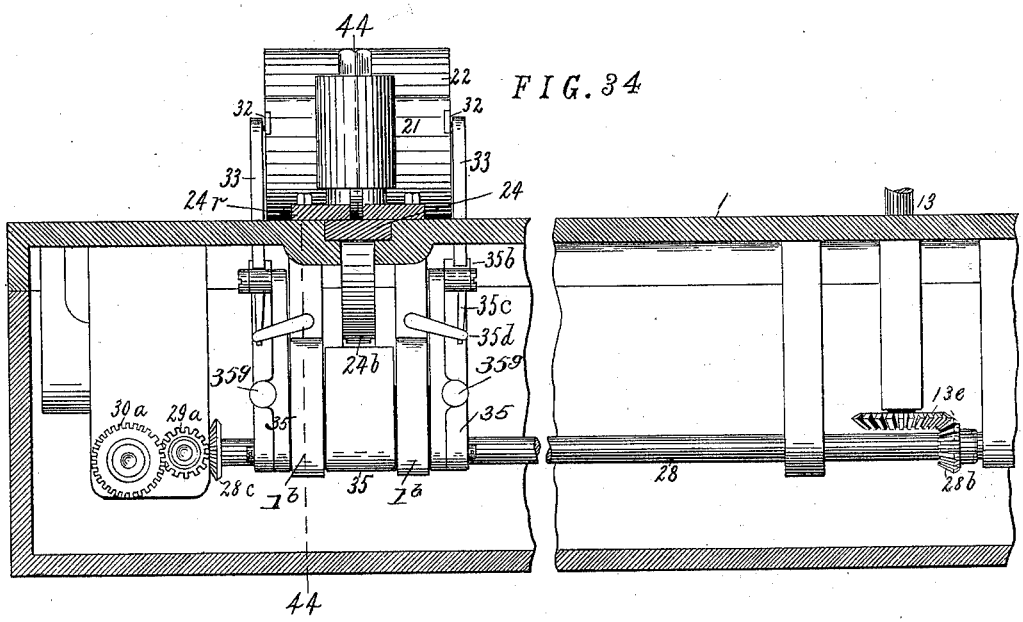
Figure 35:
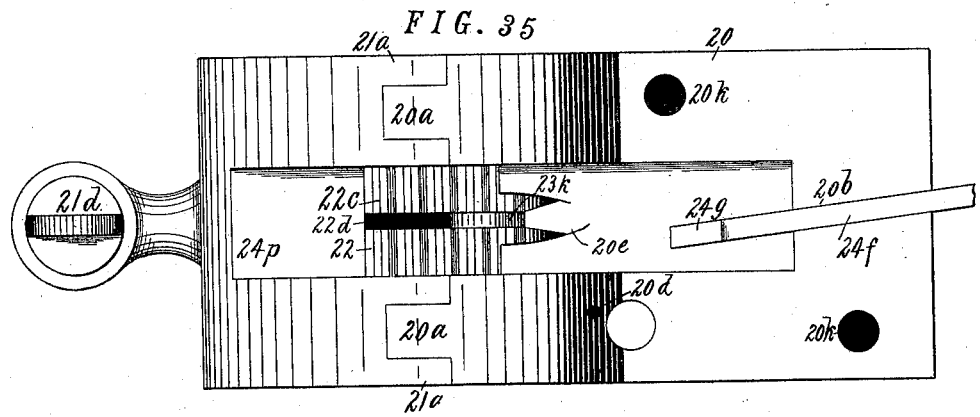
Figure 36:
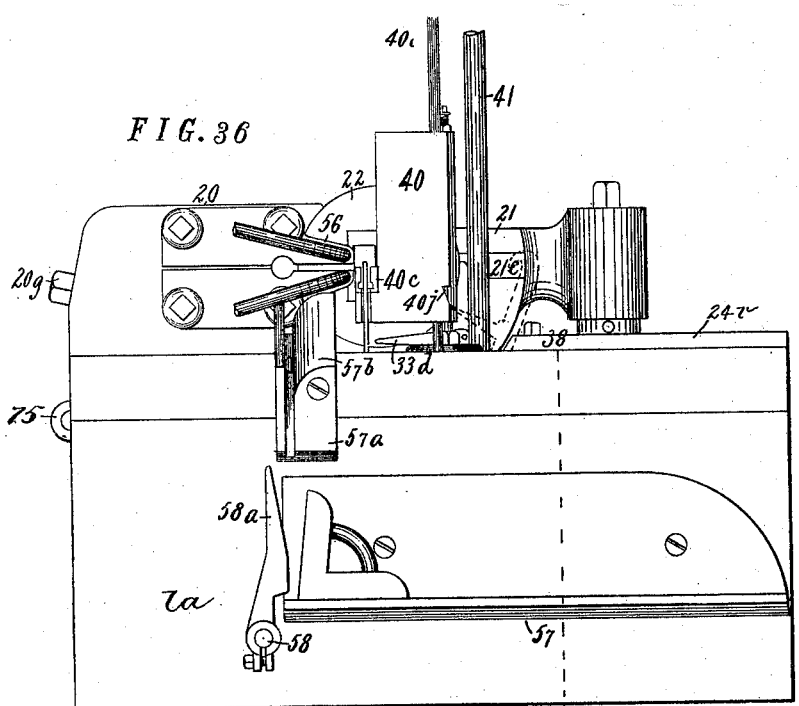
Figure 37:
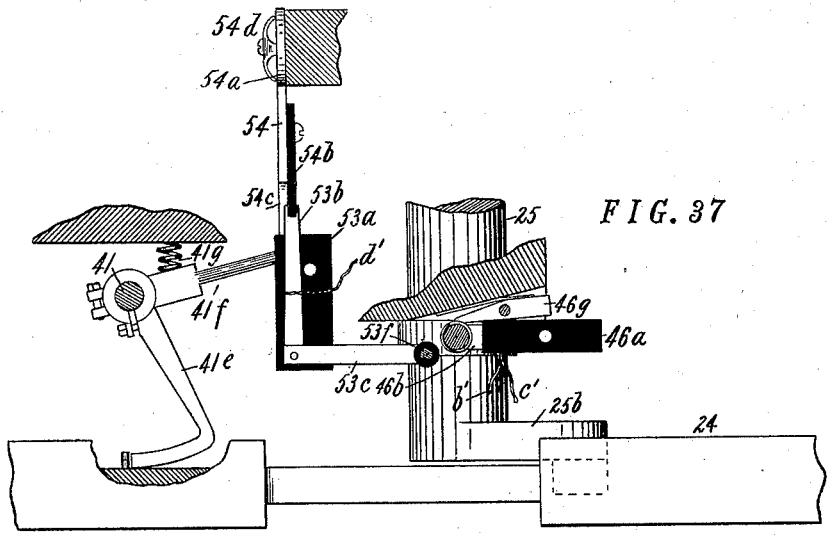
Figure 38:
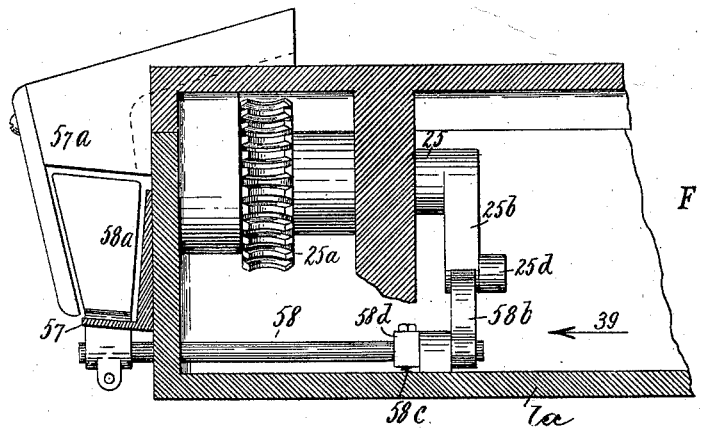
Figure 39:
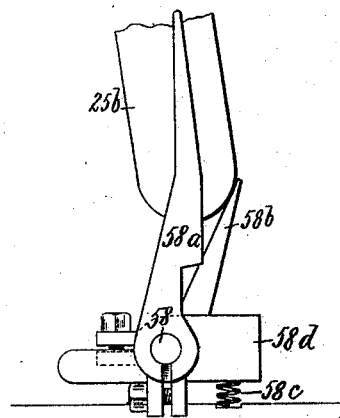
Figure 40:
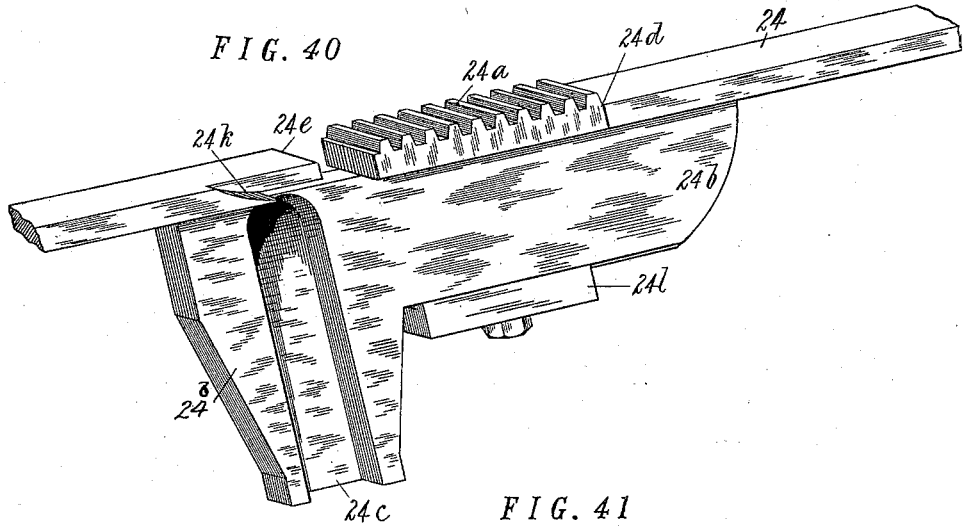
Figure 41:
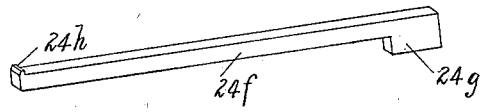
Figure 42:
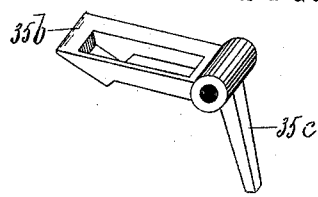
Figure 43:
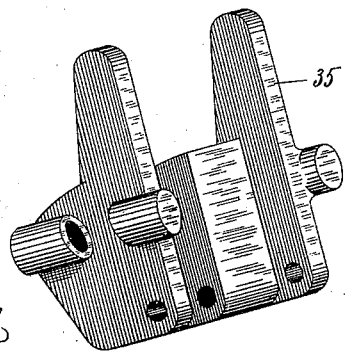
Figure 44:
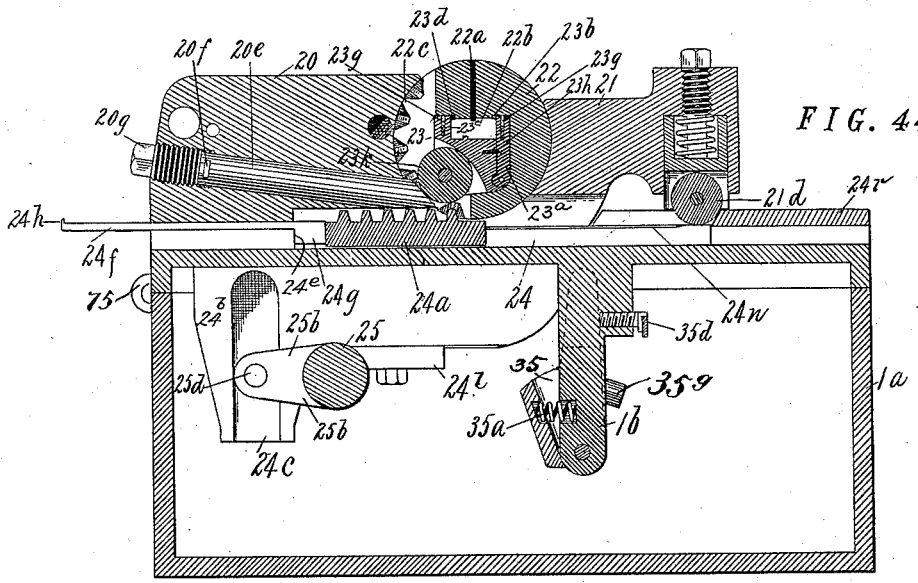
Figure 45:
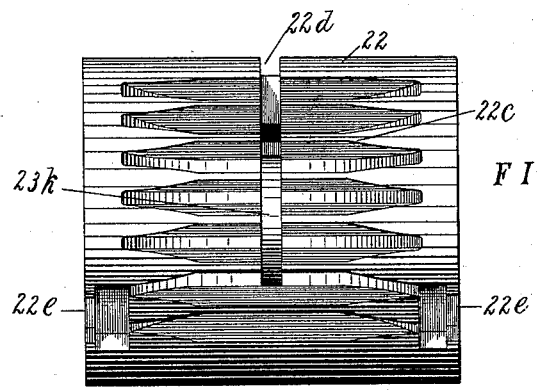
Figures 49, 50:
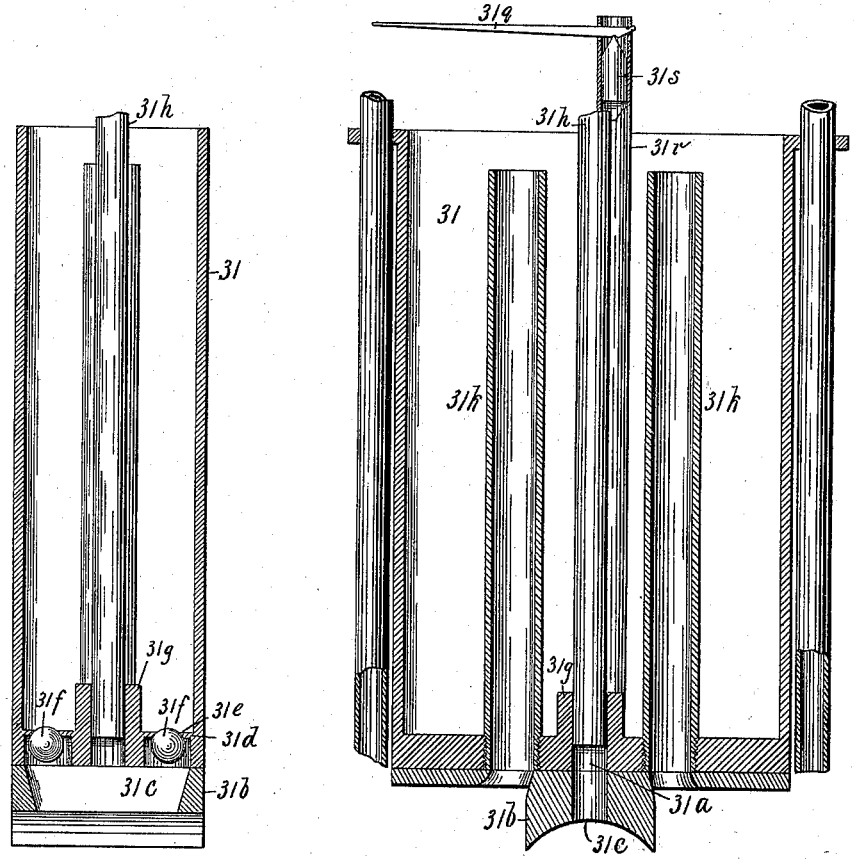
Figure 54:
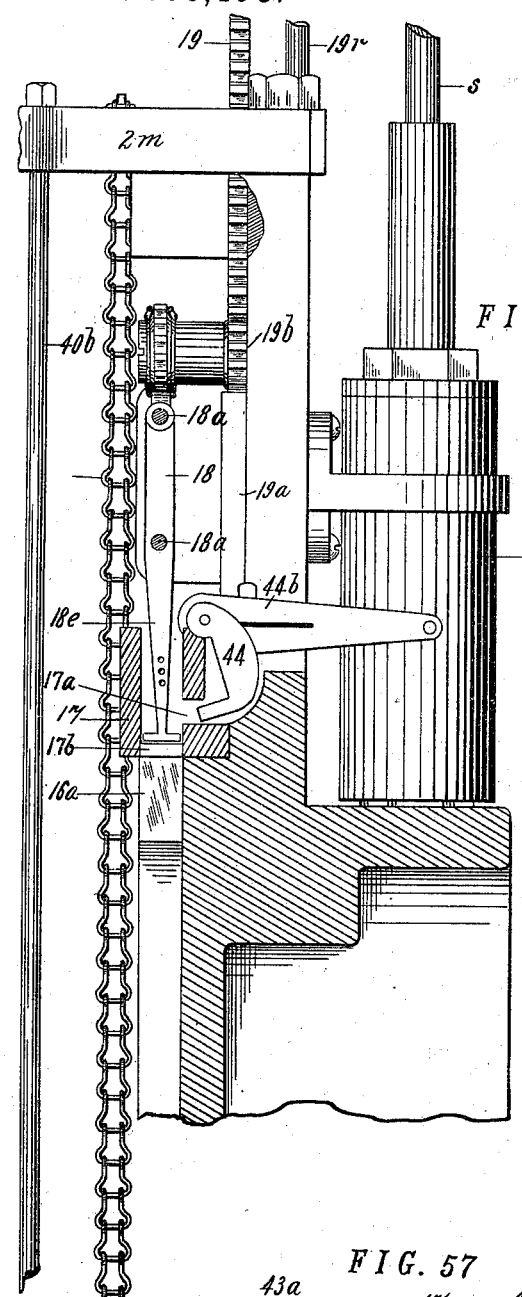
Figure 56:
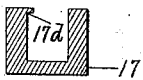
Figure 55:
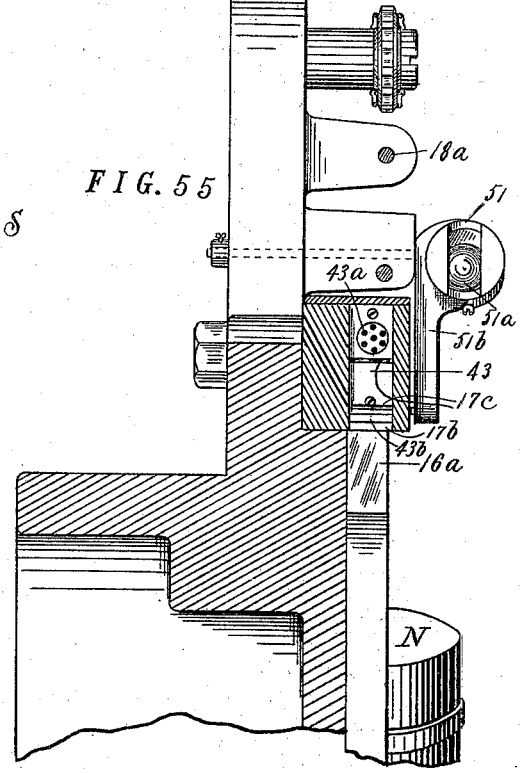
Figure 57:
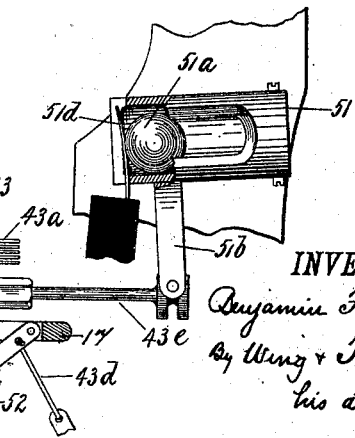

28 is a view of the casting-box from the right side. Fig. 29 is a vertical section of the mold and the fixed clamping-jaw on line 29 of Fig. 32. Fig. 30 is a transverse vertical sectional view of the fixed mold clamping-jaw on the dotted line 30 of Fig. 32. Fig. 31 is a top view of the mechanism for upholding and releasing the piston 46. Fig. 32 is a plan view of the left side of the bed and parts supported thereby, the melting-pot being removed. Fig. 33 is a sectional view through the bed on line 33 of Fig. 32. Fig. 34 is a sectional view through the bed on line 34 of Fig. 33. Fig. 35 is a bottom view of the mold and two clamping-jaws. Fig. 36 is a view of the left end of the bed, casting-box, and elevator. Fig. 37 is a sectional plan view on line 37 of Fig. 30 with shift-rod-operating mechanism included. Fig. 38 is a sectional view on line 38 of Fig. 36, showing the galley and the mechanism for conducting the type-bar thereto and advancing it along said galley, the casting-box being removed. Fig. 39 is a view, looking in the direction of arrow 39 in Fig. 38, of the mechanism for advacing the type-bar in the galley. Fig. 40 is a perspective view of the slides and rack for operating the mold. Fig. 41 is a perspective view of the sliding bar which transmits the motion of the said slide to the rack. Fig. 42 is a perspective view of one of the pawls $35^b$. Fig. 43 is a perspective view of the block 35. Fig. 44 is a sectional view through the casting-box and bed on line 44, Fig. 34. Fig. 45 is a bottom view of the mold. Fig. 46 is a front view of the melting-pot. Fig. 47 is a top view thereof. Fig. 48 is a view of the melting-pot from the left side thereof. Fig. 49 is a sectional view of the melting-pot on line 49 of Fig. 48. Fig. 50 is a vertical sectional view on line 50 of Fig. 46. Fig. 51 is a rear view of the upper end of the upright frame member. Fig. 52 is a top view of the upright frame member and the parts carried thereby. Fig. 53 is a rear view of the lower part of the upright frame member. Fig. 54 is a vertical sectional view through the upper end of the upright member on line 54 of Fig. 52, looking to the left. Fig. 55 is a similar section, looking to the right. Fig. 56 is a vertical section through the distributing-trough. Fig. 57 is a front view of the gate-keeper and governor, the front side of the distributing-trough being removed. Fig. 58 is a side view of the upper portion of the frame and elevator, looking from the left. Fig. 59 is a vertical section of the upper dashpot. Fig. 60 is a view of the right side of the elevator. Fig. 61 is a plan view of the switchback and the parts connected thereto. Fig. 62 is a vertical sectional view of the switchback and parts adjacent thereto on line 62 of Fig. 51. Fig. 63 is a view from the left of the mechanism for returning the switchback to its normal position. Fig. 64 is a longitudinal section of one of the magnets used in the machine. Fig. 65 is a transverse section thereof. Fig. 66 is a view from the left of the elevator and the parts just below it having to do with making and breaking the elevator-magnet circuit. Fig. 67 is a plan view of the parts shown in Fig. 66 for making and breaking the elevator-magnet circuit. Fig. 68 is a side view of the melting-pot, showing the heating device and the magnet for operating the valve for supplying the burners with gas. Fig. 69 is a sectional view of the valve in the gas-pipe for supplying the burners. Fig. 70 is a perspective view of one of the door-opening levers. Fig. 71 is a top view of the mold when the type-slot is up. Fig. 72 is a perspective view of one of the key-levers. Fig. 73 is a perspective view of one of the type-shearing knives removed from the machine and viewed from the right. Fig. 74 is a sectional plan view in the plane indicated by line 74, Fig. 33, showing the assembling-trough, the mold, elevator, chute, and galley. Fig. 75 is a detail view of the connection between the left door-opening lever 33, the arm $33^d$, pivoted thereto, and the spring for moving the latter.

*General construction.*—The two principal members of the frame are the bed 1, Fig. 1, and an upright member 2, which is secured to the top of the bed. On the front side of the upright member are formed, first, the magazines 3, in which the matrices are stored when not in use; second, the assembling-channels 7, which lie beneath and in open communication with the lower ends of the magazines and which converge and are merged together, forming, finally, a single channel which I call the "assembling-spout" $7^a$; and third, the distributing-channels 16, which lie above the open ends of the magazine. The distributing-channels converge from their lower ends upward, being successively merged together until at the extreme upper end of the distributing system all of the channels have been merged together to form one channel, which I call the "distributing-spout" $16^a$; or, to describe the distributing system in the reverse order, it is made up of channels which diverge from top to bottom and which are repeatedly subdivided by partitions $16^b$ until there are formed as many distributing-channels as there are magazines. At the upper end of each of the partitions which divide said channels a gate or switch is placed, whereby either of the branches formed by said partition may be placed into communication with the channel of which it is a branch.

The magazines 3 are vertical channels which are either cut into the front face of the upright member or formed by securing to the face of said member the dividing-partitions $3^a$, Fig. 8. These grooves are of such size that the matrices lie therein, edge foremost, the bottom of each matrix resting on the top of that one next below it, and the lowest matrix in each magazine is supported upon a part of the escapement with which said matrices are released singly.

A plate $g^2$, Fig. 2, preferably made of glass, is secured over the front of the magazines and assembling and distributing channels by means of the bolts $2^j$, thereby inclosing them.

Supported on the bed with the right end just below the assembling-spout is the assembling-trough 8, Fig. 1, the left end of this trough being in line with the opening to the mold 22, and the matrices, when released from their magazines, fall through said spout into the assembling-trough.

The mold is supported in a cylindrical recess between two jaws 20 and 21, Fig. 32, on the bed at the end of the assembling-spout, and the line of matrices assembled in said trough is moved therefrom into the mold.

The elevator 40, Fig. 1, is supported on guides $40^a$ and $40^b$ at the left side of the machine. It is movable by suitable mechanism from a position in line with the discharge-opening of the mold to a position in line with the distributing-trough. The matrices are pushed out of the mold onto the elevator after the type-bar has been cast and by the elevator are carried up to the distributing-trough.

The melting-pot 31 is supported on the mold and its pump is operated by the elevator.

Supported over the distributing-spout $16^a$, Fig. 1, is the distributing-trough 17, into which the matrices are moved from the elevator and along which they are moved until they drop into the distributing-spout $16^a$, by a device which I call the "propeller."

In the machine as organized a number of electromagnets are employed to actuate different parts of the mechanism. Normally these magnets are inert, because the several electric circuits are broken in one or more places. Means are provided for automatically closing the breaks in said circuits at the proper times and holding them closed long enough for the magnets to perform their several functions.

The electrical current for the magnets is supplied by any suitable generator R, Fig. 26. One wire $r$ of the generator is connected with the metallic framework of the machine by means of a switch $r^2$ and the other wire $r'$ is connected with the two depots 37 and $37^a$. These depots are insulated pieces of metal, which are placed conveniently with respect to the magnets, one on the rear side of the upright frame member near the middle thereof and one in the box $1^a$ below the base. Any magnetic circuit is complete when one wire thereof is electrically connected with the metal of the machine, the other with one or the other of said depots. Two depots are employed instead of one for convenience in wiring and for no other reason.

The driving mechanism for the different parts of the machine are, for most part, supported from the under side of the bed 1, Fig. 1, and the bed is hinged to a box $1^a$ by the hinges 75 like a cover, Fig. 44, thereto, whereby all of the parts which are suspended from the under side of said bed are normally concealed and protected. When said parts need adjustment or repairing, the bed may be swung back on its hinge, thereby exposing said parts.

*Assembling mechanism.*—The escapement for retaining the matrices in the magazine and releasing them singly therefrom consists of two slides $4^a$ and $4^b$, Fig. 24, and their operating mechanism. The slide $4^a$ lies and moves in a horizontal slot $2^c$ in the upright member 2, which slot enters the rear side of the magazine. In a similar slot $2^d$ above the first lies and moves the other slide $4^b$, the distance between the upper edge of said slides being equal, substantially, to the height of a matrix. The rear ends of said slides are connected with the arms of a pivoted lever $4^c$, whereby when said lever is rocked the two slides are moved in opposite directions—that is to say, when one slide is moved so that its forward end enters the magazine the other slide is withdrawn therefrom. When the parts are at rest, the lower slide projects into the magazine, and all of the matrices are sustained by it. The preferred method of connecting the lever-arm to the slides consists in forming in each slide a substantially vertical slot $4^e$, in which the rounded end of said lever-arms lie.

On the rear side of each lever $4^c$ is a substantially horizontal arm $4^d$, which is adapted to be moved upward by a vertically-movable rod 4. This rod 4 is connected with one of the key-levers 5 and is operated thereby. When a key is depressed, the corresponding rod 4 is moved upward against one of the arms $4^d$, thereby operating the corresponding lever $4^c$, so that the upper slide $4^b$ is moved forward until its end projects into the magazine beneath the next to the lowest matrix. The lower slide $4^a$ is drawn backward at the same time and is withdrawn from said magazine just after the upper slide enters it, whereupon the lowest matrix drops out of the magazine. The upper rear edge of each matrix is cut off or beveled and the forward end of slide $4^b$ is beveled to a point so as to facilitate the prescribed movement of said slide beneath the next to the lowest matrix. When permitted to so move, the lever $4^c$ is moved in the reverse direction to that last described by a spring $4^f$, and consequently the lower slide $4^a$ is moved into the magazine and the upper slide $4^b$ is withdrawn, whereupon all of the matrices move down until the lowest matrix rests upon the slide $4^a$.

Mechanism like that just described for sustaining and releasing the matrices is provided for each magazine, and said mechanisms may be wholly independent of each other, and, as a matter of fact, are independent in this, that each rod 4 is caused to operate either of three adjacent levers $4^c$ by means of a shifting device, to be presently explained.

In order that the formation of the slots $2^d$ $2^e$ in the upright frame member for the slides $4^a$ and $4^b$ last described may be comparatively easy and inexpensive, said upright member 2 is formed in three parts, which are bolted together—viz., the part $2^a$, Fig. 1, which lies above the slide $4^b$, the part $2^b$, which lies below the slide $4^a$, and the part $2^c$, which is secured in place between the two parts $2^a$ and $2^b$. Before said part $2^c$, Fig. 24, is so secured the horizontal grooves $2^d$ $2^e$ are formed in the upper and lower sides thereof, respectively. Vertical grooves $2^f$ are formed in the rear side thereof, (the levers $4^c$ lying in said grooves,) and vertical grooves $2^k$ are formed in the front side of the part $2^c$, which grooves form the lower ends of the magazines 3. The grooves $2^d$ $2^e$ for the slides are inclosed on their top and bottom sides, respectively, by the two parts $2^a$ $2^b$ when the part $2^c$ is secured between them.

The lower ends of the vertically-movable rods 4 are connected with the rear ends of the key-levers 5. The key-levers are pivoted on a rod $5^a$, which is supported from the under side of the bed 1. Vertical rods $5^b$ are pivoted to the forward ends of the key-levers and extend up through holes in the bed-plate 1 and finger-pieces $5^c$ are secured on their upper ends. As the front ends of the key-levers are depressed by the operator the rods 4 are moved upward with the result before pointed out. When the finger of the operator is removed, the weight of the rod 4 causes each key-lever to return to its first position.

The shift mechanism with which each rod 4 is moved, so that it may operate either one of three adjacent levers $4^c$, consists of a transversely-movable horizontal bar 6, Fig. 23, through which the upper ends of the rods 4 pass loosely, which bar is supported in horizontal grooves $2^h$ in the sides of the upright member $2^b$. The bar is moved transversely to the right or left by means of two shift-keys $6^a$ (one only shown, Fig. 24) and intermediate mechanism as follows: The shift-key levers are pivoted to the under side of the bed-plate 1. Vertically-movable rods $6^c$ are pivoted to the rear ends of said shift-key levers, respectively. The upper end of each rod is pivotally connected to a lever $6^d$, Fig. 23, which is pivoted to a plate $6^e$. The plate $6^e$ is rigidly secured to the upright frame member by screws $6^m$, which pass through horizontal slots $6^f$ in the said plate $6^e$, whereby the position of said plate may be nicely adjusted. Two of these plates $6^e$ are employed, one on each side of the central vertical plane.

Secured to or formed upon the under side of the bar 6 are two lugs—viz., $6^g$, in which is formed an inclined groove $6^h$, and $6^i$, in which is formed an oppositely-inclined groove $6^j$. Pins $6^k$, which are secured one to each lever $6^d$, lie in the said inclined grooves $6^h$ and $6^j$, respectively. When the shift-key $6^a$ on the right side is depressed, the corresponding lever $6^d$ is rocked, the pin $6^k$ thereon moving upward in the groove $6^j$. This moves the bar 6 to the right such a distance that the ends of all of the rods 4 are brought beneath the lever-arms $4^d$ to the right of those under which they normally lie. When the shift-key is released, all of the parts are returned to their first position by the weight of the rods $6^c$ or other means. When the left shift-key $6^a$ is depressed, the bar 6 is moved to the left an equal distance by the corresponding mechanism.

Although the rods 4 will generally be long and flexible enough to permit them to bend when the bar 6 is moved, it is thought that the connection between each rod 4 and its key-lever should be such that no bending will be necessary. For this reason said rods are connected to the key-levers by a ball-and-socket joint, the balls $4^g$, Fig. 24, being formed on the lower ends of the rods. The rods pass up through loose holes in the ends of the key-levers, and they are held in place by screws $5^d$, which screw into said key-levers from the under side and have cup-shaped ends. The rods $6^c$ are similarly connected with the levers $6^a$.

The assembling-trough 8 begins just beneath the spout $7^a$ and extends therefrom to the left to the mold. The machine as organized and shown in the drawings is designed to produce the type-bar in the same machine which assembles the matrices, wherefor the assembling-trough leads, as stated, to the mold. If, however, it should be desirable to remove the assembled matrices to an independent casting-machine, the trough may extend to any convenient point.

As each matrix drops from the spout into the assembling-trough it must be moved from beneath said spout to make room for the next matrix. To secure this result, a horizontally-movable plunger 9, Fig. 12, is provided, which projects into the right end of said trough. When at rest, this plunger lies just to the right of the spout, but immediately after each matrix falls into the trough the plunger makes a quick movement to the left, pushing the matrix before it until said matrix passes the pawls $8^a$, (see Fig. 20,) which prevent the matrix from moving backward. These pawls are pivoted on vertical pivots to the sides of the trough and project a short distance into the trough. They are forced outward by the matrix in passing them, but are pressed inward behind the matrix by springs $8^b$ when the said matrix has passed.

The plunger is operated after the fall of each matrix by an electromagnet A, Fig. 12, the circuit of which is completed by the matrix itself through suitable mechanism to be presently explained.

The electromagnet A is secured to a bracket $9^a$, which is secured to the vertical member of the frame. A longitudinally-movable rod $45^b$ passes centrally through the core of the magnet and is connected with the armature. It is arranged to thrust against a lever $9^d$, which is pivoted at one end to the bracket $9^a$, while the other end is pivotally connected with the plunger 9. A spring $9^e$ acts upon the lever to move it in the direction contrary to that in which it is moved by the action of the magnet.

One wire of the magnet A is connected with the depot 37. The other wire $a'$ of the electromagnet A is connected with an insulated contact-block $9^f$, which is secured in the piece of hard rubber or other insulating material $9^g$. (See Figs. 12 and 13.) Another piece of metal $9^h$, which for convenience of construction is secured to said insulating material, is in contact with the metal of which the bracket $9^a$ is composed. Secured to this metallic piece $9^h$ is a thin flexible metallic spring $9^k$, which projects into the assembling-trough just beneath the spout. This spring lies normally above and out of contact with the contact-block $9^f$, but each matrix as it drops falls onto said spring and forces it into contact with said block $9^f$, thereby completing the circuit of the magnet A. The magnet thus attracts its armature, the rod $45^b$ thereupon moving the lever $9^d$, with the result of moving the plunger 9 forward as described. As the matrix is forced forward by the plunger it moves off of the spring $9^k$, which being released flies up out of contact with the block $9^f$, thereby breaking the electric circuit of the magnet A, whereupon the plunger is drawn back by the action of the spring $9^e$. This action is repeated each time a matrix falls.

In order to hold the matrices in a compact line and to prevent them from falling over, a detent 10, Figs. 15 and 16, projects normally into the trough through a slot $8^c$ in its bottom and lies just to the left of the spout $7^a$. The detent is subject to the action of a spring $10^a$, Fig. 9, which tends to return it to the above-described position when it has been moved therefrom. The detent is the upturned end of an arm $10^b$, which is rigidly secured to a rod $10^c$, Fig. 15. This rod is movably supported in a hole $20^h$, Fig. 30, in the fixed mold-jaw 20 and in a hole in the upright member 2, (see Fig. 9,) and it is susceptible of considerable longitudinal movement and of small oscillatory movement on its axis. In the construction shown a single spring $10^a$ causes both of the described movements of the detent-rod, the construction being as follows, (see Fig. 9:) The rod is hollow and contains a long coil-spring $10^a$, the inner end of which is fastened to the rod. The outer end of the spring is secured to a stationary hook $14^r$ on the switch-box. When the detent is moved to the left, the spring is forcibly expanded. When the detent-rod is turned as the detent is moved out of the trough 8, the spring is twisted. When permitted so to act, the spring draws the detent-rod backward—i. e, to the right—and at the same time turns it upon its axis, whereby the detent is automatically drawn to its original position, as above described.

In the end of the detent is a spring-pawl $10^d$, Fig. 15, which, when the detent is pushed down out of the trough 8, automatically flies beneath the front edge of the slot $8^c$ in the bottom of said trough, thereby holding the detent down until the said pawl is pushed out of engagement with said trough. On the under side of the trough, in front of the slot therein, is a rib $8^e$, Fig. 15, which engages with the front edge of the pawl $10^d$. Near the spout $7^a$ this rib is inclined toward the edge of the slot. (See Fig. 20.) Therefore as the detent is drawn toward the right this rib pushes back the pawl $10^d$ until it is freed from its engagement with the bottom of the trough, whereupon the detent, under the influence of the spring $10^a$, swings up into the trough.

A claw 11 is secured to a rod $11^a$. (See Figs. 12, 14, 15, and 16.) The rod is mounted in bearings, in which it is both longitudinally and axially movable. The bearing of the rod $11^a$ is a sleeve $9^m$, which is a part of the bracket $9^a$. A coil-spring $11^b$ surrounds the rod $11^a$ in said sleeve. One end of the spring is connected with the sleeve, the other end with the rod. Therefore when the rod is moved longitudinally the spring is compressed, and when the rod is moved axially the spring is twisted. When the parts last described are in their normal position, as shown in Fig. 12, the claw is out of the trough and in the plane of the assembling-spout $7^a$, as shown in Fig. 8. The end of the claw is bifurcated, and when the claw-rod is moved axially to bring the claw behind the matrices in the trough one end of the claw enters the trough through the slot $8^d$ in its front side, while the other end passes over the top of said trough. Pivoted to the claw is a spring-pawl $11^c$, having a hook on its end, which is adapted to automatically engage with the rear side of the trough and thereby hold the claw in the trough, as shown in Fig. 14. While the claw is being moved to this position, the pawl $11^c$ slides against the bottom of the trough. The purpose of this claw is to move the assembled matrix-line to the left to a position to be engaged by the push, to be presently explained. When the matrices to form a line have been assembled in the trough, they lie between the detent 10, Fig. 16, and the pawls $8^a$, Fig. 20. The operator grasps the claw by its handle $11^d$, Fig. 16, and turns it up into the trough, the pawl $11^c$ engaging with the rear side of the trough, as described. (See Fig. 14.) He then moves the claw to the left, pushing the matrix-line and the detent before it until said claw passes a drop-pawl $8^f$, Figs. 16 and 20, which is pivoted to the trough 8, which pawl falls behind the lower arm of the claw and prevents the backward movement of said claw. The detent 10 and the claw 11, with the line of matrices between them, are now in positions shown in Fig. 16.

On the rear side of the trough is placed a releasing device, (see Figs. 15 and 19,) which is adapted to release the hold of the pawl $11^c$ on the trough, whereby the spring $11^b$ automatically withdraws the claw from the trough and returns it to its original position. This releasing device is a lever 11ᵍ, Fig. 19, pivoted to the rear side of the trough in a position where it is adapted to engage with the end of the said pawl, and one end of this lever projects above the top of the trough in a position to be struck by the push 12. The lever is held in the described position by a spring 11ᵉ. When the lever is moved downward by the push-arm, it strikes the pawl 11ᶜ and releases it, whereupon the claw, under the influence of the spring, returns to its first position.

When the parts are in the position shown in Fig. 16, the matrix-line is justified.

When the line of matrices has been justified, it is moved along the assembling-trough into the mold, which is placed at the end of said trough, by means of a device which I call the "push" 12. The push lies normally outside the assembling-trough, but it may be moved into the trough and then pushed along therein for the purpose specified. This push 12, as shown in the drawings, Fig. 15, is a radial arm which is secured to the push-rod 12ᵃ, and it has a cross-bar 12ᵇ on its end, which enters the trough 8 behind the matrices. The push-rod is loosely mounted in bearings in the vertical member and in a hole 20ˡ in the fixed mold-clamping jaw 20, whereby said rod is susceptible of longitudinal movement and of so much movement on its axis as will permit the push to be moved from its normal position, as shown in Figs. 14 and 16, into the trough, as shown in Fig. 15.

Surrounding the push-rod 12ᵃ, Figs. 9 and 22, is a loose sleeve 12ᵈ, having an annular flange 12ᵉ, which lies in a recess between the bracket 9ᵃ and the upright member 2, whereby longitudinal movement of the sleeve is prevented. There is a tongue-and-groove connection between the said sleeve and push-rod, whereby both turn upon their axis in unison. An arm 12ᶠ is secured to said sleeve, and the purpose of said arm is to engage with an arm 10ᵉ on the detent-rod 10ᵃ and thereby turn said detent-rod and withdraw the detent from the trough. A rack 12ᵍ, Fig. 9, is formed on the push-rod, and a pinion 13ᵃ engages with said rack. The pinion is loosely mounted on a vertical shaft 13, Fig. 22, which is itself mounted in suitable bearings in the bed and in the upright member 2, and the shaft is constantly driven by mechanism to be hereinafter described. The pinion rests on a collar 13ᵇ, which is secured to said shaft. A clutching device is provided, whereby the said pinion is automatically connected with said shaft at the proper time by the action of an electromagnet B. There are also in the machine other clutching devices substantially like that I am about to describe. I shall employ the same reference letters and numerals to designate similar parts in all of them, wherefore it is believed that the description of this device will serve as a description for them all. (See Fig. 22.)

The shaft 13 is hollow. A sleeve T is loosely mounted on said shaft, and it has fastened to it a pin $t$, which passes through a longitudinal slot $t'$ in the shaft into the cavity therein. A longitudinally-movable rod $t^2$ is placed in said cavity between a coil-spring $t^3$ and said pin $t$, which spring exerts its force to move said rod against said pin and thereby hold the sleeve T normally out of contact with the pinion 13ᵃ. The proximate faces of said pinion and sleeve T have shoulders which are adapted to interlock when brought into contact, whereby the pinion will be driven. On the other side of the pin $t$, but in contact therewith, is another rod $t^4$, which is in line with the rod 45ᵇ, Fig. 53, of the electromagnet B. The rod $t^4$ may be a part of the rod 45ᵇ, as with the particular clutch now being described, or it may be separate from but in line with said rod, as in the elevator-clutch. (See Fig. 27.) A magnet for operating each of the clutches is fixed to the frame of the machine in a position where, when its armature is attracted, the rod $t^4$ is forcibly moved by the rod 45ᵇ against the pin $t$, whereby the sleeve T is moved into engagement with the independently-revoluble part—as in the present case, the pinion 13ᵃ—thus connecting the pinion and shaft. When the magnet becomes inert, the spring $t^3$ acts to move the sleeve away from said pinion.

The push-rod 12ᵃ, Fig. 9, is hollow, and it contains a long coil-spring 12ᵐ, which is connected at its inner end to the rod and at its outer end with a fixed hook 14ʲ. This spring is expanded when the push-rod is moved to the left, and when the push-rod is released, after completing its movement, this spring draws it back to its normal position. In the end of the push 12 is a slot in which the pawl 12ⁱ, Fig. 16, is pivoted, and a spring-pressed pin 12ʲ, Fig. 9, which lies in a socket in the push, bears against said pawl with sufficient force to cause it to remain in whatever position it may be moved to. This pawl may lie wholly in said slot, and does so lie when the push enters the mold to push out the slug and matrix-line. When the push is returned to its normal position by its spring, an angle-arm 12ᵏ, Fig. 16, which is secured to the right end of the pawl, strikes a pin 12ⁿ, which projects to the left from the upright frame member, thereby moving the pawl on its pivot and causing it to project out from said slot. The pawl is intended to strike the right mold-door and release it from its engagement with the assembling-trough. When the door closes, a shoulder 32ᵈ on said door engages with said pawl and pushes it back into the slot in the push.

To the right of the assembling-spout is a switch-box 14, Figs. 1, 2, and 6, which is supported on the bed. Most of the movable parts which are supported by this switch-box are secured to the rear side of its front plate 14ᵇ, Fig. 10, which is a rear view of the switch-box with the rear plate removed.

A switch 14$^a$ is pivoted to the plate 14$^b$, near the right end thereof. The left end of said switch hangs normally a little below a horizontal rib 14$^d$, which is formed on said plate 14$^b$, but it is free to swing on its pivot within certain limits, which are determined by the slot 14$^v$ in the plate 14$^b$ and the pin 14$^e$, (shown in dotted lines in Fig. 10,) which is secured to the switch and plays in said slot. The full lines in Fig. 10 show this switch in its normal position, while the dotted lines show the same when at the other limit of its movement. The left end of the switch is pointed, the lower edge thereof being straight, and the lower edge coincides with the lower edge of the rib 14$^d$ when the switch is in its raised position. The purpose of the switch is to turn the push-rod on its axis to lift the push out of the assembling-trough when the rod is being drawn to the right by its spring. This result is secured by means of an arm 12$^h$, Fig. 9, which is fastened to the push-rod. When the push-rod is turned from its normal position to bring the push into the trough, this arm 12$^h$ is at the right of the switch 14$^a$ and does not therefore strike it. When the push-rod is moved to the left, this arm passes under the switch 14$^a$, which is thereby lifted to the position shown in the dotted lines in Fig. 10. After the arm has passed it the switch falls by gravity to the position shown by the full lines in said figure, and during the rest of its movement to the left the arm 12$^h$ engages beneath the lower edge of the rib 14$^d$. When the push-rod is moving to the right, this arm 12$^h$ rides up the inclined top edge of said switch, thereby turning the push-rod on its axis.

A lever 14$^f$ is pivoted to the rear side of the plate 14$^b$, near the upper left-hand corner thereof, and it extends below said rib 14$^d$, terminating in a hook-like formation 14$^h$. An arm 14$^g$ is rigidly connected with said lever 14$^f$ and extends to a point where it may engage with one end of the spring 14$^p$ and draw it out of contact with the wire $b'$ $c'$.

An arm 14$^k$ is pivotally connected with the lever 14$^f$, near the middle thereof, and said arm extends therefrom to the right, its end projecting below the lower edge of the switch-box. This end has a hook 14$^l$ opening to the left, and the back or right side of said hook is beveled, so that the arm 12$^h$ in moving toward the left may lift the arm 14$^k$. The arm 14$^k$ rests upon the rib 14$^d$ above a loosely-pivoted pawl 14$^m$, which may be easily pushed up out of the way by the arm 12$^h$ in moving to the left. When the arm 12$^h$ is moving toward the right, it strikes the pawl 14$^m$, said pawl swings against the arm 14$^k$, covering the hook in its end, and both are lifted out of the way by the arm 12$^h$ in passing.

It is necessary that the lever 14$^f$ shall remain in whatever position it may be moved to, and to secure this result a little pin 14$^n$ is inserted into its end and pressed by a small spring 14$^s$ against the back plate of the switch-box, thereby acting as a friction-brake to hold said lever against accidental movement.

The spring 14$^p$ is an electrical switch, which is connected with the wire $b'$ $c'$, and when the spring touches the wire $b'$ $c'$ one break in the circuit of two electromagnets B and C is closed. The lever 14$^f$ and the parts secured thereto constitute the preferred switch-operating mechanism.

A cylindrical mold 22, Fig. 28, lies and is movable in a horizontal cylindrical socket between the fixed clamping-jaw 20 and the pivoted clamping-jaw 21. The jaw 20 is secured to the bed by screw-bolts which enter the threaded holes 20$^k$, (see Figs. 27 and 35,) and the jaw 21 is provided with ears 21$^a$, Figs. 28 and 35, which are pivoted, by means of pivot 21$^b$, to ears 20$^a$ on the jaw 20. The mold-socket between the two jaws is not a complete cylinder, being opened at the top side. This opening is closed by the nozzle of the melting-pot 31, Fig. 33, which rests upon the mold. In the bottom of the melting-pot nozzle is an opening 31$^a$, Fig. 50, through which molten metal may be injected into the type-slot 22$^a$, Fig. 44.

The mold 22 is a cylindrical block, through which is formed a longitudinal opening or recess 22$^b$, extending from end to end. This recess contains the movable matrix-clamp 23, and when the mold-clamp is in place there is between it and the mold a recess (in line with the assembling-trough) adapted to receive the assembled matrix-line. In the mold is formed a radial slot 22$^a$, which passes from without inward to said recess and extends from one end of the mold to the other. On the outer periphery of the mold, midway between its ends, are formed the gear-teeth 22$^c$, Fig. 45, by means of which a moving rack 24$^a$, Fig. 44, may oscillate said mold. A transverse slot 22$^d$ divides said teeth and extends into the recess 22$^b$.

The matrix-clamp 23 is provided on its rear side with a shelf 23$^c$, Fig. 29, onto which the matrices slide. On the edge of this shelf is a flange 23$^d$, which extends in front of the lower edge of the matrices. A lid 23$^a$ is pivoted to the top front edge of the clamp 23 and extends therefrom rearward over the shelf 23$^c$. On its rear edge is a depending flange 23$^b$. When the matrices are resting on the shelf 23$^c$, the lid rests on their upper ends and the flanges 23$^b$ 23$^d$ extend over their edges. On the rear face of the clamp is a rib 23$^f$, which enters the notches 15$^b$ in the matrices, and thereby prevents the matrices from falling over as they enter the mold. The face of the mold which is opposed to the matrices when they are in the mold is a plane surface, against which the matrices are pressed by the clamp-matrix 23, and the type-slot enters through said face opposite the impression-line on the matrices.

Spring-pressed pins 23$^g$, seated in sockets in the matrix-clamp and edge of the lid, press against the side of the mold in which said slot is formed, and thereby exert their force to move the clamp 23 forward away from that side of the mold. A coil-spring $23^h$, which lies between the lid and clamp, being seated in sockets therein, exerts its force to move the lid and clamp apart. Thus when these pins and spring act as described the clamp 23 is moved in two directions, so as to release the matrices from engagement with the type-bar and permit them to be removed from the mold. This movement of the matrix-clamp is slight, but it is sufficient for the described purpose.

A roller $23^k$ is pivoted to the matrix-clamp and extends into the transverse slot $23^d$, Fig. 45, in the mold, which divides the teeth $22^c$. Pressure on this roller tends to move the matrix-clamp in opposition to the spring-pins $23^g$ and spring $23^h$, thereby clamping the matrices in the mold.

An adjustable bar $20^e$, Fig. 44, extends through the fixed clamp 20, and its end projects into the slot $22^d$, Fig. 45, in the mold, where it may engage with the roller $23^k$. The end of this bar is cam-shaped, whereby as the mold is turned an increasing pressure is applied to the roller $23^k$ to move the matrix-clamp. In order that this bar $20^e$, Fig. 44, may be adjusted so as to move the matrix-clamp 23 just the right amount, a T-slot is formed in its rear end, and the T-head $20^f$ of a bolt $20^g$, which screws into and out of the clamp 20, lies in said slot.

A roller $21^d$ is mounted in the front end of the pivoted mold-jaw, and it rests upon the top of the slide 24, riding in a groove $24^n$. This groove ends near the front of the slide, the bottom of said groove inclining up to the level of the top face of the slide. When the slide is near its rear position, this beveled surface at the end of the groove moves under the roller, thereby lifting it and moving the jaw, so as to clamp the mold between it and the fixed mold-jaw.

The rack $24^a$ is seated in a depression in the top edge of the movable slide 24. This slide is mounted in a groove, the bed-plate being held in place by the gibs $24^r$, (see Fig. 34,) below the casting-box. The slide is provided with a fin $24^b$, Fig. 40, which projects downward through a slot in the bed. In one side of the fin is a substantially vertical groove $24^c$, Fig. 44, into which a crank-pin $25^d$ projects. Therefore when the crank-shaft 25, to which said pin is connected, revolves once the slides moves backward and then forward, making one complete movement.

The slide 24 in the first and last parts of its movement performs certain functions connected with the opening and closing of the mold-doors which will be presently explained. Therefore it is desirable that the said slide may in the first and last parts of its movement be able to move a short distance independent of the rack $24^a$, Fig. 44. To secure this result, the rack is made shorter than the distance between the shoulders $24^d$ $24^e$ on the slide between which it lies.

In the under side of the fixed mold-jaw is formed a groove $20^b$, Fig. 35, which is oblique with respect to the path traveled by the slide 24. In this groove lies a sliding bar $24^f$, Fig. 44, having on its front end a finger $24^g$, which may lie between the rear end of the rack and the shoulder $24^e$, and does so lie during a greater part of the movement of said slide. When the slide is moving toward the front end of its path, the shoulder $24^e$ engages with the finger $24^g$, which is thereby pushed forward, and since it engages with the rack $24^a$ said rack is likewise moved. In moving forward said bar $24^f$ is likewise moved sidewise, because of the obliquity of the groove $20^b$, in which the bar $24^f$ lies, until it reaches a position where it permits the slide to pass it, said slide being cut away at $24^k$, Fig. 40, to sooner permit said passing. When this point in the movement of the finger is reached, it stops, the rack stops, and consequently the mold stops, while the slide proceeds alone until it reaches the forward end of its path, where it is stopped in the manner to be described, having reached the end of its complete movement. When it begins its next movement, by moving backward, it moves alone until the shoulder $24^d$ strikes the rack. The rack is then pushed backward, and it, pushing upon the finger $24^g$, moves the bar $24^f$ back. In its backward movement in the oblique groove said finger enters between the rear end of the rack and the shoulder $24^e$. From the foregoing description it will be seen that at the beginning of its backward movement and at the end of its forward movement (which are respectively the beginning and ending of its separate excursions) the slide moves, while the rack and consequently the mold remains stationary. The rear end of the bar $24^f$ projects rearward beyond the fixed mold-jaw, and it is provided with a shoulder $24^h$, Fig. 44, which, by engaging with said mold-jaw, limits the forward motion of said bar.

In the ends of the mold are grooves $22^e$, Fig. 45, which when the mold is in position to receive and discharge the matrices are in line with similar grooves $21^e$, Fig. 28, in the ends of the movable mold-jaw 21. These grooves are adapted to receive the sliding mold-doors 32, Figs. 33 to 71. The length of these doors is equal to the diameter of the mold, and when they are closed and lie wholly in said grooves $22^e$, Fig. 45, the doors cover and close the ends of the type-slot and the ends of the character-line on the matrices, while at the same time they offer no impediment to the oscillation of the mold. On each of the doors is a pin $32^a$, Fig. 33, which is adapted to be engaged by a hook $33^a$ on one of the door-opening levers 33. The right door is somewhat loosely fitted in the grooves $22^e$ and $21^e$, and is therefore susceptible of side motion therein. When the door is opened, a spring $32^b$, Fig. 32, which lies in a socket in the mold 22, pushes the door to the right when it is opened, so that the rear end engages with the assembling-trough, (see Fig. 74,) and thereby the door is held open until such engagement is discontinued by the pawl $12^i$, Fig. 8, in the end of the push.

The door-opening levers 33, Fig. 33, are pivoted to ears $1^b$, which depend from the under side of the bed-plate, and said levers project upward through slots in the bed. Between the two levers, a block 35, Figs. 34 and 43, is pivoted in the same axial line. This block is in front of a shoulder, Fig. 44, on the fin of the slide 24, and when the said slide is moved forward, the said shoulder strikes the block and swings it forward, while a spring, or springs, $35^a$, which lies in a socket in an ear $1^b$, thrusts against said block and exerts its force to move it backward. Pivoted to the sides of said block near its upper end are the pawls $35^b$. (See Figs. 33, 34, and 42.) These pawls have slots in them through which the door-opening levers loosely pass. These pawls are adapted to fall by gravity into engagement with shoulders $33^b$, Fig. 70, on the door-opening levers. Rigid with each pawl is an angle-arm $35^c$, Fig. 33, which is adapted to engage with the fixed shoulder $35^d$, Fig. 34, when the block 35 is moved forward, thereby lifting said pawl out of engagement with said shoulders $33^b$.

Pivoted to the left-door-opening lever 33, Fig. 33, is an arm $33^d$, which when the said lever is drawn forward to open the door is moved upward by the spring $33^g$ and engages with the elevator. The backward movement of said lever, and consequently the closing of said left door, is thereby prevented until the elevator ascends.

A lever 36, Fig. 28, is pivoted to the right side of the fixed mold-jaw 20. The front end of said lever is forked, one arm lying above the other. In the end of each arm $36^a$ is a friction-roller $36^b$, which when the mold is in position to receive and discharge the matrices bear against the end of the mold; but when the mold has been turned to the position to receive the molten metal into its type-slot said friction-rollers bear against the right door 32, forcing it against the matrix-line, which line is thereby compressed. A strong spring $36^c$, Fig. 32, presses the forked end of the lever against the mold and mold-door.

Underneath the bed are several shafts, all of which are mounted in posts which project downward from the under side of the bed. The shaft 27, Fig. 27, is the driving-shaft, and it may carry an electric motor $27^b$. A connecting-shaft 28 is connected with shaft 27 by gears $27^a$ $28^a$. Near the middle of this shaft 28 is a bevel-gear $28^b$, which meshes with a bevel-gear $13^e$ on the lower end of the vertical shaft 13, Fig. 22. At the left end of shaft 28, Fig. 27, is a bevel-gear $28^c$, which meshes with the bevel-gear $29^c$ on the elevator-shaft 29.

A gear $29^a$ on the elevator-shaft meshes with a gear $30^a$, which is loosely mounted on the mold-shaft 30. On the shaft 30 is a worm $30^b$, which engages with and drives the worm-wheel $25^a$, Fig. 33, on the crank-shaft 25.

It will be seen that the shafts 28, 29, and 13 are driven constantly by the driving-shaft 27. The shaft 30 is revolved only when the pinion $30^a$ is connected with said shaft 30. This connection is made by means of a clutch, which is similar in construction and mode of operation to the clutch on shaft 13—that is to say, a sleeve T is moved on the shaft 30 against and away from the pinion $30^a$ by an electromagnet C and a spring-pressed pin $t^3$, Fig. 22, respectively. The sleeve T and pinion $30^a$, Fig. 33, have interlocking faces, whereby when they are in contact both revolve together. In the details of construction this clutching mechanism is exactly that heretofore described for connecting the shaft 13 and pinion $13^a$, and the parts are similarly lettered, wherefore the former description will apply to this clutching mechanism.

A sprocket-wheel $29^b$, Fig. 27, is loosely mounted on the elevator-shaft. A clutching mechanism is provided for connecting said sprocket-wheel and shaft. This clutching mechanism, which is substantially like the other clutching mechanism described, is actuated by the electromagnet D.

On the end of the crank-shaft 25, Fig. 33, is an arm $25^b$, Fig. 44, which carries the crank-pin $25^c$. This crank-pin enters the groove $24^c$ in the fin of the slide 24.

The elevator 40, Fig. 2, is guided by two vertical guide-rods $40^a$ $40^b$, Fig. 66, which are secured at their lower ends to the bed and at their upper ends to a bracket $2^m$ on the upright frame member. The elevator is provided on its rear side with a trough $40^c$, Figs. 36 to 58, which when the elevator is at its lowest position is in line with the left opening to the mold, whereby the matrix-line may be pushed out of the mold into the elevator-trough. At the outside (left) end of the trough are the shoulders $40^d$, (shown in Fig. 32,) which prevent the matrices from being pushed out of said end. Projecting into the trough from the front side thereof is the rib $40^e$, Fig. 60, which when the matrices are pushed into the trough enter notches $15^a$ in the matrices, and thus prevent the matrices from falling over.

A sprocket-chain $40^g$, Fig. 2, passes under the sprocket-wheel $29^b$, Fig. 27, and over a sprocket-wheel $40^f$, Fig. 2, which is mounted on the upper end of the upright frame member, and said chain lies and operates in the vertical grooves $40^h$, Fig. 32, in the elevator. The elevator is fastened to the sprocket-chain, whereby as the chain is moved by the revolutions of the sprocket-wheel $29^b$ the elevator is raised until its trough is in line with and close to the distributing-trough 17, Fig. 5.

The distributing-trough 17 is secured to and extends horizontally across the upper end of the frame. On its front edge is an inwardly-directed rib $17^d$, (see Fig. 56,) which enters the notches $15^a$ in the matrices and prevents them from falling over. In the bottom of the distributing-trough is an opening $17^b$, Fig. 54, directly over the distributing-spout, through which the matrices drop one by one into said spout.

Extending horizontally across the machine above the distributing-trough are two guide-rods $18^a$, Fig. 5, on which the propeller 18 is mounted, so as to be movable across the machine. The propeller is connected with the lower leg of the sprocket-chain $18^b$, which extends around the two sprocket-wheels $18^c$ $18^d$, which are pivoted to the frame. The propeller-arm $18^e$ is adapted to enter the elevator-trough and the distributing-trough and to push the matrices from the former into and along the latter. The propeller is operated by a rack-slide 19, Figs. 54 and 52, which is movable vertically in suitable guides $19^a$ on the face of the upright frame member. On the edge of this rack-slide is a rack, which engages with a pinion $19^b$, which is rigidly connected with the left sprocket $18^c$. When the rack-slide is raised, it revolves said pinion and sprocket, with the result of drawing the propeller to the left until it reaches the position shown in Fig. 5, and when the rack is released it falls by gravity and revolves the sprocket in the contrary direction, thereby causing the propeller to move to the right, pushing the matrices out of the elevator and into and along the distributing-trough 17.

Pivoted to the front face of the rack-slide is a trip-lever $19^c$, Fig. 7, which projects into the path of a lug $40^k$, Fig. 58, on the elevator, into which position it is drawn by the spring $19^d$. (See Fig. 7.) A trigger-piece $19^e$ is pivoted to said slide-rack. One arm $19^f$ of this trigger-piece engages beneath a shoulder $19^k$ on the lever $19^c$, and thus prevents the turning of said lever on its pivot when the elevator strikes it. A second arm $19^g$ of the trigger-piece is adapted to be struck by a finger $19^h$, (see Fig. 5,) which is fixed to the upright member, when the slide-rack has reached the limit of its upward movement, thereby turning said trigger-piece $19^e$ and releasing the lever $19^c$. This lever then turns on its pivot out of engagement with the elevator and the slide-rack falls by gravity. A spring $19^m$, Fig. 7, exerts its force to move the trigger-piece automatically into engagement with the shoulder $19^k$ on the trip-lever.

Upon the upper end of the slide-rack is pivoted an arm $19^n$, Figs. 58 and 59, which is adapted to strike the end of the piston-rod $s$ of the dash-pot S when the slide-rack has nearly reached its lowest point. This arm $19^n$ is prevented from swinging upward for the time being by a pivoted latch $19^p$, which falls by gravity behind said arm. There is a post $19^r$ fixed to the upright member, against which the latch engages, and as the dash-pot piston settles down gradually the said post lifts the latch $19^p$, permitting the arm $19^n$ to swing up and pass the dash-pot piston-rod. When the slide-rack is raised, the arm $19^n$ falls by gravity to the horizontal position, and the latch also falls by gravity behind it.

41, Fig. 1, represents a shift-rod which extends through the base 1 up to the bracket $2^m$ on the upper end of the upright frame member, and it is mounted in bearings in said bed and bracket which permit it to oscillate on its axis. This shift-rod lies in front of the right side of the elevator. Secured rigidly to this shift-rod are four arms, as follows: First, the arm $41^a$, which is near the upper end of said rod and carries a pawl $41^b$, (see Figs. 1, 2, and 58;) second, the arm $41^c$, Figs. 46 and 47, having a pin $41^d$, which enters a slot in the percussion-lever $31^t$, which operates the pump-piston $31^h$; third, the arm $41^e$, Figs. 37 to 67, which lies below the bed in a position to be struck and moved by the mold-slide 24 just before said slide reaches its most rearward position, this arm being subject to continual pressure from the spring $41^g$ to move the shift-rod in the direction contrary to that in which it is moved by the slide; fourth, the arm $41^f$, the end of which engages with and operates the electrical switch-lever $54^c$ and thereby makes a break in the electrical circuit of the elevator-magnet. (See Figs. 37, 66, and 67.)

The melting-pot 31, Figs. 49 and 50, may be of any suitable shape. On its lower side is a nozzle $31^b$, containing a chamber $31^c$, from which the molten metal is discharged through the slot $31^a$. The chamber $31^c$ is separated from the main chamber of the pot by a horizontal partition $31^d$, through which are one or two or more holes $31^e$, which are adapted to be closed by the steel balls $31^f$, which float in the metal in the said nozzle-chamber $31^c$.

In the melting-pot is a pump-cylinder $31^g$, which communicates at its lower end with the nozzle-chamber $31^c$. The pump-piston $31^h$ extends up and out through the top of the melting-pot. A connecting-rod $31^i$, Fig. 1, is pivoted at its ends to the upper end of said piston and to a lever $31^j$, which is pivoted to the upright frame member at a point where its free end will be engaged by a lug $40^i$, Figs. 5 to 60, on the side of the elevator.

Two or more draft-tubes $31^k$, Fig. 50, open at both ends, extend up through the melting-pot, whereby they are surrounded by the molten metal therein. A gas-burner $31^m$, Fig. 48, is supported at the foot of each draft-tube, whereby the heat and products of combustion of said burner pass upward through said draft-tubes.

In the main pipe $31^n$, Figs. 68 and 69, which supplies the gas-burners, is a valve $31^p$, which valve is operated by the electromagnet P. A link $31^y$ connects the armature of the magnet P with a crank-arm $31^z$ at the valve-stem. The circuit of this magnet is completed when the lever $31^q$ touches the end of the wire $p$, Fig. 26. This lever is moved to make this connection by a thermostat connected with the melting-pot. The form of thermostat employed consists of a tube 31$^r$, Fig. 48, which extends up through the molten metal. The tube contains mercury, and on the surface of the mercury is a float 31$^s$, upon which the lever 31$^q$ rests. One end of said lever is fulcrumed to said tube. A percussion-lever 31$^t$, Figs. 46 and 47, is pivoted by a horizontal pivot to the upper end of the pump-piston. One end of this lever lies beneath a bracket 31$^x$, Fig. 2, which is secured to the upright frame member and serves as the fulcrum of said lever. In the lever is a slot 31$^u$, into which the pin 41$^d$ projects. When the shift-rod 41 is turned, it, by reason of the described connecting mechanism, turns the piston upon its axis until the end of the percussion-lever lies in the path of the elevator. When the elevator falls, it strikes the said lever 31$^t$, and the blow causes the quick downward movement of the piston and the consequent injection of molten metal into the type-slot 22$^a$.

In the bottom of the distributing-trough 17, Fig. 5, directly over the distributing-spout 16$^a$, there is an opening 17$^b$, through which the matrices fall one by one for distribution. Just below the distributing-spout are the diverging distributing-channels 16. These channels increase in number from the top downward, said increase being due to the fact that at intervals the channels are subdivided by partitions 16$^b$. These partitions lie at an angle to one another, diverging from the top downward.

At the upper end of each partition a switch 16$^c$ is pivoted to the upright frame member, whereby by moving said switch the channel on either side of the said partition may be placed into communication with the channel which said partition divides. The subdivision of the distributing-channels by diverging partitions from top to bottom is repeated until there are as many channels as there are magazines, and the open upper end of each magazine is below the end of a corresponding distributing-channel. The switches are arranged in rows, and the number of switches in the rows necessarily increases from the upper end downward. Each switch is rigidly secured to a shaft 16$^d$, (see Fig. 51,) which shaft passes through the upright frame member, in which it is journaled. A crank-arm 16$^e$ is rigidly secured to the rear end of each switch-shaft. All of the arms 16$^e$ which are connected with the switch-shafts in any row are pivotally connected with a bridge-bar 16$^f$.

From the foregoing description it appears that when any switch is turned all of the other switches in the same row must turn at the same time. One switch-shaft in each row has secured to it an operating-arm 16$^g$, and these operating-arms are severally connected by means of the links 16$^h$ with the armatures of the electromagnets E, F, G, H, I, J, and K.

Normally all of the switches are at their left position, being moved to and held in said position by the several armatures, which are moved from their magnets by springs 45$^d$ (see Fig. 64) when the magnets become inert; but it is clear that by turning the proper row or rows of switches any one of the magazines may be placed into communication with the distributing-spout.

In the distributing-trough, near the right end thereof, is a sliding block 43, Fig. 57, which I call the "gate-keeper." Passing horizontally through it from left to right are as many insulated metallic pins 43$^a$ as there are rows of switches and magnets for operating them. In the present case there are seven pins, which are set in insulating material with their left ends in the same vertical plane. These pins are susceptible of small longitudinal motion, and they are forced forward— i. e., to the left—by the spring-wires 43$^h$, Fig. 52, which connect them with the rows of magnets E to K, Fig. 51. This provision for moving the pins is made to insure that all of the pins shall be brought into metallic contact with the matrices which are intended to touch them. Secured to the bottom of the gate-keeper is a gate 43$^b$, Fig. 57, which lies beneath the left ends of the pins 43$^a$. When the gate-keeper is at the left of its path, the said gate covers the opening 17$^b$ and the ends of said pins lie about over the center of said opening. The rear (right) ends of the pins are connected severally with the wires $e$, $f$, $g$, $h$, $i$, $j$, and $k$, Fig. 26, of the magnets E, F, G, H, I, J, and K by small spring-wires 43$^h$, Figs. 51 and 52. Two bars 17$^e$, Fig. 57, extend across the distributing-trough from the front to the back side thereof, just over the right end of the opening 17$^b$. The purpose of these bars is to prevent the matrices from moving to the left beyond the opening 17$^b$.

The gate-keeper is moved backward and forward by a toggle 43$^e$, which is pivoted at one end to the gate-keeper and at the other end to the trough 17. The toggle is connected by means of the link 43$^d$, Fig. 5, with the armature of the magnet N. When the magnet is energized, the toggle is flexed, thereby drawing the gate-keeper to the right, and when the magnet-circuit is broken and the armature is retracted by the spring 45$^d$ the toggle is straightened, thereby moving the gate-keeper to the left. When the gate-keeper moves to the right, the opening in the distributing-trough is uncovered and that matrix which is above said opening falls through it into the distributing-spout.

In order to prevent any matrix except the right-hand matrix from falling through said opening, a device, which I call the "pinch," is provided for impinging against the next matrix and holding it immovable while the first matrix is falling. This pinch is a curved arm 44, Fig. 54, which is rigidly secured to a rock-shaft 44$^a$, Figs. 5 to 52. This rock-shaft is mounted in bearings 17$^e$, secured to the distributing-trough. The pinch enters a hole in the rear side of the distributing-trough just at the left end of the opening 17$^b$. Secured to the rock-shaft is the operating-arm 44$^b$, and this arm is connected by two links 44$^c$ and 44$^d$, Fig. 51, to the armatures of the two electromagnets L and M.

The matrices 15 are small rectangular pieces of metal, Figs. 17 and 18, each having the character-depression 15$^a$ in its rear edge. Near the upper end of each matrix one or more transverse holes 15$^c$ are made, said holes being placed in one or more of the seven positions shown on the matrices in Fig. 17. These positions correspond to the positions of the seven pins 43$^a$ carried by the gate-keeper 43, and the purpose of these holes is to prevent the matrix when it is moved against the pins from completing the magnetic circuits in which those pins are connected which directly face the holes. The holes are large enough to permit the pins to enter them without coming in contact with the matrix. It is apparent that there may be many different combinations and arrangements of said holes in said matrices, and in point of fact the machine contains as many different kinds of matrices as there are magazines. The matrices vary in thickness in their body parts, in which parts the character-depression is formed, in accordance with the width of said characters; but the upper parts of all of said matrices are of the same thickness, the right side of said matrices being cut away substantially as shown to produce this result. This right side is the side which is moved against the pins 43$^a$, and the matrices are cut away as described to make them of equal thickness at their upper ends, so that when any matrix is in contact with the pins the next matrix will be in position to be engaged by the pinch.

Before proceeding further in the description of the different parts of the machine I will describe the electromagnets, the electric circuits, and the means for completing and interrupting said circuits.

The magnets may be of any suitable construction; but I have found that the magnet shown in the drawings has characteristics which especially adapt it for use in the described machine. The construction is clearly shown in Figs. 64 and 65. The core 45$^a$ is hollow, and a rod 45$^b$ is movable freely through it. The armature 45$^c$ is secured to one end of this rod. A spring 45$^d$, contained in a recess in the core, exerts its force to move the armature away from the core. The magnet is contained in a case 45$^e$, which case is secured to the machine in a suitable manner. As previously stated, the circuits of these magnets are severally completed when one pole thereof is electrically connected with the metallic frame of the machine and the other pole is electrically connected with one or the other of the two depots 37 and 37$^a$, Fig. 26. The circuits of all of the magnets are consequently inert, because one or more breaks are made therein either between the magnet and the depot or between the magnet and the machine, or both, and mechanism is provided for automatically closing these breaks and thereby energizing the several magnets.

In Fig. 26 the electric circuits are shown diagrammatically, and especial attention is directed to this figure in connection with the following description. The magnet B is the push-rod magnet, and its function is to operate the clutching device which connects the pinion 13$^a$ with the revolving shaft 13. This magnet is secured to the rear side of the upright member in such position that its rod 45$^b$, Fig. 53, enters the hole in the shaft 13 and is connected with (that is to say, is a part of) the rod $t^4$. The magnet C, Fig. 27, is the casting-box magnet. Its function is to operate the clutch which connects the mold-shaft 30 with the revolving pinion 30$^a$. It is secured by a strap to the under side of the bed, and its rod 45$^b$ bears against the end of rod $t^4$ of the clutch. One wire $b'$ of the magnet B and one wire $c'$ of the magnet C extends to a point just below the fixed mold-clamp 20, Figs. 30 and 37, where they are secured to the insulated block 46$^a$. A spring 46$^b$ lies between these two wires and it is adapted to be moved into contact with either. This spring is connected with the machine, whereby the electrical connection with the machine may be made for either magnet B or C, depending upon whether the spring 46$^b$ is in contact with one or the other of said wires $b'$ or $c'$. This spring 46$^b$ is moved by a piston 46, which is movable vertically in a recess 20$^j$ in the fixed mold-jaw 20, the end of said spring 46$^b$ lying between the two shoulders 46$^c$ and 46$^d$ on said piston. The piston-socket intersects the recess 20$^h$, in which the detent-rod 10$^c$, Fig. 9, moves. On the piston is a disk 46$^e$, Fig. 30, under which the pointed end of the detent-rod passes, thereby lifting the piston and causing the spring 46$^b$ to touch the wire $c'$ of the casting-box magnet C. When the piston is thus lifted, a spring-actuated lever-arm 46$^g$ moves beneath its lower end and upholds it until said arm is pushed out of the way by the beveled shoe 25$^d$ on the end of an arm 25$^c$, which is secured to the crank-shaft 25. When the arm 46$^g$ is thus pushed out from under the piston 46, said piston falls, thereby moving the spring 46$^b$ out of contact with the wire $c'$ into contact with the wire $b'$.

The wires $b$ and $c$, Fig. 26, from the magnets B and C are united to form the wire $b\ c$, which wire goes to the switch-box 14. A wire $b'\ c'$, which is connected with the depot 37$^a$, also extends to the switch-box, where it is connected with the insulated spring 14$^p$. When this spring is released by the arm 14$^g$, Fig. 10, it springs into contact with the wire $b\ c$, Fig. 26, and the connection is made between both magnets B and C and the depot. This connection being made, the circuit of the magnet B is completed when the spring 46$^b$ is in contact with wire $b$, and the circuit of magnet C is completed when said spring is in contact with the wire $c$.

D, Fig. 27, is the elevator-magnet, and its function is to operate the clutch which connects the sprocket-wheel $29^b$ to the elevator-shaft 29. It is secured below the base in such position that its rod $45^b$ engages with the end of the rod $t^4$ of said clutch. One wire $d$ of this magnet is connected with the depot $37^a$, while the other wire $d'$ is set into the insulating-block $53^a$. This block is secured to the under side of the bed below the elevator, Figs. 66 and 67. Secured to this insulated block is a piece of metal having two spring-arms $53^b$ $53^c$. The former arm lies beneath the wire $d'$ and, if permitted to do so, springs up into contact with the said wire. The other spring-arm $53^c$ normally presses upward against some portion of the machine, as the pin $53^d$. (See Fig. 30.) A piston $53^e$ is vertically movable in a socket $20^d$ in the fixed jaw-clamp 20, which socket intersects the hole $20^i$, through which the push-rod $12^a$, Fig. 9, passes, and the said piston enters said hole and is pushed down by said push-rod. On the lower end of this piston, Fig. 30, is a piece of insulating material $53^f$, which lies above and in contact with said spring-arm $53^c$. Consequently when said piston is pushed down by the push-rod said spring-arm is pushed out of engagement with the pin $53^d$.

Pivoted to the under side of the bed is a lever 54, having three arms. (See Figs. 37 and 66.) One arm $54^a$ passes up through the bed and may be swung so as to enter the left end of the elevator-trough. Another arm $54^b$ is made of insulating material, and it lies above and in contact with the spring-arm $53^b$. When the said lever is rocked so that the arm $54^a$ enters the elevator-trough, the other arm $54^b$ presses down upon the spring-arm and withdraws it from contact with the wire $d'$. A friction-spring $54^d$ surrounds the pivot of said lever 54 and presses upon said lever, so that it remains in whatever position it may be moved to. The third arm $54^c$ has a beveled surface at $54^e$, which surface is adapted to be engaged by an arm $41^f$, which is secured to the shift-rod 41, Fig. 1, the result of such engagement being to rock the lever 54 and cause the arm $54^a$ thereof to enter the elevator-trough. The shift-rod 41 is moved to produce said result by the spring $41^g$, Fig. 67. As before stated, another arm $41^e$ is secured to said shaft and projects to a point where the slide 24, Fig. 37, will engage with it when near the front end of its path of travel, thereby moving said shift-rod in opposition to the spring $41^g$.

The magnets E, F, G, H, I, J, and K, Fig. 51, operate the several rows of switch-gates $16^c$. The construction, connection, and mode of operation of all of these magnets is the same. They are secured in a substantially vertical position to the rear side of the upright frame member. One wire $e$, $f$, $g$, $h$, $i$, $j$, and $k$, respectively, of each magnet is connected with the depot 37. The other wires are branched, and one branch $e'$, $f'$, $g'$, $h'$, $i'$, $j'$, and $k'$ are connected severally with the several pins $43^a$ on the gate-keeper, while the other branches $e^2$, $f^2$, $g^2$, $h^2$, $i^2$, $j^2$, and $k^2$, respectively, are connected with the springs $49^e$, $49^f$, $49^g$, $49^h$, $49^i$, $49^j$, and $49^k$. (See Fig. 62.) When a matrix touches any one or more of the pins $43^a$, the connection between the corresponding magnet or magnets and the machine is completed through the matrix itself. The armatures of these magnets being connected, respectively, with the links $16^h$, the rows of gates, which are severally operated by the movement of said links, are swung. For example, if a matrix having four holes $15^c$ is moved into contact with the pins $43^a$, three of said pins only will be touched by the matrix. The circuits of the three corresponding magnets will be completed and the three magnets will be energized, with the result of swinging the three corresponding rows of gates. Whenever any matrix is moved against the bunch of pins, all of the magnets which are connected with whichsoever of the pins said matrix touches will be energized by the completion of their circuits and the corresponding rows of gates will be swung. Were this connection made by the matrix the only one made for said magnets, said connection would be broken as soon as the matrix dropped away from said pins into the distributing-spout, and as a result the gates might swing back to their normal positions before the matrix had reached its proper magazine. To prevent this action, the wires $e^2$, $f^2$, $g^2$, $h^2$, $i^2$, $j^2$, and $k^2$ are connected, as before stated, with the insulated springs $49^h$, Fig. 62. On the lower end of each magnet-rod $45^b$ is secured a finger $45^f$, which when the armature is attracted is moved into contact with that one of the springs $49^h$ which is beneath it, thereby connecting the said magnet with the machine through said rod $45^b$.

The switchback is a horizontal bar 50, which is pivoted at its ends to the upright frame member below the row of magnets last described. Secured to this bar are as many plates $50^b$ of insulating material as there are springs $49^h$. The ends of said plates lie above the ends of said springs. An arm $50^c$ is secured to said bar, and this arm is connected by means of the link $50^d$ with the armature of the electromagnet O. When the circuit of this magnet is completed, the movement of its armature rocks the switchback on its pivot, and the plates $50^b$ bear down on the springs $49^h$, thereby withdrawing them from contact with the fingers $45^f$. This breaks the circuits of all of the magnets E to K, whereupon the gates return to their normal position. Secured to the insulating-plates $50^b$ is a metallic bar $50^a$. Springs $50^g$ are connected with this bar and extend therefrom rearward to points beneath the fingers $45^f$, so that when any one of said fingers is moved down it strikes not only one of the springs $49^h$, but one of the springs 50ᵍ as well, thereby establishing a metallic (electrical) connection between said bar 50ᵃ and the machine.

The magnets L and M operate the pinch 44. One wire $l$ from magnet L is connected with the depot 37. The other wire $l'$ is connected with the bar 50ᵃ. From the foregoing description it is evident that when any one of the magnets E, F, G, H, I, J, and K is energized and its armature moves down the corresponding finger 45ᶠ by coming in contact with one of the springs 50ᵍ completes the circuit of magnet L, which thereupon attracts its armature, with the result, heretofore pointed out, of operating the pinch and causing it to impinge against the matrix which is next to the front matrix.

One wire $m$ of the magnet M is connected with the depot 37. The other wire $m'$ is connected with the insulated spring 52, which is so placed that when the gate-keeper toggle 43ᶜ is bent to draw the gate-keeper to the right a shoulder 43ᶠ on said toggle comes in contact with said spring and remains in contact with it until said gate-keeper is near to its normal position. The connection between the magnet M and the machine is thus made through the gate-keeper, whereupon the magnet M becomes active and attracts its armature. This holds the pinch in contact with the matrix named heretofore, and this magnet M remains active until the gate-keeper has nearly reached its normal position, which is later than the time when the circuit of the magnet L is broken.

The magnet N operates the gate-keeper. One wire $n$ from this magnet is connected with the depot 37. The other wire $n'$ is connected with an insulated spring 56, (see Fig. 51,) which is secured to the upright frame member 2 below the magnet-rod 45 of the magnet L. When the circuit of said magnet L is completed and the armature moves down, the magnet-rod 45ᵇ touches said spring 56, thereby completing the electrical connection of the magnet N with the machine and completing the circuit of the magnet N. The said magnet thereupon becomes active and attracts its armature, with the result of flexing the toggle 43ᶜ and moving the gate-keeper to the right. When the circuit of magnet L is broken, the rod 45ᵇ thereof moves away from the spring 56, breaking the circuit of the magnet N. This permits the spring 45ᵈ of magnet N to straighten the toggle 43ᶜ and move the gate-keeper to the left.

The magnet O operates the switchback. One wire $o$ from this magnet is connected with the depot 37. The other wire $o'$ is extended to a point to the right of the gate-keeper, where it is connected with the insulated spring 51ᵈ. The governor 51 is in the form of a tube. It is pivoted near its center to the upright frame member, so that it may be rocked to elevate either end. In the tube is a metallic ball 51ᵃ, which as the end of the governor is elevated rolls down to the other end. One end of said governor is slotted, and the spring 51ᵈ is so placed that it enters the slot therein, but does not touch the governor. Secured to the governor is an operating-arm 51ᵇ, which arm engages with and is operated by a rod 43ᵉ, which projects from the right end of the gate-keeper. When the gate-keeper is moved to the right by the action of its magnet, the governor is rocked so as to depress its slotted end. The ball 51ᵃ rolls down to said slotted end, strikes the spring 51ᵈ, thereby completing the circuit of magnet O. The magnet O oscillates the switchback through the mechanism heretofore described. As the switchback moves, it, by engaging with the tops of the springs 49ʰ, draws them away from contact with the fingers 45ᶠ. This breaks the connection of all of the magnets E to K, whereupon the springs 45ᵈ lift the armatures of said magnets, and this returns all of the gates to their normal position. The same movement of the switchback withdraws all of the springs 50ᵍ from contact with said finger 45ᶠ, whereby the connection between the bar 50ᵃ is broken. This breaks the circuit of the magnet L. The spring 45ᵈ in said magnet moves the armature away from said magnet L. Consequently, first, the connection between the rod 45ᵇ of magnet L and the spring 56 is broken, and this breaks the circuit of the magnet N. The armature of said magnet recedes from the core and thereby the gate-keeper's toggle is straightened and the gate-keeper moved to the left of its normal position. Second, when the toggle is straightened, the connection between said toggle and the spring 52 is broken, thereby breaking the circuit of the magnet M. The springs 45ᵈ in magnets L and M rock the pinch-shaft and withdraw the pinch from contact with the matrices. As the gate-keeper moves to the left the governor is rocked, whereupon the ball rolls toward the other end thereof and the connection between it and the spring 51ᵈ is broken. This breaks the circuit of the magnet O and leaves the switchback free to return to its normal position. It is caused to return to said position by a spring 52ᵃ. This spring is inclosed in a barrel 52, which is fixed to the upright frame member. A piston 52ᵇ is movable in this barrel above said spring, and this piston is connected by the link 52ᶜ to the arm 50ʰ on the switchback.

Secured to the left end of the box 1ᵃ is a shelf or bracket 57, Fig. 36, which serves for a galley to receive the type-bars as they are cast. Between this galley and the mold is an inclined chute 57ᵃ, Fig. 32, into which the type-bars fall as they are pushed from the mold. Said type-bars fall down said chute into the galley, in which they stand on one end, with the printing edge out, so that it may be inspected. The front side 57ᵇ of the chute 57 lies close to the elevator-trough. As the matrix-line and type-bar are pushed from the mold the former enters the elevator-trough, while the top side of the latter (on which the characters are formed) rests upon the front $57^b$ of the chute. The bottom of the type-bar being unsupported falls down into the chute. A rock-shaft 58, mounted in suitable bearings on the bottom of the box, passes through the end of the box $1^a$. On the outer end of this rock-shaft is an arm $58^a$, which is adapted to move against the last type-bar which entered the galley and push it and all of the other type-bars forward, so that the next type-bar formed may enter the galley from the chute. On the end of the shaft within the box an arm $58^b$, Figs. 38 and 39, is secured, which arm is adapted to be struck and moved by the crank-arm $25^b$ on the crank-shaft 25. A spring $58^c$, which is interposed between the bottom of the box $1^a$ and an arm $58^d$ on the rock-shaft, returns the rock-shaft to its normal position.

The operation of the machine will now be described. The matrices are released singly from their magazines 3, Fig. 2, as the several escapements are operated by the key-levers 5, Fig. 24. One of the shift-keys $6^a$ is depressed when it is desired to move any escapement-operating rod 4 to the right or left, so that it may engage with and operate the escapements, respectively, to the right and left of that which it operates when in its normal position. As the matrices are released they fall by gravity down the converging assembling-channels 7, Fig. 2, through the assembling-spout $7^a$ into the assembling-trough 8, Fig. 8. They fall onto the spring $9^k$, Fig. 12, and the weight of each matrix forces said spring against the contact-block $9^f$, thereby completing the circuit of the magnet A. The plunger 9, which is operated by said magnet, thereupon pushes the matrix to the left past the pawls $8^a$. In moving to this position the matrix is moved off of the spring $9^k$, which, being released, springs away from the block $9^f$ and the electric circuit is broken. This operation is automatically repeated each time a matrix falls until a line of matrices is assembled. When no more full words or syllables can be added to the line, small spacers are released and assembled until the line is full. A line is known to be full when the left edge of the first or left matrix is in line with the line $8^k$ on the edge of the trough 8. The detent 10, Figs. 14 and 16, projects into the trough during the assembling of the matrix-line and is moved step by step to the left as the matrices are added. When the line is full, the claw 11 is turned up, so as to enter the trough behind said line. The claw is then moved to the left, pushing the matrix-line and detent before it until the drop-pawl $8^f$, Fig. 16, falls behind said claw. The detent-rod $10^c$ in the last part of its movement to the left passes beneath the disk $46^e$, Fig. 30, on the piston 46, thereby lifting said piston and drawing the spring $46^b$ into contact with the wire $c$ of the casting-box magnet. When the piston has been so lifted, the spring lever-arm $46^g$ moves beneath its lower end and holds it up. One of the breaks in the circuit of the casting-box magnet C is now closed. When the matrix-line is in the position shown in Fig. 16, the spacers which were added to the end of the line are rearranged, being placed by hand between the words, if such rearrangement is necessary and desirable. The operator then takes hold of the push 12 and turns it down into its horizontal position, the end of said push entering the assembling-trough behind the matrix-line. In moving to this position the push strikes and moves the lever $11^g$, Fig. 14, which by its movement releases the pawl $11^c$ from engagement with the trough 8, whereupon the claw returns to its normal position. The arm $12^f$, Fig. 22, is likewise moved by the push-rod against the arm $10^e$ on the detent-rod, thereby turning said detent-rod and withdrawing the detent from the trough. The pawl $10^d$, Fig. 14, engages with the bottom of the trough, and the detent is returned to its first position by the spring $10^a$. The operator then moves the push to the left, pushing the matrix-line into the mold. At this time the left door has been closed sufficiently to cover the end of the space into which the matrices are pushed. When the matrices are in the mold, the pawl $12^i$, Fig. 16, in the end of the push strikes the right door, Fig. 28, and pushes it out of engagement with the assembling-trough, whereupon said door is closed or partly closed by its operating-lever 33, and in this movement the door pushes the pawl-arm back into the slot in the end of the push. The operator then releases the push, and the push-rod is moved by its spring backward until the arm $12^h$, Fig. 9, on said rod engages with the hook $14^i$, Fig. 10, at the switch-box and draws backward upon it. This moves the switch-lever $14^f$ and arm $14^g$, which is fastened thereto, thereby permitting the electric switch-spring $14^p$ to move into contact with the wire $b'$ $c'$. This completes the circuit of the casting-box magnet, which magnet thereupon operates the clutch which connects the shaft 30, Fig. 27, with the pinion $30^a$. This causes the shaft 30 to revolve, and this movement is transmitted, through the worm $30^b$, Fig. 33, and worm-wheel $25^a$, to the crank-shaft 25. A slow revolution of the crank-shaft follows, which revolution results in the backward-and-forward movement of the slide 24, Figs. 40 and 44. The first backward movement of the slide withdraws the shoulder $24^l$ from contact with the block 35, which block thereupon, under the influence of its spring $35^a$, swings backward. This movement of the block permits the springs $33^c$ to move the levers 33 and completely close the mold-doors. The springs $33^c$ are coil-springs which lie in the barrels $35^g$, which are attached to the block 35, and these springs thrust against the levers 33 to move them in the direction to close the mold-doors. At the same time the pawls $35^b$, Fig. 33, are permitted to drop into engagement with the shoulders $33^b$ on the levers 33, so that when the block is subsequently swung forward said levers are likewise moved. The further movement of the slide causes the shoulder $24^d$ to engage with the rack $24^a$, which rack is thereupon moved backward by the slide. The movement of the rack turns the mold in its socket between the two clamping-jaws 20 and 21 until the type-slot $22^a$ is in communication with the nozzle of the melting-pot. During this movement of the mold the elevator has remained upheld in line with the distributing-trough by means of the pawl $41^b$, Fig. 58, on the arm $41^a$, which is attached to the shift-rod 41. Just the instant before the slide reaches its rear position it strikes the lever $41^c$, Fig. 37, which is attached to said shift-rod, thereby turning said shift-rod and accomplishing two results, as follows: First, the pawl $41^b$ is withdrawn from engagement with the elevator, thereby permitting the elevator to fall by gravity; second, the arm $41^c$, Figs. 46 and 47, moves the percussion-lever $31^t$ into the path of the elevator. Upon the withdrawal of the pawl $41^b$ from engagement with the elevator the elevator falls upon the lever $31^t$ and by the percussion suddenly moves the pump-piston $31^d$ downward and forces the molten metal into the type-slot. Just before the slide has reached its rearmost position the inclined forward end of the groove $24^n$, Fig. 44, in the top of the slide 24 moves beneath the roller $21^d$ on the front end of the pivoted mold-jaw 21, thereby moving said mold-jaw and causing it to clamp the mold and hold it firmly for the instant during which the molten metal is forced into the type-slot. As the rack moves backward it pushes against the finger $24^g$ on the oblique bar $24^h$ and moves it backward. In its forward movement the finger enters between said rack and the shoulder $24^e$. When the slide 24 begins its forward movement, it pushes upon the finger $24^g$, and it moves the rack directly, which rack turns the mold backward. When the mold has reached its normal position, the finger $24^g$ on the oblique bar $24^h$ has moved from between the rack and shoulder $24^e$, whereupon the rack stops and the slide proceeds alone to its normal position. During this latter movement the shoulder $24^l$ strikes the block 35 and swings it forward. By reason of the connection with the pawls $35^b$, Fig. 33, engaging with the door-operating levers 33 said levers are moved forward with the result of opening the doors. The right door springs out into engagement with the assembling-trough and is thereby held open until released in the manner hereinbefore stated. The spring-arm $33^d$ on the left door-opening lever flies up in front of the elevator, which in the meantime has descended to its lowest position, the further forward movement of the block causing the arms $35^c$ on the pawls $35^b$ to strike the fixed shoulders $35^d$ and thereby lift the pawls out of engagement with the door-opening levers, leaving them free to operate independent of the movement of the block. When the slide 24 began its forward movement, it moved away from the arm $41^e$ on the shift-rod, whereupon the spring $41^g$, operating upon the arm $41^f$, turned the shift-rod until the pawl $41^b$ engaged with the elevator-guide $40^a$. This moves the percussion-lever $31^t$ of the melting-pot out of the path of the elevator, which elevator thereupon falls to the lowest position, preferably striking the piston 60 of the dash-pot to relieve the jar. On the crank-shaft is an arm $25^b$, having on its end a beveled shoe $25^c$, (which arm stands when the crank-shaft is at rest in the position shown in Fig. 30,) which shoe strikes the spring-arm $46^g$ and pushes it from beneath the piston 46, which piston thereupon falls, thereby forcing the spring $46^b$ into contact with the wire $b$, and this completes the circuit of the push-rod magnet B. The crank-shaft stops directly after the arm $46^g$ has been pushed from beneath the piston, as described, the mold having at that time been returned to its normal position. (See Fig. 33.) This magnet B operates to connect the pinion $13^a$ with the revolving shaft 13, and thereupon the push-rod is moved to the left. The push enters the mold, pushing the matrices into the elevator-trough and pushing the type-bar out of the mold past the shearing-knives 56 into an inclined chute $24^a$, in which chute the type-bar slides to the galley 54. The shearing-knives are bolted to the left side of the fixed mold-clamp and extend forward therefrom, one of said knives lying just over and one just below the end of the type-slot $22^a$. As the type-bar is pushed endwise from the slot it passes between said knives, which trim and smooth down the sides of said type-bar. Two tubes $56^a$ are connected with said knives, and the shavings from the type-bar enter said tubes and are by them conducted away. The pointed end of the push-rod moves over the piston $53^e$, thereby pushing it downward against the spring-arm $53^c$. This breaks temporarily the electrical connection between said spring-arm and the machine. When the matrices enter the elevator-trough they strike the lever-arm $54^a$ and move the lever 54, thereby withdrawing the insulated arm $54^b$ of said lever from its engagement with the spring-arm $53^b$, which arm is permitted to move into contact with the wire $d'$. When the push-rod has reached the position in which the type-bar and matrices are wholly removed, as described, from the mold, the arm $12^h$ on said rod strikes the hook on the lever $14^f$ at the switch-box, thereby moving said lever and causing the arm $14^c$ to withdraw the spring out of contact with the wire $b'$ $c'$. This breaks the connection of the push-rod magnet B, (also magnet C,) whereupon the push-rod spring $12^m$ draws the push-rod back to its normal position. In moving to this position the push-rod withdraws itself from engagement with the piston $53^e$, whereupon the spring-arm $53^c$ moves up into contact with the machine, thereby completing the circuit of the elevator-magnet. As the push-rod continues its movement to the right the arm 12$^h$ strikes the pawl 14$^m$, pushing it so as to cover the hook 14$^i$, and the link 14$^k$ is lifted, permitting said arm 12$^g$ to pass. Said arm strikes the pointed end of the switch 14$^a$, rides up the inclined end thereof, thereby turning the push out of the assembling-trough to its vertical position, which is the position shown in Fig. 8 and is the normal position of said push. All of the parts of the device which have to do with the assembling of matrices and casting of the type-bar have now returned to their normal position in readiness to repeat the above-described operations. When the circuit of the elevator-magnet is completed, the sprocket-wheel 29$^b$ is by the operation of a clutch connected with the elevator-shaft 29. The elevator-chain 40$^g$ is thereupon moved and the elevator is raised to a point in line with the distributing-trough 17. In moving to this position the lug 40$^l$ of the elevator strikes the trip-lever 19$^h$ on the slide-rack 19 and the said slide is carried upward by the elevator. In its upward movement it revolves the pinion 19$^b$, thereby revolving the sprocket-wheel 18$^c$. This causes the chain 18$^b$ to move so as to draw the propeller 18 to the left until it reaches a position, as shown in Fig. 5, to the left of the elevator. When it reaches this position, the trigger-arm 19$^f$ strikes the fixed tripping-finger 19$^h$, thereby moving it out of engagement with the shoulder 19$^k$ on the trip-lever. The trip-lever, being free to move, swings on its pivot, releasing its hold on the elevator, whereupon the slide-rack falls to its original position. The jar incident to said falling is relieved by the arm 19$^n$ striking the piston $s$ of the dash-pot S. As said piston settles down the latch 19$^p$ strikes the fixed post 19$^r$, whereupon said latch is lifted and the arm 19 swings upward on its pivot, permitting the further downward movement of said slide-rack. Just before the elevator reaches its highest position the lug 40$^l$ engages beneath the lever 31$^j$, thereby lifting it and the melting-pot piston 31$^h$. When the slide-rack falls, it revolves the pinion 19$^b$ and sprocket-wheel 18$^c$, thereby causing the propeller to move to the right. In this movement it pushes the matrices out of the elevator-trough into and along the distributing-trough until the right-hand matrix is brought into contact with the bunch of pins 43$^a$, carried by the gate-keeper. Whenever a matrix drops into the distributing-spout, the weight of the slide-rack moves the propeller and the propeller moves the line of matrices until the next matrix is in contact with the said pins. When the elevator is down, the pawl 41$^b$ on the upper arm 41$^a$ of the shift-rod is in a substantially horizontal position and its end rests against one of the elevator guide-rods 40$^a$, and thus prevents the shift-rod from being turned by its spring 41$^g$; but when the elevator in ascending strikes the pawl 41$^b$ it lifts it, and when the bottom of the elevator passes above the arm 41$^a$ said arm flies beneath the elevator, thereby turning the shift-rod. This movement of the shift-rod causes the lower arm 41$^h$ to bear against the beveled surface 54$^d$ on the arm 54$^c$, thereby moving said arm and withdrawing the spring 53$^b$ from contact with the wire $d'$. This breaks the current of the elevator-magnet, but the pawl 41$^b$ has entered a notch 40$^j$ in the front side of the elevator, whereby said elevator is held up until the shift-rod is moved in the contrary direction by the action of the slide 24, as hereinbefore described. The elevator-current switch-lever 54, as before stated, is subject to the action of the tension-spring 54$^e$, by means of which said current switch-lever maintains any position into which it may be moved. It will be seen that the elevator is held up by the described mechanism until a second line of matrices is introduced into the mold and the mold has been turned by the backward movement of the slide 24 to bring the type-slot into communication with the melting-pot. When the mold is in this position relative to the melting-pot, the slide 24 is at the rear end of its path, at which time it strikes the arm 41$^j$, thereby turning the switch-rod in the direction opposed to the spring 41$^g$. This movement of the shift-rod releases the elevator, which thereupon falls, striking the percussion-lever of the melting-pot and injecting molten metal into the type-slot in the mold. When the slide has moved forward, it permits the spring 41$^g$ to turn the shift-rod, so as to withdraw the percussion-lever from the path of the elevator, whereupon the elevator falls to the bottom of its path. Beneath the elevator is a dash-pot of ordinary construction, the piston 60 of which is shown in Fig. 66. This relieves the machine of considerable jar which would otherwise be incident to the fall of said elevator.

As each matrix is moved by the propeller against the bunch of pins in the gate-keeper the several magnets which operate the switches, the pinch, the gate-keeper, and switchback are automatically magnetized by the completion of their currents and demagnetized by the breaking thereof in the manner and order heretofore described. When the gate-keeper moves to the right, the right-hand matrix can move no farther to the right than the stop-bars 17$^c$, which extend across said trough. The gate covering the distributing-spout is withdrawn and said matrix drops into the spout, following the channel made for it by the action of the magnets, and finally lands in its own magazine and the gate-keeper returns to its normal position and the pinch releases its hold upon the next matrix in the line and the propeller moves the said matrix against the bunch of pins and this action is repeated until the entire line is distributed.

Having described my invention, I claim—

1. The combination of a plurality of matrix-magazines, their independent escapements, vertically-movable rods adapted to operate said escapements, and keys to which said rods are connected, with a transversely-movable bar through which said rods pass loosely, a plate secured to said bar having an inclined slot, a lever pivoted on a fixed pivot, a pin secured to said lever entering said inclined slot, and mechanism for operating said lever, substantially as and for the purpose specified.

2. The combination of a plurality of matrix-magazines, their independent escapements, vertically-movable rods adapted to operate said escapements and keys to which said rods are connected, with a transversely-movable bar through which said rods pass loosely, two lugs on said bar having in them oppositely-inclined slots, two levers pivoted on fixed pivots and having pins which enter said slots respectively, two keys, and connections between said keys and said levers respectively, substantially as and for the purpose specified.

3. The combination of independent matrix-magazines, their escapements, vertically-movable rods adapted to operate said escapements, and keys with which to operate said rods, with a transversely-movable bar through which said rods pass loosely, an inclined surface on the under side of said bar, a lever pivoted on a fixed pivot and having a part adapted to engage with said inclined surface, a key, and intermediate mechanism connecting said key and lever, substantially as and for the purpose specified.

4. In a matrix-assembling machine, an upright frame member consisting of the upper part $2^a$, having vertical magazine-grooves in its front side; the lower part $2^b$ having a like number of assembling-grooves which converge from their top downward and are merged together to form a single channel; and a part $2^c$ secured to and between the other parts and having (a) in its front side vertical grooves which connect the grooves in the parts $2^a$ and $2^b$, (b) in its rear side a like number of vertical grooves, and (c) in its upper and lower sides, horizontal grooves which connect the grooves in the front side with the grooves in the rear side of said part, substantially as and for the purpose specified.

5. The combination of an assembling-trough, a spout above said trough through which all of the matrices fall into said trough, a plunger movable in said trough, a lever adapted to move said plunger, an insulated contact-piece, a flexible spring extended beneath said spout, an electromagnet connected in a circuit adapted to be closed by the contact of said spring and contact-piece, a longitudinally-movable rod adapted to operate the plunger-lever and to be operated by the electromagnet, and a spring for moving the plunger-lever in the opposite direction, substantially as and for the purpose specified.

6. The combination of the assembling-trough having a longitudinal slot in its bottom, a pivoted detent-arm adapted to oscillate on its axis and to move in a path parallel to the trough, having its end adapted to enter said slot in the trough, and a spring for retracting said detent-arm, substantially as and for the purpose specified.

7. The combination of the assembling-trough having a longitudinal slot in its bottom, a detent-rod movable longitudinally and axially, an arm secured thereto having its end upturned and adapted to enter said slot in the trough, and a spring for returning said rod to its original position, substantially as and for the purpose specified.

8. The combination of the assembling-trough having a slot in its bottom, a detent-rod movable longitudinally and axially, a detent-arm secured thereto, adapted to enter the trough through said slot, a spring-pawl pivoted to the detent-arm and adapted to engage with the bottom of said trough, mechanism for turning said rod upon its axis to withdraw the detent-arm from said trough, a spring for retracting said rod, and a beveled rib on the trough for disengaging the pawl from the trough, substantially as and for the purpose specified.

9. The combination of a claw-rod mounted in suitable bearings, and adapted to be turned upon its axis and to be moved longitudinally in said bearings, a coil-spring adapted to move said rod both axially and longitudinally to return it to its normal position, and a claw secured to said rod, substantially as and for the purpose specified.

10. The combination of the assembling-trough, a claw-rod mounted in suitable bearings and adapted to be turned and moved longitudinally therein, means for returning said rod to its normal position, a claw secured to said rod adapted to enter said trough, a spring-pawl pivoted to said claw adapted to engage with said trough, and thereby prevent the turning of the claw-rod to withdraw the claw from the trough, and means for releasing said pawl, substantially as and for the purpose specified.

11. The combination of the assembling-trough, a claw-rod mounted in bearings in which it may oscillate and move longitudinally, a spring for returning the rod to its normal position, a spring-pawl pivoted to said claw adapted to engage with the trough to prevent the turning of the claw-rod to withdraw the claw from the trough, and a drop-pawl pivoted to said trough adapted to engage with the claw to prevent its backward movement, substantially as and for the purpose specified.

12. The combination of the assembling-trough, a claw-rod mounted in a fixed sleeve, in which it is adapted to move longitudinally and to turn upon its axis, a coil-spring surrounding said rod in said sleeve and secured at its end to said rod and sleeve respectively, and a claw secured to said rod adapted to enter said trough, substantially as and for the purpose specified.

13. The combination of the assembling-trough, a claw-rod mounted in bearings in which it may oscillate and move longitudinally, means for returning said rod to its normal position, a claw secured to said rod, a spring-pawl adapted to engage with the trough, a lever pivoted to said trough and adapted to release said pawl and means for operating said lever, substantially as and for the purpose specified.

14. The combination of a longitudinally-movable push-rod adapted to be turned in its bearings and to be moved longitudinally therein, an arm secured thereto, with a loosely-pivoted switch 14$^a$ having a pointed end which hangs below said switch-box, and a spring for retracting said push-rod, substantially as and for the purpose specified.

15. The combination of a longitudinally-movable push-rod and an arm secured thereto, with an electric switch, and switch-operating mechanism adapted to be operated by said arm, substantially as and for the purpose specified.

16. The combination of a longitudinally-movable push-rod, and an arm secured thereto, with an electric switch, two arms projecting below said switch-box and adapted to be engaged by said arm on the push-rod, and mechanism whereby the said engagement with one arm operates the switch in one direction, and with the other arm operates said switch in the opposite direction, substantially as and for the purpose specified.

17. The combination of the assembling-trough, a push-rod adapted to move both longitudinally and axially, a push secured thereto, and a rack on said rod, with a revolving shaft, a pinion loosely mounted thereon engaging said rack, a clutching device for connecting said shaft and pinion, and mechanism for operating said clutch, substantially as and for the purpose specified.

18. The combination of a hollow shaft, a pinion loosely mounted thereon, a collar adapted to interlock with said pinion, a pin secured to said collar passing through a slot in said shaft, two movable rods in said shaft engaging with opposite sides of said pin, a spring adapted to move one rod, and means for moving the other rod, substantially as and for the purpose specified.

19. The combination of a hollow shaft, a pinion loosely mounted thereon, a collar adapted to interlock with said pinion, a pin secured to said collar passing through a slot in said shaft, two movable rods in said shaft engaging with opposite sides of said pin, a spring adapted to move one rod, and an electromagnet adapted to move the other rod, substantially as and for the purpose specified.

20. The combination of the longitudinally-movable push-rod, a rack connected with said push-rod, with a revolving shaft, an independently-movable pinion engaging with said rack, a clutching device for connecting said pinion and shaft, an electromagnet and clutching device whereby the latter is operated by said electromagnet, substantially as and for the purpose specified.

21. The combination of an automatically-closing mold-door, a shoulder with which said door engages and by which it is held open, a spring for causing said engagement, the movable push, a lever mounted in a slot in the end of said push adapted to engage with said door and release it, substantially as and for the purpose specified.

22. The combination of the longitudinally-movable push-rod adapted to be turned in its bearings, a push secured to said rod, an arm also secured to said rod, mechanism for operating said push-rod, a clutch for setting said mechanism in operation, an electromagnet adapted to operate said clutch, and an electric switch adapted to be engaged by said arm on the push-rod, whereby the said electric switch is operated, substantially as and for the purpose specified.

23. The combination of the assembling-trough, a detent-rod and a claw both adapted to be projected into the same, and to be moved longitudinally therein, mechanism by which they are held in said trough, a push lying normally out of said trough but adapted to be moved into the same, and mechanism whereby the entrance of the push into said trough causes the withdrawal of the detent and claw therefrom, substantially as and for the purpose specified.

24. The combination of the assembling-trough, a detent-rod susceptible of longitudinal and oscillatory movement, a detent secured to said rod, a push-rod susceptible of longitudinal and oscillatory movement, an arm 10$^e$ secured to said detent-rod, and an arm 12$^f$ in operative connection with the push-rod and adapted to engage with the arm on the detent-rod, substantially as and for the purpose specified.

25. The combination of a detent-rod susceptible of longitudinal and oscillatory movement, and an arm secured thereto, with a push-rod susceptible of longitudinal and oscillatory movement, a sleeve 12$^d$ which surrounds the detent-rod and is connected thereto by a tongue and groove, an arm 12$^f$ secured to said sleeve, and adapted to engage with said arm on the detent-rod, substantially as and for the purpose specified.

26. In a machine for casting type-bars, a mold having a recess adapted to receive a matrix-line, and a type-slot extending from without inward to said recess, substantially as and for the purpose specified.

27. In a machine for casting type-bars, the combination of a mold having a recess adapted to receive a matrix-line, and a type-slot extending from without inward to said recess, with a matrix-clamp contained in said recess, substantially as and for the purpose specified.

28. The combination of a cylindrical mold having a longitudinal recess extending from end to end adapted to contain a matrix-line, a type-slot passing from without inward to said recess and extending from one end to the other of the mold, with doors adapted to close the end of said type slot and recess, substantially as and for the purpose specified.

29. In a machine for casting type-bars, the combination of a melting-pot, a cylindrical mold having a longitudinal recess adapted to receive a matrix-line, and a type-slot extending from without inward to said recess, and a matrix-clamp contained in said recess, with mechanism for oscillating said mold upon its axis, substantially as and for the purpose specified.

30. The combination of a cylindrical mold having a longitudinal recess adapted to receive a matrix-line, and a longitudinal slot extending from without inward to said recess, said mold also having a transverse slot entering said recess, with a matrix-clamp contained in said recess, a friction-wheel mounted on said matrix-clamp, a fixed bar having a cam-shaped end adapted to enter said recess and engage with said friction-wheel, and mechanism for oscillating said mold, substantially as and for the purpose specified.

31. The combination of a cylindrical mold having a longitudinal recess adapted to receive a matrix-line, and a longitudinal slot extending from without inward to said recess, with a matrix-clamp contained in said recess having a shelf upon which said matrices rest, a lid pivoted to said matrix-clamp, and springs interposed between said lid and matrix-clamp, springs interposed between the matrix-clamp and that side of the mold in which the type-slot is formed, mechanism for oscillating said mold, and a device for moving said matrix-clamp, substantially as and for the purpose specified.

32. The combination of a cylindrical mold having a longitudinal recess adapted to receive a matrix-line and a type-slot extending from without inward to said recess, and a matrix-clamp contained in said mold, said mold having peripheral gear-teeth, with a sliding rack adapted to engage with said gear-teeth, substantially as and for the purpose specified.

33. The combination of a fixed mold-jaw and a pivoted mold-jaw having an incomplete cylindrical recess between them, a cylindrical mold lying in said recess, and having a longitudinal recess adapted to contain a line of matrices and having also a longitudinal type-slot extending from said recess outward, a matrix-clamp contained in said mold-recess, mechanisms for oscillating said mold and moving the matrix-clamp, and the nozzle of a melting-pot resting upon the mold, substantially as and for the purpose specified.

34. The combination of a cylindrical mold having a recess adapted to receive a matrix-line, and a longitudinal slot extending from without inward to said recess, and external gear-teeth, a matrix-clamp contained in said recess, with a fixed mold-jaw and pivoted mold-jaw having an incomplete cylindrical recess between them in which said mold is mounted, a friction-roller in the end of said pivoted mold-jaw, a slide upon which said roller rests, said slide having a beveled surface which engages with said roller, and a rack operated by said slide engaging with the teeth on the mold, substantially as and for the purpose specified.

35. The combination with the cylindrical mold having peripheral gear-teeth, a sliding rack engaging with said gear-teeth, a reciprocating slide for moving said rack, and mechanism permitting the independent movement of said slide during the first and last parts on its separate excursions, substantially as and for the purpose specified.

36. The combination with the cylindrical mold having peripheral gear-teeth, a slide 24 having shoulders 24$^d$, 24$^c$, a rack which lies and is movable between said shoulders, a finger adapted to enter between said rack and one of said shoulders, and means for automatically moving said finger into and withdrawing it from said position, substantially as and for the purpose specified.

37. The combination of a cylindrical mold having a recess adapted to receive a matrix-line and a type-slot extending from without inward to said recess, and having also external gear-teeth, a movable slide having a recess in its top side, a rack shorter than the said recess lying between a bar movable in a guide-groove oblique to the path of the rack having a finger adapted to be projected between the rack and a shoulder on the slide, substantially as and for the purpose specified.

38. The combination of an oscillating cylindrical mold having gear-teeth on its outer periphery, a slide carrying a rack adapted to engage with said gear-teeth, a crank-shaft having a crank-pin which engages in a groove in said slide, and mechanism for operating said crank-shaft, substantially as and for the purpose specified.

39. A slide having a fin projecting from its under side, and having also a recess in its top side, combined with a rack shorter than said recess which is seated in the recess and is adapted to move between the ends of said recess, mechanism acting on said fin to move the slide, and an oscillating mold having teeth which are engaged by said rack, substantially as and for the purpose specified.

40. The combination of an oscillating cylindrical mold containing a type-slot, a rotating shaft, a rotatable shaft and clutching device adapted to connect said two shafts, an electromagnet adapted to operate said clutching device and suitable mechanism intermediate of said rotatable shaft and mold, whereby when the former is rotated the latter will likewise be rotated, substantially as and for the purpose specified.

41. The combination of a cylindrical mold having a longitudinal recess adapted to receive a matrix-line extending from one end to the other of said mold, and a type-slot extending from without inward to said recess, said mold having in its ends grooves adapted to receive the mold-doors, with the mold-doors movable in said grooves, having projecting pins, door-operating levers having hook-shaped ends adapted to engage with said pins and mechanism for operating said door-opening levers, substantially as and for the purpose specified.

42. The combination of the sliding mold-doors and spring-operated levers for operating them, with a pivoted block 35, pawls pivoted to said block and adapted to engage with said levers, and mechanism for operating said block, substantially as and for the purpose specified.

43. The combination of a fixed and movable mold-clamping jaw having an incomplete cylindrical recess between them, a cylindrical mold mounted in said recess having end grooves adapted to receive sliding doors, one of said mold-jaws also having similar grooves, with sliding mold-doors having projecting pins, pivoted door-operating levers having hooks which are adapted to engage with said pins, springs for moving said levers in one direction, a pivoted block, a spring for moving the same in one direction, pawl-levers pivoted to said block and adapted to engage with said door-opening levers, and the mechanism adapted to oscillate said mold and to move said block against its spring, substantially as and for the purpose specified.

44. The combination of an oscillating cylindrical mold having a type-slot extending from one end to the other, a fixed and movable mold-jaw between which said mold is journaled, two shearing-knives secured to the fixed mold-jaw in position to trim the sides of the type-bar when the same is forced from the type-slot into the mold, substantially as and for the purpose specified.

45. The combination with the mold, a door for one end of the mold, a door-operating lever and a spring-arm pivoted thereto with a vertically-movable elevator, substantially as and for the purpose specified.

46. The combination of an elevator adapted to receive a matrix-line, mechanism for raising said elevator, an electromagnet adapted to set said mechanism in operation, an electrical switch for closing the circuit of said magnet, and mechanism whereby the switch is operated when the matrices enter the elevator, substantially as and for the purpose specified.

47. The combination of an elevator adapted to receive a matrix-line, mechanism for raising said elevator, an electromagnet adapted to set said mechanism in operation, and an electrical switch for completing the circuit of said magnet, which switch enters the elevator so as to be engaged and operated by the matrices entering said elevator, substantially as and for the purpose specified.

48. The combination of an elevator, and mechanism for raising it, a clutching device for connecting said mechanism with a driven shaft, an electromagnet for operating said clutching device, an electric switch for completing the circuit of said magnet, and mechanism for automatically operating said switch to break the electric circuit when the elevator has reached its upper position, substantially as and for the purpose specified.

49. The combination of an elevator, and mechanism for raising it, a clutching device for connecting said mechanism with a driven shaft, an electromagnet for operating said clutching device, an electric switch for completing the circuit of said magnet, a spring-actuated shift-rod, an arm thereon adapted to operate said switch, and mechanism preventing the movement of said shift-rod by its spring and adapted to be engaged by the elevator when the same has reached its upper position, whereby the shift-rod is permitted to move said switch and break the magnet-circuit, substantially as and for the purpose specified.

50. The combination of a vertically-movable elevator and mechanism for moving the same, an electromagnet adapted to connect said mechanism with the driving mechanism, an electrical switch for completing the circuit of said electromagnet adapted to enter the elevator and be moved to complete said circuit by the matrices in entering said elevator, with a shift-rod adapted to move the switch in the opposite direction, a spring for moving said shift-rod, a pawl for preventing the movement of said shift-rod by its spring, which is adapted to be engaged and made inoperative by the elevator, substantially as and for the purpose specified.

51. The combination of the elevator, mechanism for raising it, an electromagnet adapted to set said mechanism in operation, and an electric switch adapted to complete and break the electric circuit, with a spring-operated switch-rod, an arm secured thereto for moving said switch to break the circuit, an arm 41$^a$, a pawl 41$^b$ pivoted to said arm and adapted to engage with a fixed part of the machine and to be lifted out of engagement therewith by the elevator, said elevator having a notch with which said pawl is adapted to engage, substantially as and for the purpose specified.

52. The combination of a mold having a type-slot, a melting-pot having a nozzle adapted to discharge into said type-slot, a pump and a lever for operating said pump, with a weight adapted to fall upon the said lever and by percussion to inject molten metal into the mold, substantially as and for the purpose specified.

53. The combination of a mold having a type-slot, a melting-pot having a nozzle adapted to discharge into said type-slot, a pump-piston adapted to force molten metal from the melting-pot into the type-slot, pump-operating mechanism, and a weight adapted to fall upon said pump-operating mechanism and by percussion to inject the molten metal into the type-slot, substantially as and for the purpose specified.

54. The combination of a mold having a type-slot, a melting-pot having a nozzle adapted to discharge into said type-slot, a pump and pump-piston, a lever, a connecting-rod connecting said lever and pump-piston, and the vertically-movable elevator adapted to engage with said lever, substantially as and for the purpose specified.

55. The combination of a mold having a type-slot, a melting-pot having a nozzle adapted to discharge into said type-slot, a percussion-lever for operating the pump-piston, with the vertically-movable elevator and mechanism for moving said percussion-lever into and out of the path of the elevator, substantially as and for the purpose specified.

56. The combination with the mold having a type-slot, a melting-pot having a nozzle adapted to discharge into said type-slot, a pump for forcing said metal, a percussion-lever adapted to operate the pump-piston, a vertically-movable elevator, an oscillating shift-rod, an arm secured thereto having a pawl adapted to engage with said elevator and hold it up, a second arm engaging with said percussion-lever, and mechanism for turning said shift-rod, substantially as and for the purpose specified.

57. In a melting-pot in combination of a pump and a pump-piston with a lever pivoted to the upper end of said piston, a bracket under which one end of said lever engages, combined with a vertically-movable elevator and mechanism for moving said lever into and out of the path of said elevator, substantially as and for the purpose specified.

58. The combination of a melting-pot, a vertical mercury-tube therein, a float in said tube, a lever lying above and resting upon said float and gas-burners for heating said melting-pot, a valve for controlling the supply of gas thereto, an electromagnet for operating said valve and means whereby the movement of said lever makes and breaks the circuit of said magnet, substantially as and for the purpose specified.

59. The combination of a distributing-trough, a transversely-movable propeller, a movable sprocket-chain to which said propeller is connected, two sprocket-wheels, a pinion rigidly connected with one of the sprocket-wheels and a vertically-movable rack engaging with said pinion, substantially as and for the purpose specified.

60. The combination of a distributing-trough, a propeller adapted to move a matrix-line from the elevator into and along said trough, sprocket wheels and chain for moving said propeller, a vertically-movable slide-rack adapted to revolve one of said sprocket-wheels, an elevator adapted to engage with said slide-rack and raise the same and a tripping device for releasing the engagement of said elevator and slide-rack, substantially as and for the purpose specified.

61. The combination of a propeller adapted to propel a matrix-line along the distributing-trough, two sprocket-wheels and a sprocket-chain to which said propeller is secured, a vertically-movable slide-rack adapted to revolve one of said sprocket-wheels, mechanism for raising said slide-rack and releasing the same to the influence of gravity, a dash-pot and an arm on said slide-rack adapted to strike the dash-pot piston, substantially as and for the purpose specified.

62. The combination of the transversely-movable propeller, two sprocket-wheels and a sprocket-chain connected with said propeller and a pinion rigidly connected with one of the sprocket-wheels, the elevator, the vertically-movable slide-rack engaging with said pinion, a trip-lever on said slide-rack adapted to be engaged by the elevator, a trigger-piece on the slide-rack engaging with the trip-lever and a lug on the frame adapted to operate said trigger-piece, substantially as and for the purpose specified.

63. The combination of the transversely-movable propeller, two sprocket-wheels, a sprocket-chain to which the propeller is attached, a pinion connected with one sprocket-wheel, a vertically-movable slide-rack engaging with said pinion, mechanism for lifting said slide-rack and releasing it to the action of gravity, with a dash-pot, an arm pivoted to said slide-rack and a latch for holding said arm in place which is adapted to be lifted by engaging with a fixed part of the machine, substantially as and for the purpose specified.

64. The combination of diverging distributing-channels, dividing-partitions by which the number of said channels is increased from the top downward, switches arranged and connected in rows and pivoted to the upper ends of said partitions and mechanisms for severally operating said rows of switches, substantially as and for the purpose specified.

65. The combination of diverging distributing-channels, dividing-partitions by which the number of said channels is increased from the top downward, pivoted switches arranged and connected in rows in said channels, electromagnets adapted to severally operate the rows of switches, with a distributing-trough having an opening through which communication is had with the distributing-channels, a series of pins connected in the several electric circuits and matrices adapted to engage with said pins and thereby complete said magnetic circuits, substantially as and for the purpose specified.

66. The combination of diverging distributing-channels, dividing-partitions by which the number of these channels is increased from the top downward, switches, whereby any channel may be placed in communication with either of its branches formed by said partitions, the said switches being connected in groups, whereby all of the switches in any group will be simultaneously moved, electromagnets, and intermediate mechanism respectively associated with the several groups of switches and adapted to operate the same, substantially as and for the purpose specified.

67. The combination of diverging distributing-channels, dividing-partitions by which the number of said channels is increased from the top downward, pivoted switches arranged and connected in rows in said channels, electromagnets adapted to severally operate the rows of switches, with a distributing-trough having an opening through which communication is had with the distributing-channels, a series of pins connected with the several electric circuits, matrices adapted to engage with said pins and thereby complete said electric circuits, a branch wire connected in the magnetic circuit between the magnet and said pins, and mechanism intermediate of said last-named wires and the armatures of the several magnets, whereby the movement of either of said armatures completes the electrical circuit of which the corresponding wire is a part, substantially as and for the purpose specified.

68. The combination of diverging distributing-channels, dividing-partitions by which the number of said channels is increased from the top downward, pivoted switches arranged and connected in rows in said channels, electromagnets adapted to severally operate the rows of switches, with a distributing-trough having an opening through which communication is had with said distributing-channels, a series of pins connected in the several electric circuits, matrices adapted to engage with said pins and thereby complete said electric circuits, insulated springs, wires severally connected in the magnetic circuit between the pins and said magnets, which wires are severally connected with said springs, and rods connected with the armatures of said magnets adapted to severally engage with said springs when said armatures are attracted, substantially as and for the purpose specified.

69. The combination of diverging distributing-channels, dividing-partitions by which the number of said channels is increased from the top downward, pivoted switches arranged and connected in rows in said channels, electromagnets adapted to severally operate the rows of switches, with a distributing-trough having an opening through which communication is had with said distributing-channels, a series of pins connected in the several electric circuits, matrices adapted to engage with said pins and thereby complete said electric circuits, a series of insulated springs arranged adjacent to said magnets, mechanism connected with the armatures of said magnets, adapted to severally engage with said springs, wires connected in the electric circuit between the magnets and pins, which wires are severally connected with said springs, a movable switchback, insulated fingers secured thereto and adapted to engage with said springs and means for operating said switchback, whereby said springs are moved and the electric circuits thereby broken, substantially as and for the purpose specified.

70. The combination of diverging distributing-channels, rows of switches pivoted in said channels, electromagnets adapted to operate severally the rows of switches, means for completing the circuits of said magnets, a switchback adapted to break all of said circuits, an electromagnet for operating said switchback, and a governor adapted to close the circuit of said last-named electromagnet, substantially as and for the purpose specified.

71. The combination of the distributing-trough having an opening in its bottom, a distributing-spout below said opening, a movable gate closing the opening in said trough, and mechanism for operating said gate, substantially as and for the purpose specified.

72. The combination of the distributing-trough having an opening in its bottom, a distributing-spout below said opening, and diverging distributing-channels below and in communication with said spout, switches arranged and connected in rows and pivoted in said distributing-channels, and electromagnets for operating the several rows of switches, with a sliding gate-keeper, mechanism for moving the same, a gate secured to said gate-keeper closing the opening in the distributing-trough, a series of insulated pins secured to said gate-keeper and connected severally in the circuits of said electromagnets, and stop-bars extending into said trough, substantially as and for the purpose specified.

73. The combination of diverging distributing-channels, a row of switches pivoted in said channels, crank-arms secured to all of the switch-pivots, a bridge-bar pivotally connected with all of the crank-arms, a crank-arm secured to one of said pivots, an electromagnet, a link connecting the last-named crank with the armature of said electromagnet, and means for completing and breaking the electric circuit, substantially as and for the purpose specified.

74. The combination with the distributing-trough having an opening in its bottom, a rock-shaft, an arm secured to said rock-shaft and adapted to enter said trough at one side of the opening in the bottom thereof, and mechanism for operating said rock-shaft, substantially as and for the purpose specified.

75. The combination with a distributing-trough, diverging distributing-channels below the opening in said trough, pivoted switches arranged and connected in rows in said channels, electromagnets adapted to severally operate said rows of switches, a series of pins which project into said distributing-trough and are severally connected in the circuit of said electromagnets, with the movable pinch adapted to enter said distributing-trough, an electromagnet for operating the 76. The combination of a distributing-trough, diverging distributing-channels below the opening in said trough, pivoted switches arranged and connected in rows, electromagnets adapted to severally operate said rows of switches, a gate-keeper movable in said trough, a series of insulated pins secured to said gate-keeper which pins are connected in the circuit of said electromagnets, a pinch adapted to enter said trough, two electromagnets adapted to operate said pinch, mechanism whereby the operation of any one of the switch-magnets completes the circuit of one pinch-magnet, and mechanism whereby the movement of the gate-keeper completes the circuit of the other pinch-magnets, substantially as and for the purpose specified.

77. The combination of electromagnets adapted to perform certain functions in the machine, a movable switchback whereby all of the electric circuits are broken and an electromagnet for operating said switchback, with the movable gate-keeper, a governor operated thereby and adapted to close the circuit of the switchback-magnet, substantially as and for the purpose specified.

78. The combination with the movable gate-keeper, a pivoted ball-track, a ball movable therein, intermediate mechanism between said pivoted ball-track and gate-keeper, a spring adapted to be engaged by said ball, an electromagnet and its electric circuit in which said spring is connected, substantially as and for the purpose specified.

79. The combination of the distributing-trough having an opening in its bottom, a distributing-spout, diverging distributing-channels, partitions dividing said channels thereby increasing their number from the top downward, switches pivoted in said channels and arranged and connected in rows, electromagnets for severally operating said rows of switches, with a gate-keeper movable in said trough, a gate secured thereto for closing the opening in the distributing-trough, a series of insulated pins secured to said gate-keeper and severally connected in the circuits of said electromagnets, a toggle for moving said gate-keeper, an electromagnet for flexing said toggle, and mechanism whereby the attraction of the armature of any of the switch-magnets completes the circuit of the gate-keeper magnet, substantially as and for the purpose specified.

80. The combination of the upright frame member having on its face distributing-channels which converge from the lower ends upward and are finally merged together into one channel, assembling-channels which converge from their upper ends downward and are finally merged into one channel, and magazine-channels which are intermediate of said assembling-channels and distributing-channels and are in communication with both, with switches pivoted in the distributing-channels and escapements in the lower ends of the magazines, substantially as and for the purpose specified.

81. A series of matrices each having one or more transverse holes, which holes are differently arranged on the different matrices, substantially as and for the purpose specified.

82. In a machine for forming type-bars, a series of matrices containing matrices of various thicknesses, except that the corresponding parts of said matrices are cut away on the right side thereof to make these parts of uniform thickness, said matrices having, through the uniformly-thick parts, one or more transverse holes which are differently arranged on the different matrices, substantially as and for the purpose specified.

83. The combination of the distributing-trough, a propeller adapted to push the matrix-line along said trough, mechanism for operating said propeller, a slide-rack adapted to operate said mechanism, the elevator, and a trip-lever for connecting said elevator and slide-rack, substantially as and for the purpose specified.

In testimony whereof I affix my signature in presence of two witnesses.

BENJ. F. BELLOWS.

Witnesses:
E. L. THURSTON,
L. T. GRISWOLD.